(12) United States Patent
Jonke et al.

(10) Patent No.: US 10,026,969 B2
(45) Date of Patent: Jul. 17, 2018

(54) POLYMER-SUPPORTED ELECTRODES CONTAINING MULTI-ATOMIC CLUSTERS AND METHODS OF MAKING AND USING SAME

(71) Applicant: Georgia Tech Research Corporation, Atlanta, GA (US)

(72) Inventors: Alex P. Jonke, Atlanta, GA (US); Miroslawa A. Josowicz, Atlanta, GA (US); Jiri Janata, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 644 days.

(21) Appl. No.: 14/483,268

(22) Filed: Sep. 11, 2014

(65) Prior Publication Data
US 2015/0064604 A1    Mar. 5, 2015

Related U.S. Application Data

(63) Continuation-in-part of application No. 13/714,189, filed on Dec. 13, 2012, now abandoned.

(60) Provisional application No. 61/876,478, filed on Sep. 11, 2013, provisional application No. 61/570,000, filed on Dec. 13, 2011, provisional application No.
(Continued)

(51) Int. Cl.
| | |
|---|---|
| *H01M 8/22* | (2006.01) |
| *H01M 4/90* | (2006.01) |
| *H01M 4/88* | (2006.01) |
| *C25D 3/48* | (2006.01) |
| *C25D 13/12* | (2006.01) |
| *H01M 8/1011* | (2016.01) |

(52) U.S. Cl.
CPC ............ *H01M 4/9008* (2013.01); *C25D 3/48* (2013.01); *C25D 13/12* (2013.01); *H01M 4/8853* (2013.01); *H01M 8/1013* (2013.01); *Y02E 60/522* (2013.01)

(58) Field of Classification Search
None
See application file for complete search history.

(56) References Cited

U.S. PATENT DOCUMENTS

| | | | | |
|---|---|---|---|---|
| 2011/0097650 A1* | 4/2011 | Lin | ....................... | H01M 4/885 429/525 |
| 2012/0201743 A1* | 8/2012 | Chadwick | ............. | C01B 15/029 423/584 |

OTHER PUBLICATIONS

Angdembay, "How do I calculate the pH of 0.1 M of HCl," Quora, Accessed on Apr. 2, 2017.*
(Continued)

*Primary Examiner* — Eli Mekhlin
(74) *Attorney, Agent, or Firm* — Troutman Sanders LLC; Ryan A. Schneider

(57) ABSTRACT

Atomic mixed metal electrodes, including electrodes containing a conductive polymer-mixed metal complex, as well as methods of making and using the same, are disclosed. In some embodiments, the atomic mixed metal electrode can be described as a conductive polymer-coated electrode having mixed metal clusters complexed to the conductive polymer at levels of between 2 and 10 metal atoms. A method for preparing the conductive polymer-mixed metal complexes is disclosed that can deposit metal atoms one at a time into a complex with the conductive polymer, allowing for highly tailored atomic clusters. A method of oxidizing alcohols, and the application to devices such as fuel cells are also disclosed.

23 Claims, 30 Drawing Sheets

Related U.S. Application Data

61/585,485, filed on Jan. 11, 2012, provisional application No. 61/676,048, filed on Jul. 26, 2012.

(56) References Cited

OTHER PUBLICATIONS

Moghaddam et al., "Formic acid oxidation at spontaneously deposited palladium on polyaniline modified carbon fibre paper," Electrochemica Acta, 56, (2011), 7666-7672.*

Jonke, Alex P. et al., "Electrochemically Controlled Atom by Atom Deposition of Gold to Polyaniline," Journal of the Electrochemical Society, vol. 157, No. 10, pp. P83-P87, Published Aug. 17, 2010.

Jonke et al., "Atomic Clusters of Pd and AuNPdM in Polyaniline," Springer Science+Business Media New York 2013, pp. 531-538, published Apr. 16, 2013.

Jonke et al., "Polyaniline Doped with Atomic Gold," Journal of the Electrochemical Society, vol. 158, No. 12, pp. E147-E151, Published Nov. 14, 2011.

Schwartz et al., "Polyaniline Electodes with Atomic AunPd1 Alloys: Oxidation of Methanol and Ethanol," Springer Science+Business Media New York 2013, pp. 636-641, published Jun. 4, 2013.

Schwartz et al., "Effect of Structured Atomic Gold on Electrooxidation of Alcohols in Alkaline Medium," Springer Science+Business Media New York 2013, pp. 777-782, published Jun. 6, 2013.

Jonke et al., "Odd-Even Pattern Observed in Polyaniline / (Au0-Au8) Composites," Journal of the Electrochemical Society, vol. 159, No. 3, pp. P40-P43, published Jan. 12, 2012.

Jonke et al., "Polyaniline Electrodes Containing Tri-Atomic Au/Pd Clusters: Effect of Ordering," Springer Science+Business Media New York 2013, pp. 1261-1265, published Oct. 10, 2013.

Schwartz et al., "Polyaniline-Supported Atomic Gold Electrodes: Comparison with Macro Electrodes," Springer Science+Business Media New York 2013, pp. 1345-1351, published Sep. 11, 2012.

Ai-Jie et al., "Ab Initio Calculation of the Geometric, Electronic and Magnetic Properties of Neutral and Anionic AunPd (n=1-9) Clusters," Molecular Physics: An International Journal at the Interface Between Chemistry and Physics, vol. 109, No. 11, pp. 1485-1494, Published Jun. 10, 2011.

Hakkinen et al., "Gold Clusters (AuN, 2<N<19) and their Anions," Physical Review B, vol. 62, No. 4., pp. R2287-R2290, Published Jul. 15, 2000.

Wang, S. et al., "Geometries, stabilities, and electronic properties of Pt-group-doped gold clusters, their relationship to cluster size, and comparison with pure gold clusters," Phys. Chem. Chem. Phys., 2011, vol. 13, pp. 10119-10130.

Nava, P., et al., "Density functional study of palladium clusters," Phys. Chem. Chem. Phys., 2003, vol. 5, pp. 3372-33831.

* cited by examiner $$R = \frac{Area_{quinoid}}{Area_{benzenoid}} = \frac{x}{1-x}$$

POLYMER-SUPPORTED ELECTRODES CONTAINING MULTI-ATOMIC CLUSTERS AND METHODS OF MAKING AND USING SAME

CROSS-REFERENCE TO RELATED APPLICATIONS

This application claims the benefit of U.S. Provisional Application Ser. No. 61/876,478, filed on Sep. 11, 2013, entitled "Atomic Metals—Effect of Order," which is incorporated herein by reference in its entirety as if fully set forth below. This application is a continuation-in-part of U.S. patent application Ser. No. 13/714,189, filed on Dec. 10, 2012, now abandoned, entitled "Polyaniline-Supported Atomic Gold Electrodes And Methods of Making and Using Same," which application claims the benefit of U.S. Provisional Application Ser. No. 61/570,000, filed on Dec. 13, 2011, entitled 'Odd-Even Pattern Observed in Polyaniline ($Au_0$-$Au_8$) Composites;" U.S. Provisional Application Ser. No. 61/585,485 filed on Jan. 11, 2012, entitled "Catalytic Properties of Atomic Metal Composites;" and U.S. Provisional Application Ser. No. 61/676,048, filed Jul. 26, 2012, entitled "Catalytic Properties of Atomic Metal Composites," each of which is incorporated herein by reference in its entirety as if fully set forth below.

TECHNICAL FIELD

Various embodiments of the disclosure relate generally to atomic gold electrodes based on a polyaniline gold complex (PANI-Au), their preparations, and the applications of these atomic gold electrodes to oxidations and electrochemical systems. The various embodiments of the disclosure also relate generally to hetero multi-atomic electrodes based on a conductive polymer-mixed metal complex, their preparations, and the application of these hetero multi-atomic electrodes to oxidations and electrochemical systems.

BACKGROUND

Nano-sized gold has been extensively investigated because physical and chemical properties of gold clusters are known to change with their size. Both bulk gold and gold nanoclusters have catalytic properties for oxidation of alcohols in alkaline medium, and for carbon monoxide. There are several reports of gold clusters containing only a few atoms being catalytically active. It has been predicted that the stability of atomic gold clusters of $Au_N$ where N=1-10 would depend on binding energy, dissociation energy, second order difference in total energy, and HOMO-LUMO energy gap. These theoretical studies show that neutral (ground state) gold clusters exhibit an odd-even oscillation of their properties due to electron-pairing effect for the second order difference in total energy and in the HOMO-LUMO energy gap. Gold clusters made of 2 and 6 atoms have the largest HOMO-LUMO gap and dissociation energy, while the second order difference in total energy is the lowest for these two, which confirms their high stability. The even numbered gold clusters are more stable than the odd numbered clusters. Moreover the $Au_2$ and $Au_6$ clusters have two dimensional structures. The odd-even pattern of electronic properties of gold and other coinage metals, has been confirmed in the experiment in which the UPS spectra of mass-selected metal clusters have been measured. In those experiments the oscillating pattern seizes at N>20 (for gold) and the electron affinity assumes the value corresponding to bulk metal.

It is known that catalytic performances of gold clusters depend on their preparation methods, support matrix, and their size. Both PANI containing metal precipitates and PANI modified electrodes can show electrocatalytic oxidation of primary alcohols in alkaline and acidic medium, but the catalytic effect is higher in the alkaline medium. Polyaniline is highly stable and easy to prepare, and its properties have been extensively studied. Interest in the electrocatalytic oxidation of alcohols has increased greatly due to their potential application in fuel cells. This oxidation can be catalyzed by a variety of metals, two of the most active being platinum and gold. These metals can either be used in polycrystalline form or as large, polydispersed cluster aggregates containing millions of metal atoms.

Additionally, the dramatic effect of atomic size and atomic composition of metal clusters on the electrochemical behavior of gold- or palladium-modified platinum/polyaniline electrodes has been described. The electrochemical oxidation of lower aliphatic alcohols in strongly alkaline medium has been used as the measure of electrocatalytic activity of these materials. It has been shown that the electrochemical activity correlates closely with the theoretically predicted electron affinity (HOMO-LUMO gap energy) calculated for atomic clusters in the "gas phase." The agreement between theory and experiment has been particularly good for the homoatomic clusters of gold, and even palladium; however, somewhat weaker correlation has been obtained for hetero-atomic clusters.

BRIEF DESCRIPTION

Embodiments of the disclosure relate to atomic gold electrodes (AGEs) based on polyaniline (PANI), associated fabrication methods, and associated uses. An exemplary embodiment of the disclosure provides a method for making the AGE.

An embodiment of the disclosure can be a method of making an atomic gold electrode comprising, coating an electrode with a polyaniline film, preconditioning the polyaniline film by overoxiding the polyaniline film, creating a PANI-$AuX_4^-$ complex and reducing the PANI-$AuX_4^-$ complex to form an atomic gold-PANI complex.

In an embodiment, the method can include repeating the steps of creating a PANI-$AuX_4^-$ complex and reducing the PANI-$AuX_4^-$ to create a PANI-$Au_N$ complex. N can be from 1 to 20, 1 to 10, 1 to 8 or 2, 4, or 6. N can be the same as the number of times the steps of creating a PANI-$AuX_4^-$ complex and reducing the PANI-$AuX_4^-$ are conducted.

In an embodiment, $X^-$ can be the halides chloride, bromide or iodide or a mixture thereof, cyanate, and thiocyanate. In an embodiment, X can be a halide; preferably chloride or bromide; or chloride.

In an embodiment, the step of coating an electrode comprises treating the electrode with an aniline solution at positive voltage. In an embodiment, the positive voltage can be +0.9V. In an embodiment, the electrode can be treated at a positive voltage with an acidic aqueous aniline solution.

In some embodiments, the step of precondition can include cycling the voltage from −0.2V to +0.7V, then holding the voltage at least about +0.7V for at least 30 minutes. The voltage can be held at at least about +0.75V, or at least about +0.8V. In some embodiments, the voltage can be held at at least about +0.8 V for at least 30 minutes, for at least about 45 minutes, or at least about 60 minutes.

In an embodiment, creating the PANI-AuX$_4^-$ complex can include holding the PANI at about 0.7 V and exposing the PANI to AuX$_4^-$. The AuX$_4^-$ can be in an aqueous acidic solution with any strong acid. In an embodiment, the AuX$_4^-$ can be in a HClO$_4$ solution. In an embodiment, the PANI-AuX$_4^-$ complex can be created at a ratio of about 20% Au per nitrogen, about 15% Au per nitrogen, or about 10% Au per nitrogen.

An embodiment of the disclosure can be a method of oxidizing an alcohol using an atomic gold electrode. The atomic gold electrode can include a PANI-Au$_N$ complex, where N is 1 to 20, 1 to 10, or 1 to 8. N can also be 2, 4 or 6. The oxidation can be in a solution phase, including a basic aqueous solution. The electrode can include platinum.

The atomic gold electrode can be prepared by coating an electrode with a polyaniline film, preconditioning the polyaniline film by overoxiding the polyaniline film, creating a PANI-AuX$_4^-$ complex and reducing the PANI-AuX$_4^-$ complex to form an atomic gold-PANI complex. The steps of creating a PANI-AuX$_4^-$ complex and reducing the PANI-AuX$_4^-$ to create a PANI-Au$_N$ complex can be repeat N times to create the PANI-Au$_N$ complex.

An embodiment of the disclosure can include a device incorporating a PANI-Au$_N$ electrode. In an embodiment the device can be a fuel cell comprising an atomic gold electrode and a fuel source. The atomic gold electrode can be a PANI-Au$_N$ and the fuel source can be an alcohol. N can be 1 to 20, 1 to 10, 1 to 8, or 2, 4, or 6.

Embodiments of the disclosure also relate to polymer-supported electrodes having multi-atomic clusters, associated fabrication methods, and associated uses. An exemplary embodiment of the disclosure provides a method of making the electrode.

An embodiment of the disclosure can be an electrode composition comprising a conductive polymer on an electrode and a mixed metal cluster. The mixed metal cluster can comprise from 2 to 10 metal atoms. Each cluster can be deposited at repeated sites of the conductive polymer. The clusters can be prepared using a cyclic deposition technique. During each cycle, another atom is added to the cluster.

In an embodiment, the conductive polymer is selected from the group consisting of PANI, polypyrrole, and polypyridine. In another embodiment, the conductive polymer is PANI.

In an embodiment, the mixed metal cluster comprises at least two noble metals. In a further embodiment, the at least two noble metals are gold and palladium. In some embodiments, the metal atoms of each mixed metal cluster have a terminal arrangement of Pd—Au.

In an embodiment of the disclosure, the electrode composition can comprise a conductive polymer on an electrode and a mixed metal cluster, the mixed metal cluster comprising three metal atoms deposited at repeated sites of the conductive polymer. In a further embodiment, the mixed metal cluster comprises gold and palladium, and the metal atoms have a terminal arrangement of Pd—Au.

An embodiment of the disclosure can be a method of making an atomic noble metal electrode comprising coating an electrode with a conductive polymer film, preconditioning the conductive film by overoxiding the conductive polymer film, creating a conductive polymer-noble metal-X$_4^-$ complex, and reducing the conductive polymer-noble metal-X$_4^-$ complex to form an atomic noble metal-conductive polymer complex.

In an embodiment, the method can include repeating steps creating a conductive polymer-noble metal-X$_4^-$ complex, and reducing the conductive polymer-noble metal-X$_4^-$ complex to form a conductive polymer-noble metal$_N$ complex. N can be from 2 to 10, preferably 3.

In an embodiment, X$_4^-$ can be the halides chloride, bromide or iodide or a mixture thereof, cyanate, and thiocyanate. In an embodiment, X$_4^-$ can be a halide, preferably chloride or bromide.

In an embodiment, the step of coating an electrode comprises treating the electrode with a conductive polymer solution at positive voltage. In an embodiment, the positive voltage can be +0.9V. In an embodiment, the electrode can be treated at a positive voltage with a conductive polymer selected from the group consisting of PANI, polypyrrole, and polypyridine. In an embodiment, the conductive polymer is PANI.

In some embodiments, the step of preconditioning can include cycling the voltage from −0.2V to +0.7V, then holding the voltage at least about +0.8V for at least 30 minutes.

In an embodiment, creating the conductive-noble metal-X$_4^-$ can include holding the conductive polymer at about 0.7 V and exposing the conductive polymer to noble metal-X$_4^-$. The noble metal-X$_4^-$ can be in an aqueous acidic solution with any strong acid. In an embodiment, the noble metal-X$_4^-$ can be in a HClO$_4$ solution. In an embodiment, the noble metals are gold and palladium.

An embodiment of the disclosure can include a method of making a tri-atomic noble metal electrode comprising coating an electrode with a PANI film, preconditioning the PANI by overoxiding the PANI film, creating a PANI-noble metal-X$_4^-$ complex, wherein the noble metal is gold or palladium, and reducing the PANI-noble metal-X$_4^-$ complex to form an atomic gold- or palladium-PANI complex. In some embodiments, the method can include repeating the step of creating a PANI-noble metal-X$_4^-$ complex using palladium and reducing the PANI-Pd—X$_4^-$ complex, followed by repeating the step of creating a PANI-noble metal-X$_4^-$ complex using gold and reducing the PANI-Au—X$_4^-$ complex.

In an embodiment, X$_4^-$ can be the halides chloride, bromide or iodide or a mixture thereof, cyanate, and thiocyanate. In an embodiment, X$_4^-$ can be a halide, preferably chloride or bromide.

An embodiment of the disclosure can include a method of oxidizing an alcohol on an atomic noble metal electrode. The atomic noble metal electrode can include a PANI-noble metal$_N$ complex, where N is between 2 and 10. N can also be 3.

The atomic noble metal electrode can be prepared by coating an electrode with a PANI film, preconditioning the PANI film by overoxiding the PANI film, creating a PANI-noble metal-X$_4^-$ complex, and reducing the PANI-noble metal-X$_4^-$ complex to form an atomic noble metal-PANI complex. The steps of creating a PANI-noble metal-X$_4^-$ complex and reducing the PANI-noble metal-X$_4^-$ complex to form an atomic noble metal-PANI complex can be repeated N−1 times to create a conductive polymer-noble metal$_N$ complex. N can be between 2 and 10. In some embodiments, at least two different noble metals are used.

An embodiment of the disclosure can include a device incorporating the conductive polymer-noble metal electrode. In an embodiment, the device can be a fuel cell comprising an atomic noble metal electrode and a fuel source. The atomic noble metal electrode can be a platinum and PANI-noble metal$_N$, and the fuel source can be an alcohol. N can be from 2 to 10, or can be 3.

BRIEF DESCRIPTION OF THE FIGURES

The following Detailed Description is better understood when read in conjunction with the appended drawings. For the purposes of illustration, there is shown in the drawings exemplary embodiments, but the subject matter is not limited to the specific elements and instrumentalities disclosed.

FIG. 12 B illustrates FTIR peak areas (-◆-) and peak shifts (---▲---) of the peak for the N—H stretching at 3300 $cm^{-1}$ for PANI/$Au_N$ for N=0-8 showing an odd-even alternating pattern, in accordance with an exemplary embodiment of the disclosure.

DETAILED DESCRIPTION

Figure 1A:
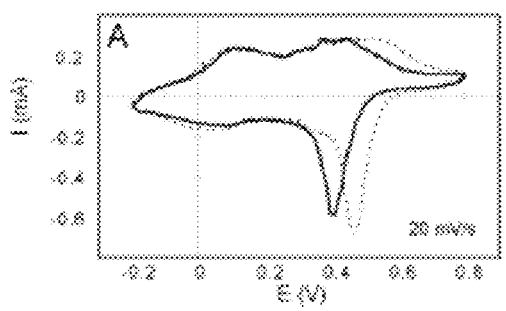
FIG. 1 A-C illustrate CVs of PANI before (---) and after (-) holding at +0.8V for 300 s in (A) 0.1M HCl, (B) 0.1M $HBF_4$ and (C) 0.1M $HClO_4$, in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Voltages discussed herein and claims relying on those voltage values are expressed with reference to a standard electrode, in this case the standard silver electrode, Ag/AgCl in 0.1M HCl. One of ordinary skill in the art would recognize that voltage values may be different if the reference electrode is something other than Ag/AgCl, e.g. a standard hydrogen electrode, etc.

Various embodiments of the disclosure are related to an atomic gold electrode (AGE.) By atomic gold electrode is meant an electrode that comprises gold atoms present in groups at a very low value, effectively only several atoms per cluster. Gold nanoparticles are known in the art, but the atomic gold composites set forth herein at no more than 50 gold atoms per cluster, preferably no more than about 20 gold atoms per cluster, no more than 10 gold atoms per cluster, or no more than 8 gold atoms per cluster. In some embodiments, the atomic gold composites can be 2, 4, or 6 gold atoms per cluster.

In an exemplary embodiment, the atomic gold electrode can be a polyaniline gold complex or composite, denoted PANI-Au$_N$. Polyaniline can be abbreviated PANI, and can be a described as a polymer of aniline, often formed under electrochemical conditions, and having a structure exemplified by FIG. 4. Because polyaniline is a polymer of aniline subunits, each unit can be described as having a nitrogen, or amino, or imino atom. PANI-Au$_N$ then describes a polyaniline with atomic gold associated with it, i.e. a complex or a composite. The designation of N indicates the number of gold atoms in each individual cluster in the PANI matrix. In a bulk portion of polyaniline, the number of Au$_N$ clusters on the polyaniline can be described with respect to the number of nitrogen atoms in the PANI. Generally, the ratio of Au$_N$ to nitrogen atoms is less than about 20%, i.e. 1 Au$_N$ per 5 nitrogen atoms. In an exemplary embodiment, the Au$_N$ to nitrogen ratio is less than or equal to 15%, preferably less than or equal to 10%.

In one embodiment of the disclosure, an atomic gold electrode can be prepared or made according to the following process. Initially, an electrode can be coated with a polyaniline film. Alternatively, an electrode already coated with a PANI film can be obtained. The polyaniline film can be preconditioned by overoxidizing the PANI film. A PANI-AuX$_4^-$ complex can be created, and the PANI-AuX$_4^-$ can be reduced to form an atomic gold-PANI complex, optionally described at PANI-Au$_1$.

In order to prepare PANI-Au$_N$ complexes, where N is greater than 1, the steps of creating a PANI-AuX$_4^-$ and reducing the PANI-AuX$_4^-$ to PANI-Au$_N$ can be repeated (N−1) number of times. For example, in order to get a PANI-Au$_2$ complex, the steps would be repeated N−1 times, or 2−1=1 time. The first complex would be an initial PANI-Au$_1$, and the repeated step once would give a PANI-Au$_2$ complex.

In coating the polyaniline film on the electrode, an electrode can be treated with an aniline solution while maintaining the electrode at a positive voltage. In an embodiment, the voltage can be maintained at about +0.8, about +0.85 and preferably about +0.9 V. The aniline solution can be an aqueous solution, preferably an acidic aqueous solution. The acidic solution can be HCl, HBF$_4$, HClO$_4$ or other strong acid, preferably HBF$_4$. In an embodiment, the concentration can be 0.1M aniline solution In an alternate embodiment, an electrode containing a polyanilne film can be obtained and submitted to the additional steps. In some embodiments, the electrode can also comprise platinum as part of the electrode onto which the PANI-Au$_N$ is prepared, for example, a platinum electrode can be used to prepare the initial PANI film, and subjected to the subsequent steps.

In an embodiment, the polyaniline film on the electrode can be preconditioned by overoxidizing the PANI film. The atom-by-atom deposition of gold into polyaniline (PANI) through a repeated cyclic pathway has been reported previously, but the efficiency of the preparation was complicated by concurrent oxidative degradation of PANI in the course of the gold deposition process, resulting in the loss of the deposited matrix. The preconditioning of the PANI minimizes the loss of the matrix by separating the PANI degradation and the atomic gold deposition parts of the cycle. The overoxidation of PANI can be performed as a preconditioning step, prior to the gold deposition cycles. As discussed in the Examples, the FTIR spectra obtained after preconditioning on the stabilized PANI film show that the imine attachment sites for the chloroaurate anion are still available. The presence of the deposited gold on the cyclic voltammograms of the PANI film could be easily observed. The work function of the prepared composite films increased linearly with the logarithm of number of gold deposition cycles. Preconditioning the polyaniline film can include cycling the voltage of the electrode from about +0.7 V to about −0.2 V one or more times, including up to about 5 times, up to about 10 times, or more. Preconditioning the polyanilne film can include then holding the voltage at a positive voltage for a period of time necessary to condition the polyaniline film. This can include a voltage of at least about 0.7V, at least about 0.75 V, or at least about 0.8 V. The voltage can be maintained at this positive level for at least about 20 minutes, at least about 30 minutes, at least about 45 minutes or at least about 60 minutes. The preconditioning can be conducted in an acidic aqueous solution, including an acidic solution of HCl, HBF$_4$, or HClO$_4$, preferably HCl. Without wishing to be bound by theory, the preconditioning is thought to produce a better deposited matrix, which is presumably more uniform than then initially highly polydisperse polyaniline film. By preconditioning, the later formed PANI-Au$_N$ complex can form properly and not degrade and fail during initial preparation or later use.

In an embodiment, to the polyaniline film on the electrode can then be added the gold to create the PANI-AuX$_4^-$ complex. The PANI-AuX$_4^-$ complex can be created by applying a voltage of about 0.7V to the PANI film on the electrode and applying a AuX$_4^-$ solution to the electrode. A voltage of 0.7V can be effective for fully oxidizing the PANI film, although voltages 0.05 above or below that value may also be effective. The fully oxidized PANI film can be exposed to the AuX$_4^-$ solution for at least 30 seconds, preferably at least about 40 or at least about 50 second. An exposure of 40 to 60 seconds, optimally 50 seconds, can be typical, although a longer time can be used as well.

The AuX$_4^-$ solution can be described in several aspects. In an embodiment, the AuX$_4^-$ necessary contains a metal counterion, and can be any counterion that allows for high solubility of the AuX$_4^-$, including preferably sodium or potassium. In an embodiment, the AuX$_4^-$ solution can be any aqueous acidic solution, based on any strong acid solution, including but not limited to sulfuric, HBF$_4$, hydrochloric, hydrobromic, hydroiodic, and perchloric acid solutions. In an embodiment, the solution can be an aqueous solution of HClO$_4$. Generally, X can be any soluble gold halide. In an embodiment, X can be chloride, bromide or iodide, cyanate, or thiocyanate or a mixture thereof. In an exemplary embodiment, X can be a chloride, bromide or iodide, preferably a chloride or bromide.

After exposure to the AuX$_4^-$ solution, the PANI-AuX$_4^-$ complex on the electrode can be rinsed to remove residual AuX$_4^-$ solution. A period of time can be included to allow the AuX$_4^-$ to fully diffuse into the bulk of the PANI film, over a period of a couple minutes, optimally about 5 minutes (300 seconds).

The PANI-AuX$_4^-$ can then be reduced to produce the PANI-Au$_N$ complex. In an embodiment the PANI-AuX$_4^-$ is reduced at a voltage of −0.2 V, and optionally sweeping the voltage from 0.7 V to −0.2 V. The sweep can be repeated several times to ensure complete reduction, including up to about 5 times, or more.

Following reduction to form the PANI-Au$_N$ complex, i.e. the atomic gold PANI electrode with N=1, the steps of creating a PANI-AuX$_4^-$ complex and reducing the complex can be repeated to add additional gold atoms sequentially to each individual PANI-Au$_N$ complex. For each cycle that is completed, and additional gold atom is added, such that, for example a PANI-Au$_4$ complex can be created by conducting a total of four consecutive cycles, also characterized as the initial and three repeat cycles. PANI-Au$_N$ complexes can then be created for any number of N, up to the functional capacity of the polyaniline. That capacity can vary depending on several factors. N could potentially be up to 50. In an embodiment, N can be from 1 to 20. In some embodiments, N can be from 1 to 10, which allows for carefully crafted collections of gold complexes of a mere 10 atoms or less. In some embodiments, N can be from 1 to 8, or from 2 to 8. Under some exemplary embodiments, gold PANI complexes can have gold clusters of an even number of 2, 4 or 6.

Polyaniline polymerized from an acidic medium has been used as a support matrix for the insertion of metal clusters. It is a stable conjugated polymer, which is unique due to its ionic and electronic conductivity. Electropolymerization of aniline can be done in acidic medium and results in the protonated emeraldine (semiquinone) form of PANI. The protonated imine functionality of the PANI can have a strong affinity for certain complexed metal anions. Thus, in an embodiment, the strong complexation of AuCl$_4^-$ can be utilized in a step-wise insertion of Au clusters into the PANI matrix. Under some circumstances, this redox-driven process can occur spontaneously, just by dipping the platinum coated polyaniline (Pt/PANI) electrode into the solution containing AuCl$_4^-$, resulting in polydispersed gold clusters, imbedded in the PANI matrix. In this reaction, PANI in its emeraldine form acts as a reducing agent, which reduces AuCl$_4^-$ to metallic gold clusters of various sizes. However, limited control, or no control, over the size of the inserted Au particles can be used for selection of experimental conditions during this "top down" deposition. In contrast, the disclosed process can provide precisely controlled "bottom-up" deposition processes for metal insertion, in step-wise atom-by-atom, defined deposition cycles.

The size control can be aided by the stoichiometry of the PANI-AuCl$_4^-$ complex formation, while the spontaneous reduction is suppressed by precise and synchronized potential control. Thus, an embodiment can be a PANI matrix containing Au$_N$ clusters with N=0 and 2-7. The electrochemical behavior of the electrodes demonstrated the predicted odd/even pattern of the fluctuation of the HOMO/LUMO gap energy.

In one embodiment, the PANI/Au$_N$ composites can be made with N=0 to 8 numbers of gold atoms. The composite can be prepared by a cyclic insertion of atom-by-atom of gold into PANI, by continuously controlling the oxidation potential of PANI and the exchange of the precursor medium throughout the gold insertion cycle.[35] Maintaining the PANI in high oxidation state can be necessary in order to avoid spontaneous reduction of AuCl$_4$ to gold by the emeraldine form of PANI.

To show that the gold atoms deposited are not just many single atoms, but clusters of Au$_N$ for N=0 to 8, this disclosure uses the oxidation of n-propanol (nPrOH) on gold as a marker to confirm the odd-even behavior of the clusters. The atomic gold clusters are assumed to reside in the vicinity of nitrogen sites in the PANI chain and should affect the N—H stretching frequencies in the IR spectrum according to their size. The FTIR spectra disclosed herein further confirm the theoretically predicted odd-even pattern of behavior of these materials.

The oxidation of n-propanol in alkaline medium show very low activity on Pt electrode. In contrast, gold shows high oxidation activity in alkaline solution because it is relatively immune to surface poisoning caused by side products of the primary alcohol oxidation. Furthermore, it has been shown that bulk Au, as well as gold clusters of 2 to 5 nm supported on inorganic oxides or active carbon, is a highly active, selective, and recyclable catalyst for the oxidation of alcohols into aldehydes and ketones using oxygen at atmospheric pressure as the oxidant in the absence of solvent and base. Unusual electrocatalytic activity was observed for oxidation of methanol on gold nanoparticles in alkaline media synthesized in water-in-oil microemulsions using a rotating disk electrode.

Without wishing to be bound by theory, for the catalytic oxidation of n-propanol in alkaline solutions, the mechanism has been explained by the OH$^-$ anion adsorption onto the gold. The oxidation of the alcohol then occurs through hydrogen bridges formed between the hydroxyl group of the alcohol and the adsorbed anions. Although oxidation currents are much higher on bulk electrodes, the voltammetric characteristics are similar in both cases.

Because catalytic performances of gold clusters can depend on their preparation methods, support matrix, and their size, the atomic gold electrodes of this disclosure can be on the support matrix polyaniline (PANI) deposited on an electrode. PANI containing metal precipitates and PANI modified electrodes, can show electrocatalytic oxidation of primary alcohols in alkaline and acidic medium, but the catalytic effect can be higher in the alkaline medium.

In an embodiment, the disclosure can describe a method of oxidizing an alcohol on an atomic gold electrode. The atomic gold electrode can include a PANI-$Au_N$ complex, with N of 1 to 20, preferably 1 to 10, or 1 to 8. In some embodiment, N can be an even number between 1 and 20, such as 2, 4 or 6. In an alternate embodiment, N can be 7. In an embodiment, the oxidation can be conducted in a solution phase, or an aqueous solution phase. In an embodiment, the solution can be a basic solution, or in a basic aqueous solution.

In an embodiment, the alcohol can be any alcohol capable of undergoing an oxidation, including for example, methanol, ethanol, propanol, butanol and so forth. Isomers of the alcohol can also be oxidized. The alcohol can also include an —OH substituent on a larger organic compound. In an exemplary embodiment, the alcohol can be methanol, ethanol, propanol, butanol, propanediol, or butanediol, isomers thereof, and mixtures thereof. In another exemplary embodiment, the alcohol can be methanol, ethanol, or propanol, and mixtures thereof.

Based on these studies, an embodiment of the disclosure can be the use of the gold nanoclusters in even-numbered clusters of gold atoms. The gold clusters can be from 0-20 gold atoms, preferably from 2-10 and more preferably from 2-8. Preferably the gold clusters contain an even number of gold atoms.

In an embodiment of the method of oxidizing an alcohol, the AGE can be prepared according to the method described above. For example, the atomic gold electrode can be prepared by coating an electrode with a polyaniline film, preconditioning the polyaniline film, creating a PANI-$AuX_4^-$ complex and reducing to form a PANI-$Au_N$ complex. In some embodiments, the electrode can also comprise platinum as part of the electrode onto which the PANI-$Au_N$ is prepared.

With access to and a method of using gold nanoclusters provided, particularly for even numbered nanoclusters of 2 to 20 gold atoms, several different aspects of the disclosure can be demonstrated. In one aspect, the PANI-atomic Au materials can be stable and insoluble and can be used in a method as a heterogeneous catalyst for several different reactions. By way of example, the method of using the materials can include reactions in a solution phase, in a gas phase, or in a combination. The method can include using the PANI-atomic AU materials in electrochemical oxidation reactions.

Substrates for use in the disclosure can include oxygenated hydrocarbons, such as aliphatic and aromatic alcohols, acids, esters and similar "fuels" used as feedstocks in fuel cells and other energy producing devices. Substrates can also include amines for oxidation.

In one particular embodiment, the substrate can be methanol or ethanol, preferably methanol, in fuel cells, where the reactivity of the gold polyaniline materials can provide access to reactive surfaces. In another embodiment, the substrate can be carbon monoxide, for example in the oxidation reaction on a catalytic converter or industrial towers and scrubbers.

Thus, in one exemplary embodiment, a fuel cell can be created using the PANI-$Au_N$ complex, or the atomic gold electrode, as part of the cell. Thus, a fuel cell can comprise an atomic gold electrode and a fuel source. The atomic gold electrode can be a PANI-$Au_N$ complex, as described above. The base electrode onto which the PANI-$Au_N$ is present can comprise platinum. In some embodiments, the fuel source can comprise an alcohol, including for example, methanol, ethanol, propanol, butanol, propanediol, or butanediol, isomers thereof, and mixtures thereof, or instead methanol, ethanol, or propanol, and mixtures thereof.

In an alternate embodiment, an electrochemical device relying on a gold catalyst can be created using the PANI-$Au_N$ complex, or atomic gold electrode, as part of the device.

In an embodiment, several materials can be used to accept the electrons from the substrate when the method involves oxidation of a material. One preferred material would be oxygen as the final recipient of the electrons from the substrate, particularly in a fuel cell. Other materials known to those skilled in the art may also be used, such as, for example, a peroxide or other oxidants as typically used.

In the absence of solvent, i.e., in the gas phase, the direct catalytic oxidation of hydrocarbons can be possible on atomic clusters. Such reaction can be impeded by adsorption of CO in case of noble metals, in which bulk atoms greatly exceed the number of available surface Au atoms. The main application area can be environmental, in which gaseous impurities are destroyed by the catalysts.

In yet another embodiment, the materials can be used in chemical sensing. For example, oxidation of glucose to gluconic acid is highly selectively catalyzed by enzyme glucose oxidase. This is the cornerstone reaction for chemical sensors used for monitoring glucose levels in diabetes. The problem in that scheme is the regeneration of the reduced form of the enzyme under anaerobic conditions and also poor stability of the enzyme. Atomic Au catalyst can facilitate enzyme-free, direct electrochemical oxidation of glucose, thus enabling new class of glucose sensors.

One advantage of the materials used in embodiments of the disclosure is that the atomic Au based catalysts can replace the bulk metal, thus decreasing the cost of catalysts. That has been the main thrust of decreasing the size of the catalytic particles, i.e., nanocatalysts. The second advantage and distinguishing feature of the disclosure even over nanocatalysts lies in the electronic structure of atomic clusters, where number of atoms does not exceed 20. On that scale the catalytic activity can be uniquely affected by the odd-even number of atoms rather than by the overall size of the clusters. That aspect can be demonstrated by a dramatic increase of catalytic efficiency in electro-oxidation of n-propanol and other aliphatic alcohols.

The electrochemical behavior of these AGEs can be compared with that of macro gold and platinum coated PANI electrodes by testing electrochemical oxidation of n-propanol and iso-propanol. These AGEs then can separate the behavior dominated by that of macroscopic gold in strongly alkaline medium and by that of the quantized odd/even effect of atomic gold. Within this overarching scope there can be a specific oxidation pattern attributable to the differences between the two isomers of propanol. The AGEs can then demonstrate a high specific catalytic activity gold, which can be at least three orders of magnitude higher than that of bulk gold. A substantial saving of the precious metal can then be realized without the loss of catalytic activity in catalysis, in fuel cells and in other energy conversion devices.

Various embodiments of the disclosure are related to a hetero multi-atomic electrode. By hetero multi-atomic gold electrode is meant an electrode that comprises a mixed metal cluster of atoms present in groups at a very low value, effectively only several atoms per cluster. The hetero multi-atomic composites set forth herein at no more than 50 metal atoms per cluster, preferably no more than about 20 metal atoms per cluster, no more than 10 metal atoms per cluster, or no more than 8 metal atoms per cluster. In some embodiments, the atomic gold composites can be 2, 3, 4, or 6 metal atoms per cluster.

The mixed metal cluster can comprise atoms of at least two different metals. Preferably, the at least two metals are noble metals. The at least two noble metals can include ruthenium, rhodium, palladium, silver, osmium, iridium, platinum, and gold. Preferably, the at least two noble metals are selected from ruthenium, rhodium, palladium, and gold. More preferably, one of the at least two metals is gold, while another is palladium. In an embodiment, the at least two noble metal atoms includes gold and palladium, and the atoms of each mixed metal cluster have the terminal arrangement of Pd—Au.

In an exemplary embodiment, the hetero multi-atomic noble metal electrode can be a conductive polymer-noble metal complex. The conductive polymer can be polyaniline, polypyrrole, or polypyridine. Preferably, the conductive polymer is polyaniline, and the polyaniline-noble metal complex or composite, is denoted PANI-noble metal$_N$. Polyaniline can be abbreviated PANI, and can be a described as a polymer of aniline, often formed under electrochemical conditions, and having a structure exemplified by FIG. 4. Because polyaniline is a polymer of aniline subunits, each unit can be described as having a nitrogen, or amino, or imino atom. PANI-noble metal$_N$ then describes a polyaniline with atomic noble metal associated with it, i.e., a complex or a composite. The designation of N indicates the number of metal atoms in each individual mixed metal cluster in the PANI matrix.

In one embodiment of the disclosure, an atomic gold electrode can be prepared or made according to the following process. Initially, an electrode can be coated with a conductive polymer film. Alternatively, an electrode already coated with a conductive polymer film can be obtained. The conductive polymer film can be preconditioned by overoxidizing the conductive polymer film. A conductive polymer-noble metal-$X_4^-$ complex can be created, and the conductive polymer-noble metal-$X_4^-$ can be reduced to form an atomic noble metal-conductive polymer complex, optionally described as conductive polymer-noble metal$_1$.

To prepare conductive polymer-noble metal$_N$ complexes, where N is greater than 1, the steps of creating a conductive polymer-noble metal-$X_4^-$ and reducing the conductive polymer-noble metal-$X_4^-$ to conductive polymer-noble metal$_N$ can be repeated (N−1) number of times. For example, to get a conductive polymer-noble metal$_2$ complex, the steps would be repeated N−1 times, or 2−1=1 time. The first complex would be an initial conductive polymer-noble metal$_1$, and the repeated step once would give a conductive polymer-noble metal$_2$ complex. Preferably, the two noble metals (noble metal$_2$) are different noble metals.

In coating the conductive polymer film on the electrode, an electrode can be treated with a conductive polymer solution while maintaining the electrode at a positive voltage. In an embodiment, the voltage can be maintained at about +0.8, about +0.85 and preferably about +0.9 V. The conductive polymer solution can be an aqueous solution, preferably an acidic aqueous solution. The acidic solution can be HCl, HBF$_4$, HClO$_4$ or other strong acid, preferably HBF$_4$. In an embodiment, the concentration can be 0.1M conductive polymer solution.

In an alternate embodiment, an electrode containing a conductive polymer film can be obtained and submitted to the additional steps. In some embodiments, the electrode can also comprise platinum as part of the electrode onto which the conductive polymer-noble metal$_N$ is prepared, for example, a platinum electrode can be used to prepare the initial conductive polymer film, before being subjected to the subsequent steps.

In an embodiment, the conductive polymer film on the electrode can be preconditioned by overoxidizing the conductive polymer film. The atom-by-atom deposition into conductive polymers such as PANI through a repeated cyclic pathway has been reported previously, but the efficiency of the preparation was complicated by concurrent oxidative degradation of PANI in the course of the deposition process, resulting in the loss of the deposited matrix. The preconditioning of the conductive polymer minimizes the loss of the matrix by separating the conductive polymer degradation and the atomic noble metal deposition parts of the cycle. The overoxidation of conductive polymer can be performed as a preconditioning step, prior to the deposition cycles. As discussed in the Examples, the FTIR spectra obtained after preconditioning on the stabilized PANI film show that the imine attachment sites for the chloroaurate anion are still available. The presence of the deposited metal on the cyclic voltammograms of the PANI film could be easily observed. The work function of the prepared composite films increased linearly with the logarithm of number of deposition cycles. Preconditioning the conductive polymer film can include cycling the voltage of the electrode from about +0.7 V to about −0.2 V one or more times, including up to about 5 times, up to about 10 times, or more. Preconditioning the conductive polymer film can include then holding the voltage at a positive voltage for a period of time necessary to condition the conductive polymer film. This can include a voltage of at least about 0.7V, at least about 0.75 V, or at least about 0.8 V. The voltage can be maintained at this positive level for at least about 20 minutes, at least about 30 minutes, at least about 45 minutes or at least about 60 minutes. The preconditioning can be conducted in an acidic aqueous solution, including an acidic solution of HCl, HBF$_4$, or HClO$_4$, preferably HCl. Without wishing to be bound by theory, the preconditioning is thought to produce a better deposited matrix, which is presumably more uniform than then initially highly polydisperse conductive polymer film. By preconditioning, the later formed conductive polymer-noble metal$_N$ complex can form properly and not degrade and fail during initial preparation or later use.

In an embodiment using PANI, the hetero mixed metal clusters can be prepared using a cyclic deposition where one atom is deposited per amine site on the conductive polymer per cycle. The first prerequisite of this cycle appears to be the high affinity of certain metal halo-anions for the protonated imine group of the oxidized conductive polymer and the formation of strong complexes with this group. The second prerequisite appears to be the reduction of the halo-complex attached to the matrix of the conductive polymer as it is reduced in the absence of the free halo-anion. The complete removal of excess metal anions prior to lowering the redox potential of the matrix appears to be an essential condition for the successful deposition of one metal atom in one cycle. The number of metal atoms in the final cluster is then determined by the number of these cycles. The number of metal atoms in the mixed metal cluster can be from 2 to 10 metal atoms. Tri-atomic clusters have three metal atoms.

By having a point of attachment as a geometric reference point, the heteroclusters have more isomers than the homoclusters. It is expected that atomic clusters comprising more than three atoms in a heterocluster will have an even larger number of possible isomers.

Reference will now be made in detail to specific aspects of the disclosed materials, compounds, compositions, articles, and methods, examples of which are illustrated in the accompanying Examples and Figures.

EXAMPLES

Example 1: Polyaniline Doped with Atomic Gold

A deposition of one atom of gold per imine site on PANI that followed a cyclic pathway was previously attempted in which the electrochemical control of the redox state of the PANI film was maintained throughout the deposition cycle. Previously, for each cycle, the potential of the PANI film was held at +0.8V for 300 s in a specially designed flow through cell, in order to keep it in a fully oxidized state while exposing it to solution of $AuCl_4$ to form a stoichiometric PANI*$AuCl_4$ complex. After all the excess $AuCl_4^-$ was thoroughly rinsed away, the $AuCl_4^-$ retained by the PANI was reduced to atomic gold by sweeping the potential to −0.2 V. It is assumed that the atom(s) of metallic gold remain at or close to the imine sites of PANI, which are then again available for $AuCl_4^-$ complexation in the next gold deposition cycle. The localization of the metallic gold is assumed to be aided by formation of the local contact potential between Au and the imine site. Maintaining the high oxidation state of PANI was essential in order to avoid the spontaneous reduction of gold.

In that process, the atomic gold deposition and the oxidative degradation of PANI at +0.8V were occurring simultaneously making it difficult to gain clear information on the impact of the deposited gold on the electrochemical behavior of PANI. The degradation process is caused by breaking of the polymer chains due to formation of quinones or quinone imines resulting in the loss of the material. The rate of the degradation depends on several factors including the type of the anion in the acidic media, the length of time the film is held at the overoxidation potential, the magnitude of the applied potential, and the thickness of the film. The degradation of PANI follows a first order kinetics, so most of the damage will occur early, reaching a stable material. It has been shown that HCl promotes degradation faster than any other acids. Therefore the preconditioning degradation in HCl has been incorporated into the preparative procedure. As an alternative, the preparation was separated into two steps. First the matrix was prepared in stable state by performing the preconditioning degradation of PANI, and then use this optimized material under the optimized experimental conditions to minimize further degradation of the matrix.

Electrochemical Setup.

The electrochemical cell was a flow through cell that allowed the solutions to be exchanged while maintaining electrochemical contact to the film. The working electrode was a Pt film (1000 Å) coated on Ti (100 A) on a 10 MHz polished quartz crystal microbalance (QCM) (International Crystal Manufacturing OKC, OK, USA). The reference electrode was a Ag/AgCl in 0.1 M KCl, and the counter electrode was a bare Pt QCM. All cyclic voltammograms (CVs) were recorded at a scan rate of 20 mV/s. The applied potential to the film was controlled by an OMNI 90 potentiostat (Cypress Systems, Lawrence, Kans. USA). Solution flow through the flow cell was controlled by the rotating selector valve and syringe pump on a FIAlab flow injection system (Alitea Instruments, Medina, Wash. USA). All the solutions were vacuum-degassed prior to use in order to eliminate the formation of air bubbles inside the flow cell. Operations of the potentiostat and the flow injection system were controlled simultaneously using a Labview program.

Preparation of Stable Polyaniline Matrix.

The PANI film was deposited on one side of the QCM crystal (working electrode) from a 0.1M aniline/2M $HBF_4$ aqueous solution at a constant potential of +0.9V for 200 seconds. After the deposition of PANI, the flow cell was filled with 0.1M HU, and 10 CVs were completed from −0.2V to +0.7V before holding the film at +0.8V for 1 hour to overoxidize PANI. The film was rinsed with 0.1M HCl before 5 CVs were recorded. The thickness of the film (approximately 41.4.m) was determined by profilometry using a Dektak3ST surface profiler (SloanlVeeco Instruments, Inc.) with a speed of 400 µm/s and a stylus weight of 5 mg. This was the starting matrix for subsequent Au depositions.

Insertion of Gold Clusters into PANI.

After the preparative degradation step, the flow cell was rinsed with a solution of 0.1M $HClO_4$, and a total of 10 CVs were performed from −0.2V to +0.7V. The film was then held at +0.7V to keep the PANI in a fully oxidized state and was exposed to a solution of $10^{-4}$M K.$AuCl_4$ in 0.1M $HClO_4$ for 50 seconds to form a PANI*$AuCl_4$ complex. All excess $AuCl_4$ anions were thoroughly rinsed away with 0.1M $HClO_4$, and the potential was swept to −0.2V to reduce the complexed $AuCl_4$ to atomic gold. The holding time at +0.7V during the exposure to the chloroaurate solution and subsequent rinsing was 300 seconds to ensure diffusion of $AuCl_4$ to the bulk of the film. The final step was to perform 5 CVs from −0.2V to +0.7V. At this point, the film is ready to begin the next gold deposition cycle by holding the potential at +0.7V, so that it can be exposed to the chloroaurate solution.

Fourier Transform Infrared Spectroscopy (FTIR):

FTIR measurements were performed using a 1310-RAD FTS-6000 with a BIO-RAD UMA-500 IR microscope attachment in the range of 700-3800 wavenumbers. IR reflectance spectra were obtained using the rapid scan mode at a mirror modulation frequency of 20 kHz, with the aperture open, a filter setting of 5, and a resolution setting of 4 $cm^{-1}$. An average of 32 scans was used to produce each spectrum. The PANI samples were analyzed while still on the Pt QCM. Background spectra were obtained using the bare Pt surface on the QCM under the same spectroscopic conditions as the samples. The background was subtracted from the sample spectra using BIO-RAD WIN-IR PRO software. Areas and peak assignments were obtained using the same software.

Work Function.

The work function (WF) measurement of each film was obtained using a Besocke Delta-Phi-Electronik type S Kelvin Probe. It was measured in automatic balancing mode versus a vibrating gold grid reference electrode. The setting for the offset potential was 6.0V. A free-standing PANI*$Au_N$ film was obtained from the QCM by applying a −5.0V pulse for 1 s in 1M NaOH. To remove NaOH from the film, it was placed into dialysis tubing and dialysed against DI water overnight. The films were then mounted onto a metal Kelvin probe holder and dried. All WF measurements were run in triplicate.

Optimization of the Film Degradation Prior to Gold Deposition.

Figure 1B:
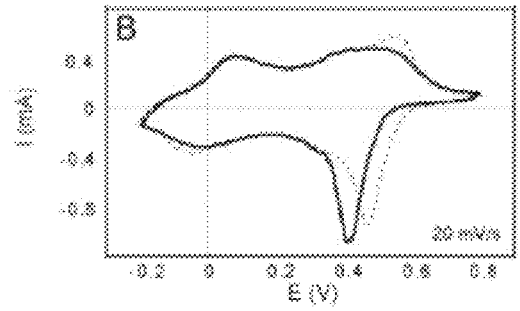
Figure 1C:
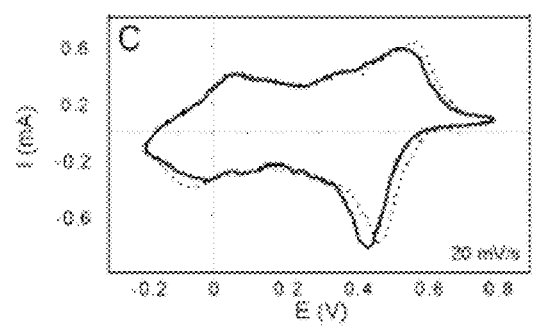

The PANI was first deposited from $HBF_4$. FIG. 1A-C compares how the initial CV of PANI from −0.2V to +0.8V is changing after holding PANI at +0.8V for 300 s in 0.1M HCl (FIG. 1A), in 0.1M $HBF_4$ (FIG. 1B), and in 0.1M $HClO_4$ (FIG. 1C) under the same conditions as the 0.1M HCl. PANI has two oxidation peaks in the initial CVs around +0.10V and +0.55V. The position of the oxidation peak around +0.55V was clearly affected by the anion of the acid. As the overoxidation of PANI occurs, these peaks tend to shift toward each other until they merge To determine the degree of degradation, the negative shift of the second oxidation peak of PANI was measured. It was observed that there was a shift of 87 mV in 0.1M HCl, 46 mV in $HBF_4$, and 32 mV in 0.1M $HClO_4$. Therefore, the rate of degradation follows the order of $HCl>HBF_4>HClO_4$. From this, the initial overoxidation of PANI was performed in 0.1M HCl.

Figure 2:
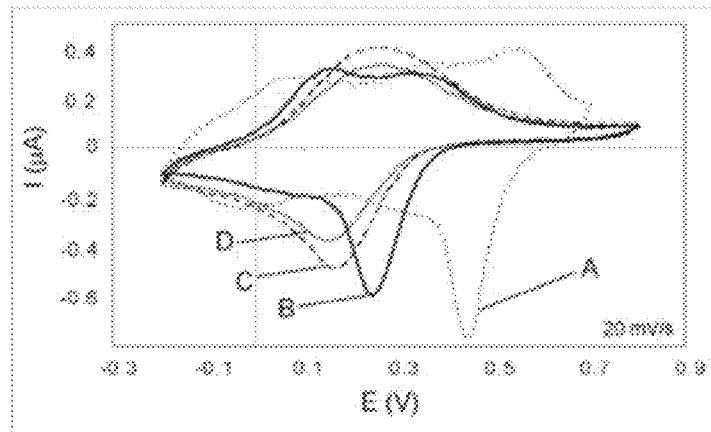
FIG. 2 illustrates CVs of PANI in 0.1M HCl (A) initially before overoxidation, (B) after 30 minutes at +0.8V, (C) after 60 minutes at +0.8V, and (D) after 90 minutes at +0.8V, in accordance with an exemplary embodiment of the disclosure.

Since the overoxidation of PANI follows first order kinetics, very little degradation occurs beyond a certain point. To determine the holding time to reach this point, a PANI film was held at +0.8V for 0, 30, 60, and 90 minutes as shown in FIG. 2. The shift in the second oxidation peak is again used to determine the extent of overoxidation. There is a peak shift of 212 mV between the initial CV and after 30 minutes, and a peak shift of 70 mV between 30 and 60 minutes. However, there is only a slight shift of 3 mV between the CV after 60 minutes and the CV after 90 minutes. From this, it was concluded that a holding time of 1 hr in 0.1M HCl would be sufficient to obtain a stable matrix for the gold deposition.

Figure 3:
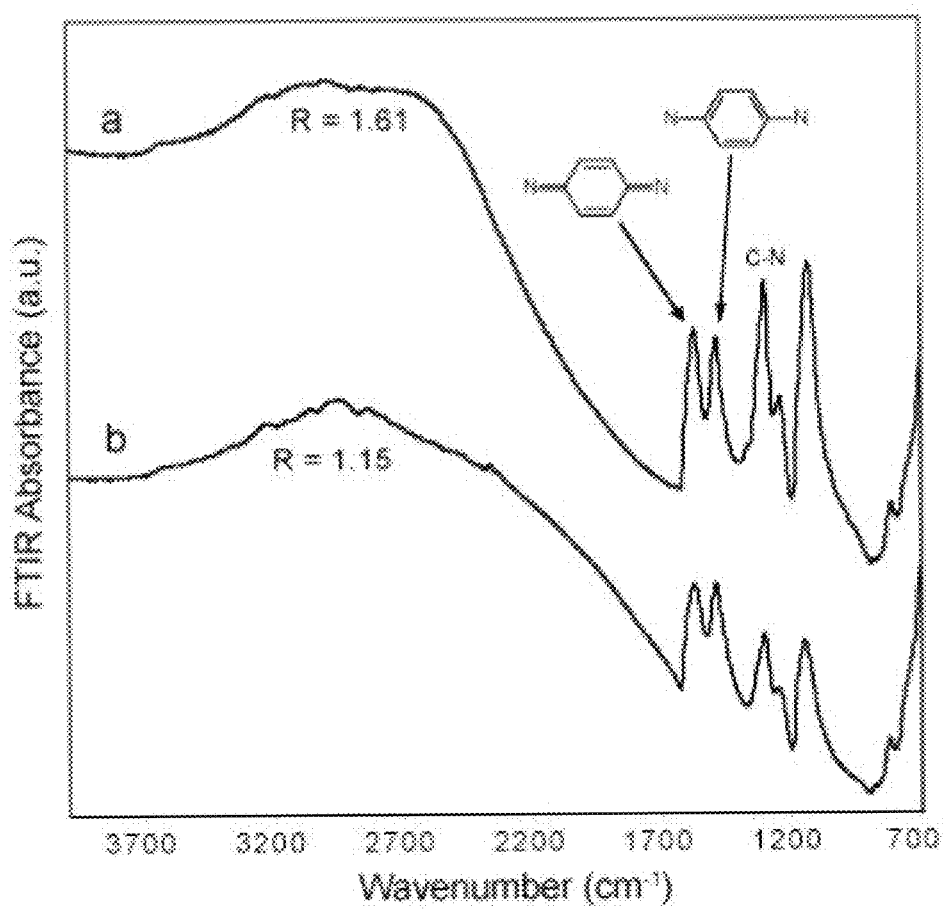
FIG. 3 illustrates FTIR spectra of (a) PANI and (b) PANI after 1 hr oxidative degradation at +0.8V in 0.1M HCl, in accordance with an exemplary embodiment of the disclosure.
Figure 4:
FIG. 4 illustrates the chemical structure of PANI and the formula for determining the oxidation state of the polymer, in accordance with an exemplary embodiment of the disclosure.

The FTIR spectra obtained for a freshly prepared PANI film after cycling in 0.1M HCl (trace a) and for the same film after a 1 hour overoxidation period at +0.8V (trace b) are shown in FIG. 3. The spectrum shows a small decrease in peak area as expected with mass loss due to overoxidation. The characteristic bands for the benzenoid and quinoid rings of PANI are located at 1495 and 1579 $cm^{-1}$ respectively and only slightly shift to 1492 and 1576 $cm^{-1}$ in the overoxidized PANI. The oxidation state of the polymer can be determined from the ratio (R) of these units (FIG. 4). The determined R values for PANI before and after overoxidation at +0.8V for 1 hour were 1.61 and 1.15, respectively. The composition of the PANI matrix changes slightly with the value of x going from 0.62 in PANI to 0.53 in the overoxidized film indicating that the number of quinoid units decreases. The change of shape of the CV shown in FIG. 2 indicates that the overoxidation affects the ion exchange properties of the PANI film. However, the imine sites needed for gold reduction are still present in the overoxidized film.

Minimizing the Film Degradation During Gold Deposition.

Further degradation of the films was minimized by optimizing the deposition conditions. The three parameters that have been changed were the holding time, the type of acid and the holding potential. The changes are elaborated below.

Exposure to the chloroaurate solution and subsequent rinsing while held at a potential of +0.8V in our previous method was 550 s. This time was reduced to 300 s while maintaining the same amount of time for chloroaurate exposure as well as using the same volume of solution for the subsequent rinsing step.

The solution during the gold deposition was changed from 0.1M HCl to 0.1M $HClO_4$ which showed the least amount of degradation in FIG. 1C.

Figure 5A:
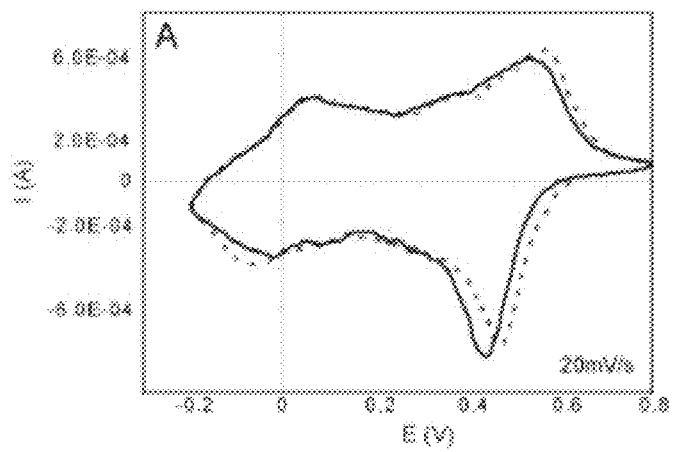
FIG. 5 A-C illustrate CVs of PANI in 0.1M $HClO_4$ before (---) and after (-) 300 s of holding the potential at (A) +0.8V, (B) +0.7V, and (C) +0.65V, in accordance with an exemplary embodiment of the disclosure.
Figure 5B:
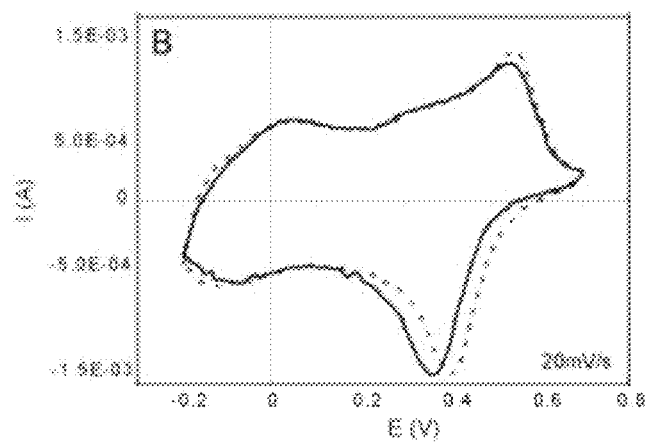
Figure 5C:
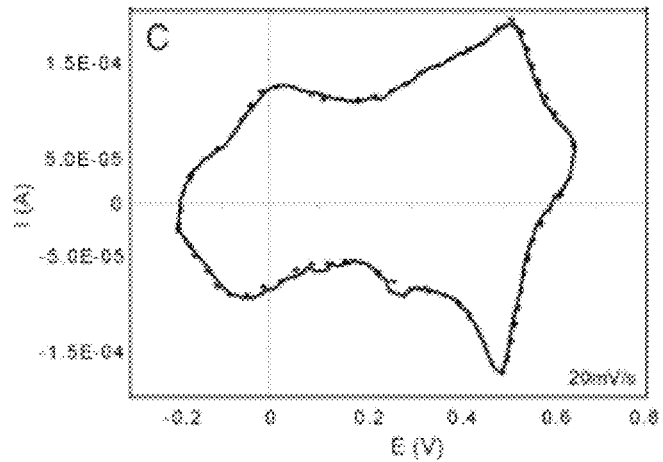

PANI was held at three different overoxidation potentials in 0.1M HClO4 for 300 s. FIGS. 5A, 5B, and 5C shows the initial and final CVs after holding a PANI film at a potential of −F0.80V, +0.70V, and +0.65V respectively. The initial and final CVs were obtained from −0.2V to the overoxidation potential. Once again, the negative shift of the second oxidation peak from the initial CV to the final CV was used to determine the extent of overoxidation. It was found that there was a shift of 32 mV after holding the film at +0.80V, 17 mV at +0.70V, and 0mV at +0.65V. The most favorable result was for the overoxidation potential of +0.65V. However, the final oxidation peak in the CV was not completed before the potential scan switched to the negative direction as seen in FIG. 5C. If any part of the film is not fully oxidized, there could be uncontrolled spontaneous reduction of the chloroaurate anion. Therefore, the optimal holding potential was determined to be +0.7V for the gold deposition cycles.

Figure 6A:
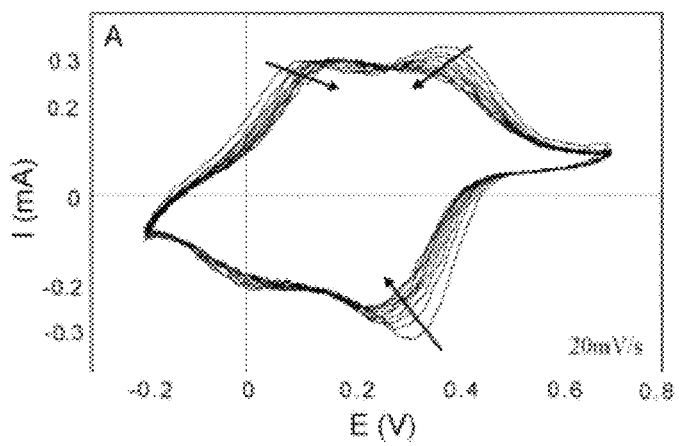
FIG. 6 A-B illustrate CVs for (A) PANI-$Au_0$ and (B) PANI-$Au_8$ taken before the first gold deposition cycle and after each deposition cycle for 1 through 8 cycles, in accordance with an exemplary embodiment of the disclosure.
Figure 6B:
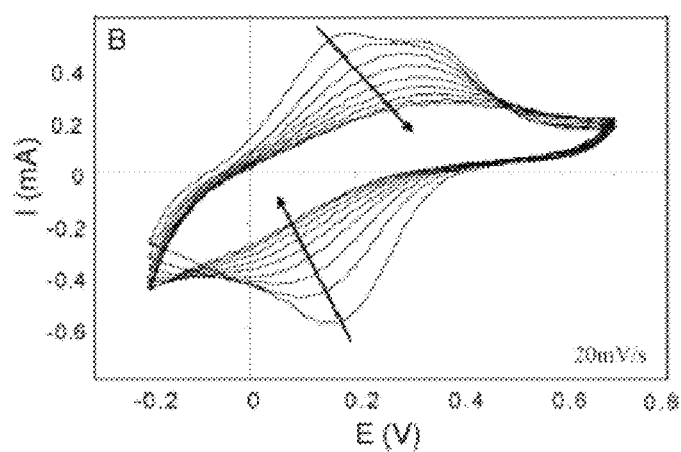

Gold Deposition:

Applying the optimized experimental conditions, the gold deposition into PANI followed the procedure described in the experimental section. The PANI/$Au_0$ sample underwent 8 gold deposition cycles, but during the step where the film was exposed to the chloroaurate solution, the film was only exposed to 0.1M $HClO_4$. FIG. 6A shows the CVs for this film through the 8 deposition cycles. The arrows show the progression of the peaks through the 8 cycles. The CVs were recorded from −0.2 to +0.7V in 0.1M $HClO_4$. The first CV was recorded after the degradation step, but before the gold deposition cycles begin. The subsequent CVs shown were taken just after the reduction of the $AuCl_4$ to atomic gold in each of the deposition cycles for a total of 9 CVs. The arrows indicate that the peaks shift slightly from the initial CV through the 8 cycles which is typical of a small amount of overoxidation. Overall, there was nothing remarkable happening to this film through 8 atomic gold deposition cycles. FIG. 6B shows the CVs for the PANI-$Au_0$ sample taken at the same time periods as in the PANI-$Au_0$ sample. Again, the arrows indicate the shift of the peaks from the CV before the gold deposition cycles begin to the CV taken after the eighth cycle. There is a clear gradual progression from the initial CV to the final CV as more gold is deposited on the film. The final CV is now featureless and flat. It is clear that the number of deposited gold atoms has a major effect on the electrochemical properties of the film. At this point, it is not clear to us what is causing this effect, but the decrease of conductivity of the films would be consistent with the flattening of the CV. Our attempts to measure conductivity of the free standing film by four-point-probe technique failed due to the fragility of the film.

Evaluation of Charge Transfer Between PANI and Au.

The difference in the work function values of PANI and the deposited Au atoms will lead to the formation of a charge transfer complex within the film.

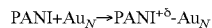

$PANI+Au_N \rightarrow PANI^{+\delta}-Au_N$

Figure 7:
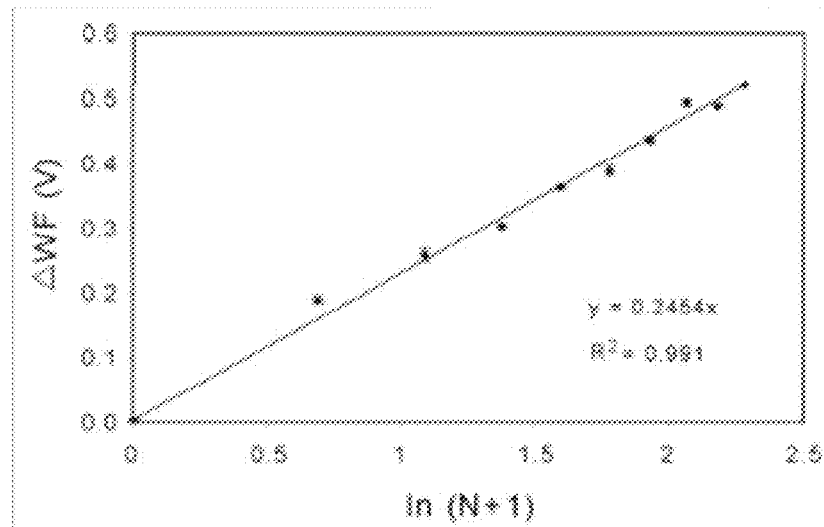
FIG. 7 illustrates relative changes in work function of PANI-$Au_N$ films for N=0-9 measured versus a vibrating gold grid reference electrode, in accordance with an exemplary embodiment of the disclosure.

The relative changes of the work function of the films prepared at neutral pH were determined versus the PANI film without gold, as shown in FIG. 7. In this type of measurement, it is assumed that the surface dipole component of the work function remains constant. There was a linear relationship with good correlation between the relative changes in WF and the natural logarithm of N+1 where N is the number of gold atoms deposited per imine site per cycle. The WF of the PANI/Au$_1$ films is 204 mV higher than PANI/Au$_0$ and increases to 565 mV higher for PANI/Au$_9$. In order to determine the charge transfer between PANI and the neutral gold atoms, an equation to calculate the charge transfer between neutral gas molecules and PANI was used, $$\Delta V_{WF} = \frac{kT}{2\delta e} ln(Au_N + 1)$$

where $\Delta V_{WF}$ is the measured changes in work function from PANI/Au$_0$, k is the Boltzmann constant, T is the temperature, δ is the fraction of charge shared between Au and PANI, and e is the charge. The equation was originally derived for charge-transfer doping with electrically neutral gas molecules. It is shown here that this relationship applies also to electrically neutral gold atoms which act as charge transfer dopant for the PANI. From the slope of the line, the partial charge transfer between the gold and stable matrix leads to the formation of a local contact potential difference of 52.2 mV. The linearity also suggests that the PANI matrix was stable, and that a consistent amount of gold was added during each cycle.

Pyrolytic microgravimetry was another method attempted to further characterize the films. Since the films were deposited on a QCM, the films were pyrolyzed in microwave oxygen plasma. It was hoped that the deposited gold would remain on the QCM while the organic matrix would be burned off, hence the mass of the deposited gold/cycle would be obtained. Although all films containing gold for N>6 showed increase of mass after the pyrolysis the correlation between the number of gold cycles N and residual mass was not reproducible and was statistically inconsistent. This experimental failure could be due to the fact that the kinetic energy of the plasma is too high and small gold clusters could have been dislodged and lost during the ashing step.

A major improvement of the preparative procedure of PANI*(Au$_N$) composites has been achieved and is reported here. A stable film for gold deposition was obtained from the overoxidation of PANI for 1 hour in 0.1M HCl. The FTIR spectra confirmed that the imine attachment sites for the chloroaurate anion were still present even after the overoxidation step although the typical ion exchange CV pattern of PANI has been lost. By minimizing the oxidative degradation during the gold atom deposition, the electrochemical effects that the deposited gold had on the PANI films were successfully observed. The oxidation and reduction peaks for the films gradually decreased as more gold was deposited until the CV became featureless, presumably due to increased resistivity of the film. The WF data show that the electron affinity of these composite films increased with the number of inserted gold atoms, i.e. with the number of cycles. The charge transferred between the PANI matrix and the incorporated gold was evaluated. The data indicates that there were a consistent number of gold atoms deposited per cycle at the same available imine sites.

Example 2: Odd-Even Pattern Observed in Polyaniline/(Au$_0$-Au$_8$) Composites

Electrochemical Preparation of Polyaniline Gold Composite Films.

The preparation of the PANI/Au$_N$ films, where N equals the number of gold deposition cycles, was described previously. Briefly, the PANI was deposited on one side of a Pt (1000 Å) coated on Ti (100 Å) 10 MHz polished quartz crystal (QC) (International Crystal Manufacturing OKC, OK, USA) from a 0.1M aniline/2M HBF$_4$ aqueous solution at a constant potential of +0.9V for 200 seconds in a flow through cell. The flow through cell housing the Electrochemical Quartz Crystal Microbalance (EQCM) arranged in a flow injection analysis (FIA) format allows exchange of solutions while maintaining the electrical contact to the PANI film throughout the preparation steps of a deposition cycle. All potentials are referenced to the Ag/AgCl in 0.1 M KCl. The counter electrode was bare Pt deposited on quartz crystal. The electrochemically active area (A=0.236 cm$^2$) on the crystal was defined by the o-ring. Cyclic voltammograms (CV) were recorded with an Omni 90 potentiostat (Cypress Systems Lawrence, Kans.) and the changes of mass were obtained from the Sauerbrey equation, using a PLO-10i phase lock oscillator (Maxtrek, Inc. Cypress, Calif.) and a model 53131A Universal Counter (Hewlett Packard Loveland, Co). All CVs were recorded with 20 mV/s scan rate. After coating the Pt electrode with PANI, the cell was rinsed with 0.1M HCl, and the electrode was conditioned first by applying 10 CVs from –0.2V to +0.7V and then holding the potential at +0.8V for 1 hour in this electrolyte. The average thickness of the PANI film prepared in this way was 4 µm, as determined by the contact profilometry, and the average mass of the deposited PANI was 43 nmoles. After the conditioning step the flow cell was rinsed with a 0.1M HClO$_4$, and total of 10 CVs were completed from –0.2V to +0.7V. The Au-cycle was initiated by holding the PANI at +0.7V while exposing it to solution of 10$^{-4}$M KAuCl$_4$ in 0.1M HClO$_4$ for 50 seconds. Maintaining this high potential, keeps PANI in a fully oxidized state and leads to formation of the PANI*AuCl$_4$- complex. The film was then rinsed of the excess of AuCl$_4^-$ with 0.1M HClO$_4$, and the potential was scanned to –0.2V in order to reduce AuCl$_4^-$ to atomic gold. The total holding time at +0.7V during the exposure to the chloroaurate solution and subsequent rinsing was 300 seconds. The final step was to perform 5 more CVs from –0.2V to +0.7V in order to bring the film to its defined final state. At this point, the material was ready for the next gold deposition cycle. The cycle was repeated N-times in order to form the PANI/Au$_N$ of the desired composition. The N deposition cycles were varied from N=0 to 8. CVs for the electro-oxidation of n-PrOH were recorded in 1M NaOH at a scan rate of 20 mV/s from –0.6V to +0.45V using a Solartron 511287 electrochemical interface. The reference electrode was an Ag/AgCl in 1M KCl, and the counter electrode was a platinum foil.

Fourier Transform Infrared Spectroscopy (FTIR):

FTIR measurements were performed with a BIO-RAD FTS-6000 with a BIO-RAD UMA-500 IR microscope attachment in the range of 700-4000 wavenumbers. IR reflectance spectra were obtained using the rapid scan mode at the mirror modulation frequency of 20 kHz, with the aperture open, filter setting of 5, and resolution setting of 4 cm. An average of 32 scans was used to produce each spectrum. The PANI samples were analyzed while still on the Pt QCM, Background spectra were obtained using the bare Pt surface on the QCM under the same spectroscopic conditions as the samples. The background was subtracted from the sample spectra using BIO-RAD WIN-IR PRO software. Areas and peak assignments were obtained using the same software.

Electro-Oxidation of n-Propanol.

Before conducting the oxidation of n-propanol using the PAN1/Au$_N$ composites, the CVs of the bare Pt electrode as well as of the PANI film deposited on Pt electrode (PANI/

Figure 8A:
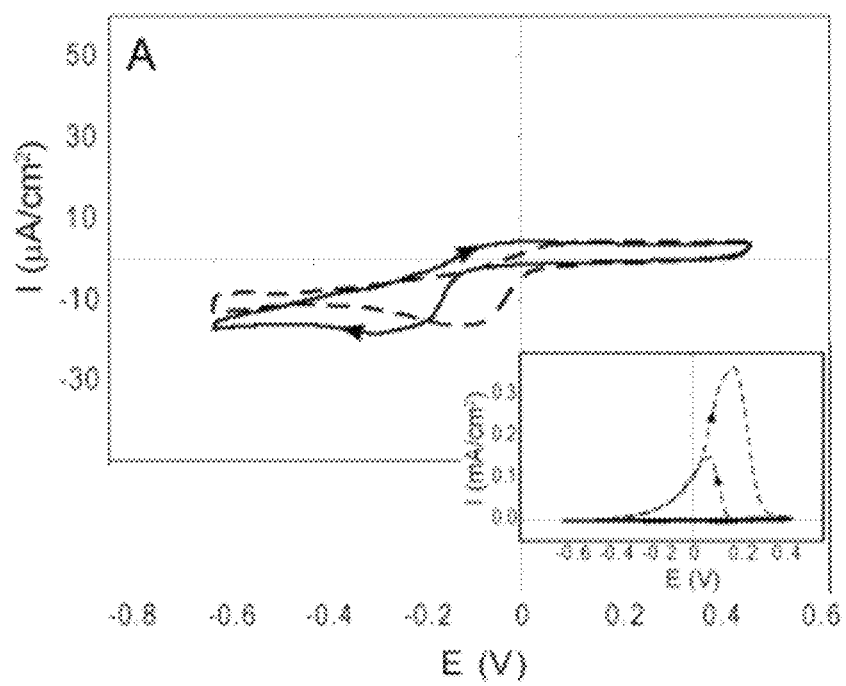
FIG. 8 A-B illustrate CVs of bare Pt (---) and PANI on Pt (-) in (A) 1M NaOH and in (B) 0.5M n-propanol in 1M NaOH at 20 mV/s, in accordance with an exemplary embodiment of the disclosure.
Figure 8B:
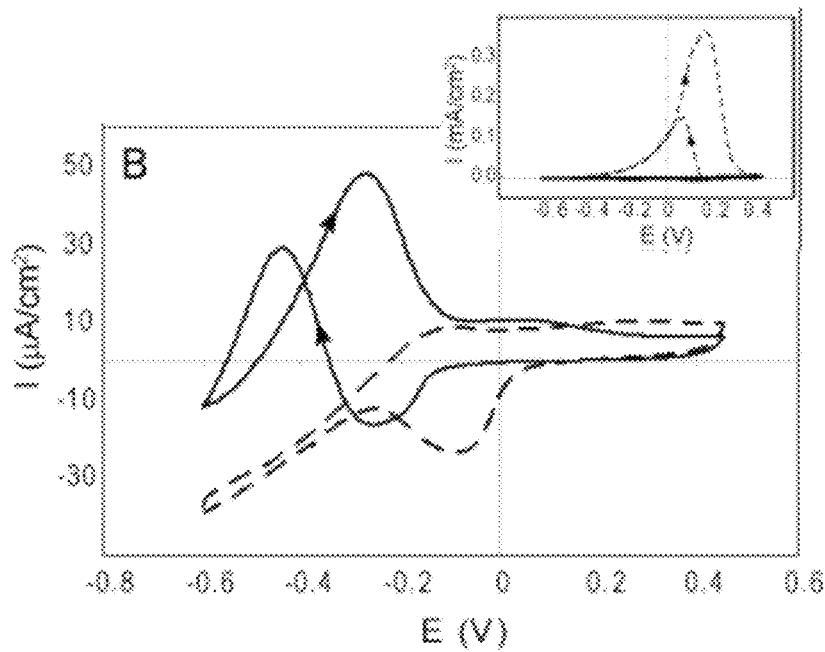

Au$_{N=0}$) was examined in 1M NaOH, FIG. 8A. Ten CVs were performed in the absence of n-propanol and five CVs were performed with n-propanol. Only the last CV for each is shown. It can be seen that during the anodic sweep, the platinum surface is oxidized that gives rise to a cathodic reduction peak on the reverse scan. The surface oxide formation is shifting to more negative potential for the PANI coated Pt electrode when compared to the bare Pt electrode. Upon addition of 0.5 M n-PrOH to the 1M NaOH, the cyclic voltammograms at the bare Pt-electrode and at the PANI-coated Pt electrode are changing, FIG. 8B. At the Pt electrode a small oxidation peak at −0.10V is seen causing a slight enhancement of the reduction peak when compared with voltammogram shown in FIG. 8A. A similar result was reported by others.

The voltammogram taken on the Pt/PANI shows two distinct oxidation peaks, on the forward scan at −0.27V and on the reverse scan at −0.44V. The enhanced magnitude of the peak current on Pt/PANI indicates much higher catalytic activity to n-PrOH than at the bare Pt electrode. The inset in FIG. 8 shows the CV of the catalytic oxidation of 0.5M n-PrOH in 1M NaOH on a bare polycrystalline gold electrode. The oxidation peak in the forward scan occurs at +0.18V, and on the reverse scan at +0.08V. The reduction current corresponds to the reduction of surface gold oxide, and it increases with the increasing the positive potential limit.

Figure 9:
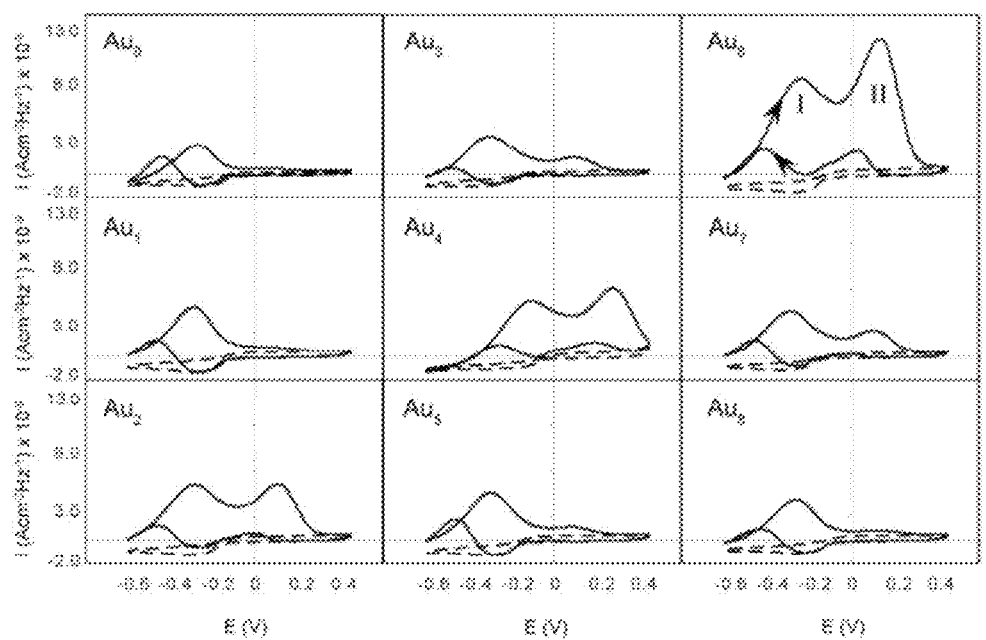
FIG. 9 illustrates the effect of added 0 to 8 Au atoms to PANI on oxidation of 0.5M n-propanol in 1M NaOH (-) taken at 20 mV/s, in accordance with an exemplary embodiment of the disclosure.

An overview of the effect of atomic gold in PANI on electrochemical oxidation of n¬PrOH in alkaline medium is given in FIG. 9. The CVs in 1M NaOH (---) are also shown. Only the last CV of ten is shown in the absence of n-propanol, and only the last CV of five with n-propanol is shown for simplicity. The peaks (I) and (II) shown in PANI/Au$_6$ panel are discussed. In this figure the CVs have been normalized to the mass of PANI deposited on the electrode in order to aid the visual comparison. The mass information is again obtained from the change of frequency of the EQCM during the deposition of the PANI, assuming the validity of the Sauerbrey equation in solution. For PANI/Au$_0$, there is an oxidation peak in the forward scan around −0.27V (peak 1) and an oxidation peak in the reverse scan at −0.44V, as seen previously in FIG. 8B, while voltammograms in the potential region above 0V are featureless. On the other hand, in the PANI/Au$_{N<0}$ composites, a second oxidation peak (peak II) in the forward scan begins to emerge around +0.12V, which is due to the oxidation of n-PrOH on the gold atomic clusters. It provides a strong indication that gold clusters are present in the films and that the presence of PANI provides a conducting network which facilitates the electrooxidation.

Figure 10:
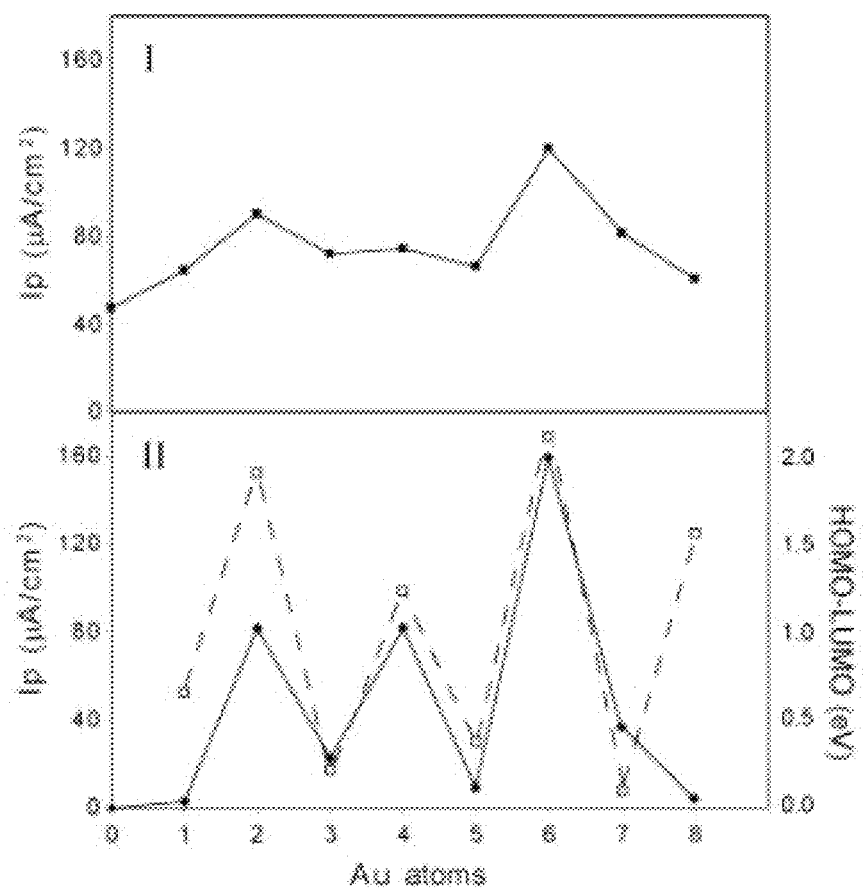
FIG. 10 illustrates peak current densities from the oxidation of n-PrOH vs. the number of inserted gold atoms for (I) the first oxidation peak and (II) the second oxidation peak, in accordance with an exemplary embodiment of the disclosure

The peak II is shifted by −50 mV when compared with the oxidation peak potential on a polycrystalline gold electrode (see FIG. 8, Insert). It is important to point out that oxidation potential of peak (II) does not vary much with the number of Au atoms in the gold clusters; only the peak current is strongly affected. It suggests that the changes in peak current mirror the changes in the catalytic activity of n-PrOH oxidation (FIG. 10). Peaks I and II are labeled for Au$_6$ in FIG. 2. The concentration of n-PrOH was 0.5M in 1M NaOH. The dashed line represents calculated variation of the HOMO-LUMO gap energy. It is observed, that by adding gold to the PANI films, the peak (I) also shows some oscillatory changes of the PANI activity in the presence of the alcohol, although less so than the peak (II) (FIG. 10). The highest catalytic activity is noticeable at 2 and 6 gold deposition cycles. The peak currents for the peak (II) in the forward scan are shown at the bottom of FIG. 10. There is a substantial increase in peak current for PANI/Au$_N$ where N=2, 4, and 6, with N=6 having the highest value. The fluctuation of the peak current density displays an odd-even pattern with the even numbered clusters showing the highest peak currents, with the exception of N=8.

Figure 11:
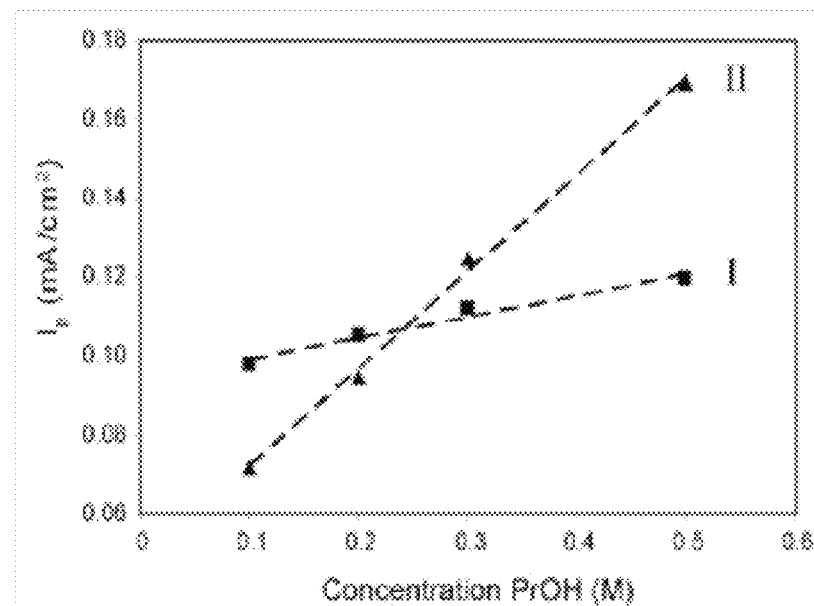
FIG. 11 illustrates linear dependence of peak current on n-PrOH concentration for PANI/$Au_6$ for (■) the first oxidation peak and (▲) second oxidation peak, in accordance with an exemplary embodiment of the disclosure.

Since catalysis only speeds up the rate of the reaction, the peak currents should increase linearly with of concentration of the n-PrOH. The current densities for peaks (I) and peak (II) are plotted versus the concentration of n-propanol for PANI/Au$_6$ in FIG. 11. The slopes of the concentration dependence lines for peak (I) and peak (II) are $5.4\times10^8$ mAcm$^{-2}$ M$^{-1}$, and $2.5\times10^{-7}$ mAcm$^{-2}$M$^{-1}$, respectively.

FTIR of Au Atoms in PANI.

Figures 12A, 12B:
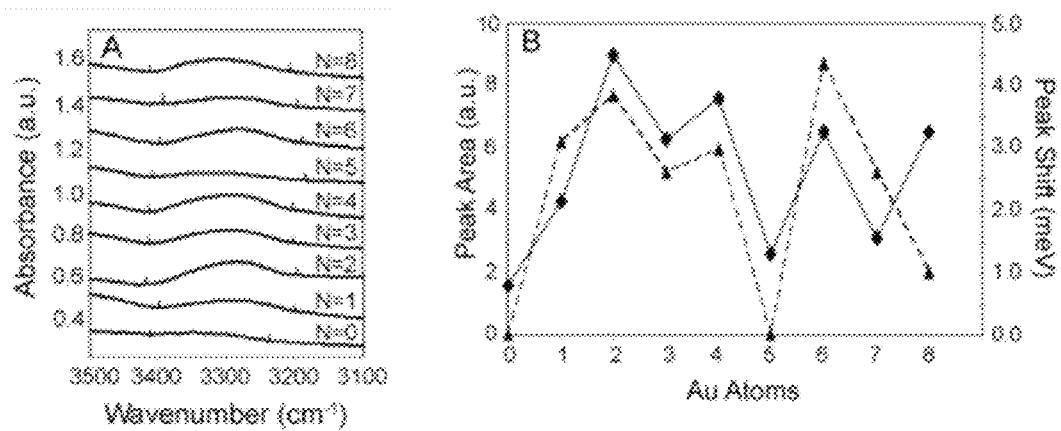
FIG. 12 A illustrates the FTIR spectra for PANI-$Au_N$ for N=0 to 8 Au cycles from 3100-3500 $cm^{-1}$, in accordance with an exemplary embodiment of the disclosure.

It is expected that Au atoms will remain close to or at the nitrogen sites of PANI as they are formed in the polymer matrix. Consequently, the magnitude of the N—H stretching vibration in the region of 3100-3500 cm$^{-1}$ should depend on the size and stabilities of the atomic Au clusters in the PANI. The FTIR spectra were recorded after cycling in 0.1M HClO$_4$. FIG. 12A shows the FTIR spectra for PANI/Au$_N$ after N−=0 to 8 atomic gold cycles. The marks on lines in (A) define the integration limits from which the peak areas were calculated. (B) FTIR peak areas (-♦) and peak shifts (---▲---) of the peak for the N—H stretching at 3300 cm$^{-1}$ for PANI/Au$_N$ for N=0-8 showing an odd-even alternating pattern. The presence of Au affects both the band position and the band intensity of the N—H stretch. The dependence of the band areas and the shifts of the band position from the FIG. 12A are plotted in FIG. 12B together with the number of gold cycles used for their accommodation in PANI. The band areas show an odd even pattern with the even number of atoms, yielding increased band areas relative to the odd number cluster of atoms. The band shifts also give an odd even pattern with the even number of atoms having a larger shift from the. PANI/Au$_0$ than the odd number of atoms, with the exception of PANI/Au$_8$.

Electrooxidation of propanol in alkaline medium on Pt electrode is known to be significantly different from electrooxidation on Au. The difference is attributed to the presence of metal oxides. In addition to this material difference, there is also a strong dependence on the number of gold atoms in atomic metal clusters. They showed catalytic activity for the oxidation of n-propanol which mirrors the theoretically predicted odd-even alternating pattern with the even number of atoms giving higher catalytic activity than the odd numbered atomic clusters. The most notable activity was obtained for the even numbers of N=2, 4, and 6. It is expected that the oxidation of n-propanol leads to n-propanal and then to n-propionic acid as the final product.

The band area and the band position for the N—H stretching vibration at 3300 cm$^{-1}$ in the PANI/Au composites are also perturbed by the presence of Au atoms. The odd-even alternation is again observed with the even numbered clusters affecting the N—H stretching vibration more strongly than the odd numbered clusters.

The confirmation of the odd-even oscillations for these clusters is significant in determining whether the Au atoms are deposited as individual atoms at different nitrogen sites in PANI, or if the atoms are deposited at the same site and form Au$_N$ clusters. The observed odd-even oscillation pattern is a strong indication that these atoms are indeed atomic clusters of Au$_N$. However, this pattern breaks down for N=8. A possible explanation for this deviation is that the clusters containing eight atoms of gold are so large that they do not fit into the confines of the PANI matrix and begin to bridge the distance between the neighboring clusters, allowing the clusters to aggregate. This explanation would be congruent with the model of Smalley who prepared spatially unrestricted clusters. This point will be resolved by performing synchrotron radiation analysis of these materials.

Example 3: Polyaniline-Supported Atomic Gold Electrodes: Comparison with Macro Electrodes Electrochemical Cell Set-Up and Methods.

A standard three-electrode cell and CHI 660 potentiostat (CH Instrument, Inc) were used in all electrochemical experiments. As working electrodes (WE), platinum or gold disk electrodes, both with diameter of 1.2 mm (A=1.13×10$^{-3}$cm$^2$) from Bioanalytical Systems (BAS) were used. For preparation of the atomic gold electrodes (AGE) platinum electrodes deposited on quartz crystals (A=0.236 cm$^2$) obtained from International Crystals were used. The procedure for the preparation of the defined atomic gold aggregates in polyaniline films deposited on platinum crystals. Pt/PANIAu$_{(N=2\ to\ 7)}$ was described previously. The counter electrode (CE) was platinum foil. The reference electrode (REF) was Ag/AgCl in 1M KCl//1M KNO$_3$. The double-junction in the reference electrode was used in order to prevent contamination of 1M KOH solution with chloride ion. All potentials reported in this study are referred to this electrode (E=+236 mV versus SHE). The cyclic voltammograms (CVs) were recorded with a scan rate of 50 mV/s, unless stated otherwise. Prior their use, platinum and gold (BAS) electrodes were polished with Buehler micropolish II Al$_2$O$_3$ 0.05 microns and sonicated in water for 6 minutes. If mechanical polishing was not adequate, the electrodes were polished electrochemically in 1M H$_2$SO$_4$ by taking 10 CVs with a scan rate of 1 V/s followed by taking 6 CVs with a scan rate of 0.05 V/s. The CVs were always initiated from open cell potential and recorded within the potential range from −0.7 V to 0.55 V for the BAS electrodes and −0.6 V to 0.45 V for the Pt electrode deposited on quartz crystal.

Odd-Even Electrochemistry.

Figure 13:
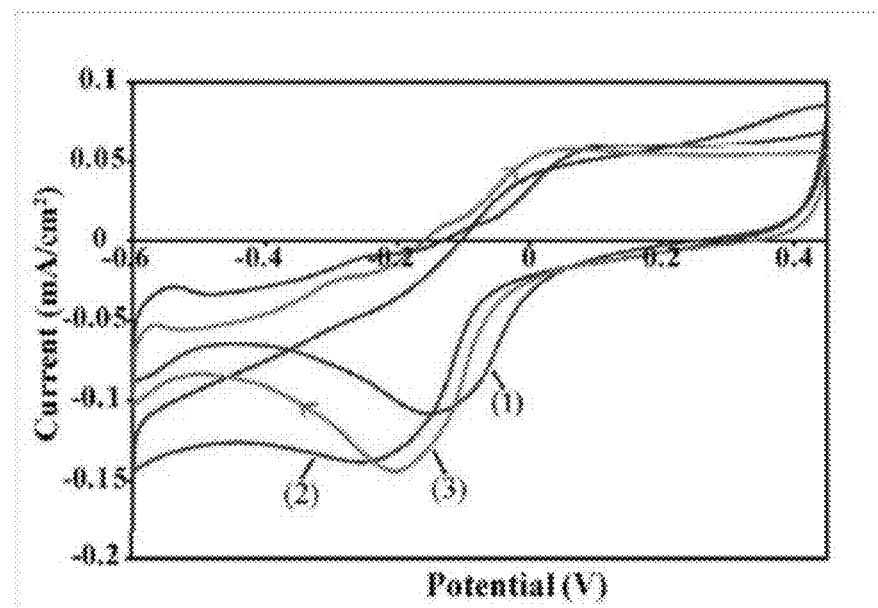
FIG. 13 illustrates steady-state CVs for 1—Pt-PANI, 2—Pt/PANI-$Au_4$ and 3—Pt/PAN1/$Au_5$, in accordance with an exemplary embodiment of the disclosure.

The polyaniline matrix is a necessary component of the AGE electrodes. In 1 M KOH solution Pt electrode coated with PANI has its own electrochemical background signature that resembles the CV of the Pt-bulk electrode (FIG. 13). In that figure are shown also representative examples of CVs corresponding to gold oxide formation and reduction for even number of gold (PANIAu$_4$) and odd number of gold (PANIAu$_5$) in PANI. The reduction of gold oxide in PANI is taking place in the range from −180 to −260 mV. Peak potentials corresponding to the reduction of gold oxide at AGEs correspond to that of the bulk gold electrode. The hints of step-wise Au oxidation are seen only for the AGEs containing odd-number of Au atoms.

Figure 14:
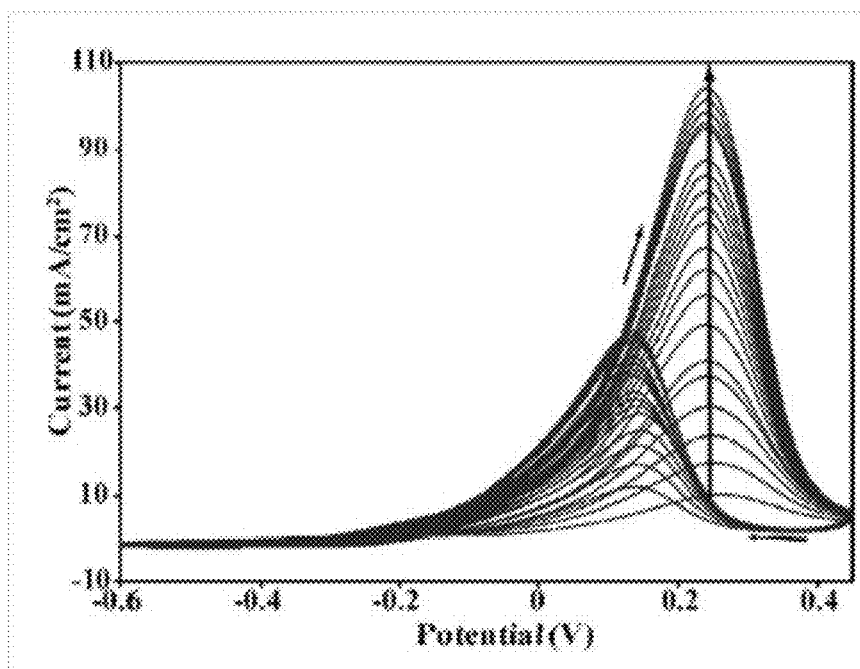
FIG. 14 illustrates the oxidation of 0.5 M n-PrOH, in 1 M KOH recorded at polycrystalline Au electrode (BAS), in accordance with an exemplary embodiment of the disclosure.

Oxidation of n-PrOH and i-PrOH in 1M KOH on solid polycrystalline Au electrode is used as the benchmark. Since voltammograms for both alcohols contain the same features only the CVs for n-PrOH are shown (FIG. 14). Its oxidation potential peak at +0.240 V belongs to oxidation of chemisorbed alkoxide on the Au surface covered with adsorbed OH" ions. Formation of gold oxide at potentials more positive progressively blocks this reaction. The peak oxidation current is increasing with the increasing number of cycles until it reaches a stable state. This feature will be discussed in greater detail later. On the reverse sweep a new oxidation peak at +0.08V appears that is attributed to the removal of the blocking species produced in the forward scan. Note the progressive increase of both peaks upon cycling, highlighted by the upward pointing arrow.

Figure 15A:
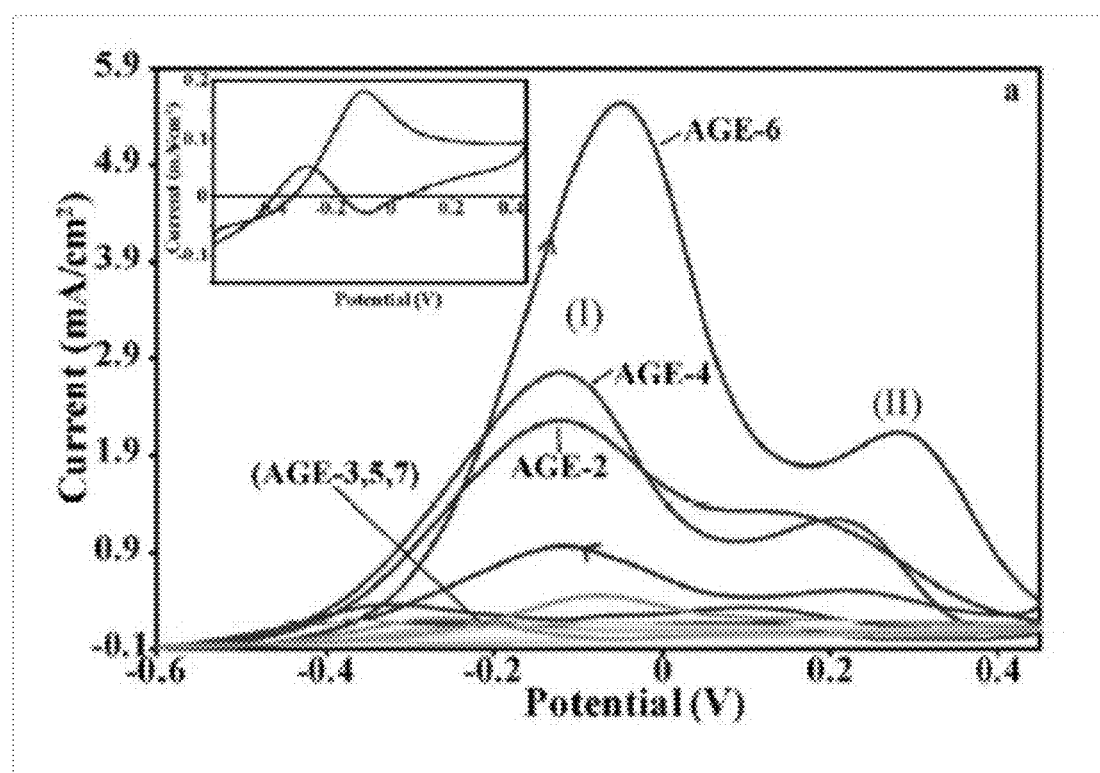
FIG. 15 A-B illustrate the steady-state CVs for oxidation of (a) n-PrOH and (b) i-PrOH for Pt/PANI-$Au_N$ (2<N<7) electrodes, in accordance with an exemplary embodiment of the disclosure.

Oxidation of both propanols on AGEs is surveyed in FIGS. 15A (n-propanol) and 15B (i-propanol). The inserts in both panels correspond to N=0. The inserts are shown at 100× greater magnification in order to more clearly display their features. The numbering of the individual CVs corresponds to the number of inserted Au atoms. Cyclic voltammograms for odd-numbered Au atoms are shown as a (3,5,7) group The first peak (I) located between −0.1 V and −0.2V coincides with the oxidation of propanol on Pt electrode coated with polyaniline (Pt/PANIAu$_{N=0}$), as shown in the inserts to FIGS. 15 A and B. It is necessary to point out, that while there is only a limited oxidation of propanol on bare Pt electrode, PANI coating makes it possible. When oxidation of n-PrOH is taking place at Pt/PANIAu$_{N=0}$, oxidation peaks at −0.09V in a forward scan, and at −0.30V on the reverse scan, are seen. In contrast, for i-PrOH only oxidation peak in the forward scan, at −0.13V, is seen. Furthermore, for both alcohols the magnitude of this oxidation peak current at the forward scan remains the same and it is accompanied by a reduction peak at approx. −0.13V.

Figure 15B:
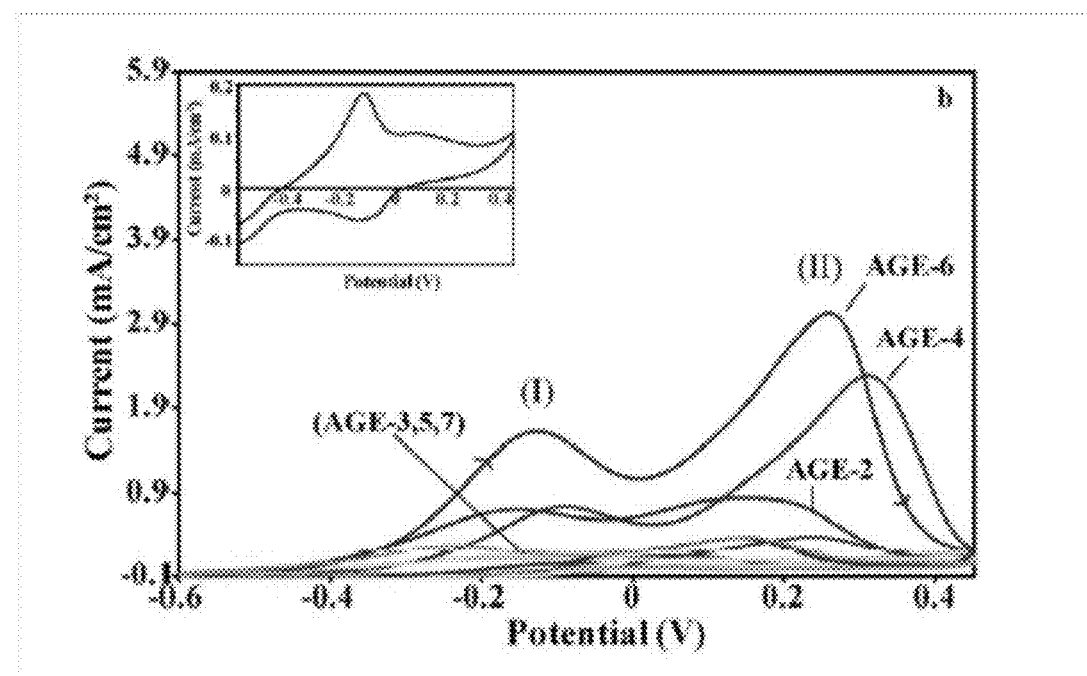

Significant differences between voltammograms recorded for Pt/PANIAu$_{(N=2\ to\ 7)}$ in FIG. 15A for oxidation of n-PrOH and FIG. 15B for oxidation of i-PrOH, are evident. The magnitude of the peak (I) current is significantly smaller for i-PrOH when compared to n-PrOH for the same Au$_N$. The opposite applies to the peak (II) that is located between 0.2 V and 0.4 V. The magnitude of both peaks somewhat increases in the presence of oxygen, but it is not completely eliminated by the deareation of the sample. In other words, while the mediated oxidation by OH appears to be responsible for peak I, that species is not generated exclusively by the reduction of oxygen. The absence of that peak at solid gold electrode (FIG. 14) is a strong indication that Pt must be present for the peak I (at −0.2V) to appear. The peak II (at +0.2V) is due to the direct oxidation of propanols on Au particles and shows the strong Odd/Even effect.

In order to obtain more information about the influence of the gold atomic size and its arrangement the results have been summarized and compared to the solid gold electrode. There are several remarkable differences in these voltammograms (FIG. 15 A-B); First, there are two oxidation peaks seen on the forward scan and two oxidation peaks on the reverse scan. They are best identified on CV for AGE-6. Second, the position of the oxidation peaks (I) and (II) does depend on the N-number of Au atomic agglomerates in the PANI. The corresponding peaks are clearly separated, by as much as 320 mV for Au$_2$, Au$_4$ and Au$_6$. Third, the dominating "odd/even" activity pattern as reported previously is clearly visible.

Dependence on the Scan Rate.

Figure 16:
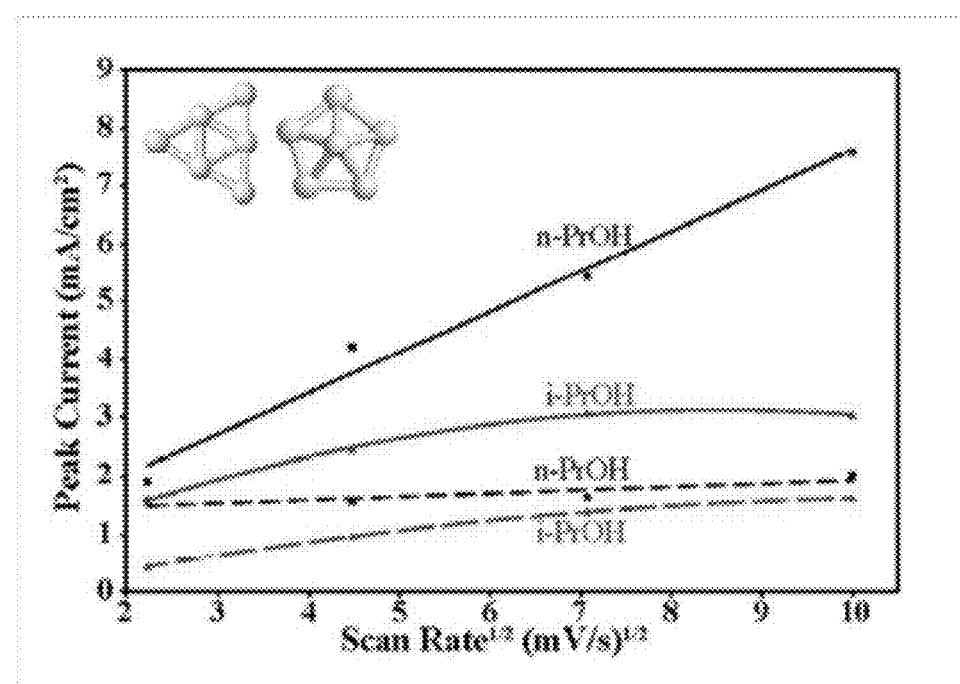
FIG. 16 illustrates the dependence of peak current on square root of scan rate for PtiPANI/$Au_6$ for both alcohols, in accordance with an exemplary embodiment of the disclosure.

Peak current i$_p$, for oxidation of n-PrOH at Au bulk electrodes has shown linear dependence on the square root of the scan rate, $$v^{\frac{1}{2}},$$

up to 100 mV s$^{-1}$, but at the higher scan rates the t$_p$ decreased. That behavior has been attributed to the slow, irreversible charge transfer coupled with adsorption. A similar scan rate behavior has been found at AGEs, but with some differences depending on the N-number of gold atoms. The representative plots of t$_p$ vs $$v^{\frac{1}{2}}$$

show linear behavior for the oxidation of n-PrOH at PANIAu$_6$, with the slope for Peak I being 3.8 times higher than for Peak II. On the other hand the scan rate dependence for oxidation of i-PrO11 at PANI/Au$_6$ is non-linear for both peaks, and has approximately the same non-linear trend for the peak I and peak II (FIG. 16). The range of examined scan rates is 5 to 100 mVs$^{-1}$. The solid lines correspond to peak I, and the dashed lines to peak II. The icons show the calculated highest probability of the shape of the Au$_6$ clusters At PANI/Au$_5$ electrodes (not shown) the peak currents are approximately 20× lower, due to the odd/even effect, but are linear for both alcohols. That could be explained by much lower rate of electron transfer relative to the mass transport and relative to the rate of desorption of the product. The icons representing the calculated highest binding energy (i.e. highest stability) shapes for Au$_6$ isomers are included.

Electrode Activation

Figure 17A:
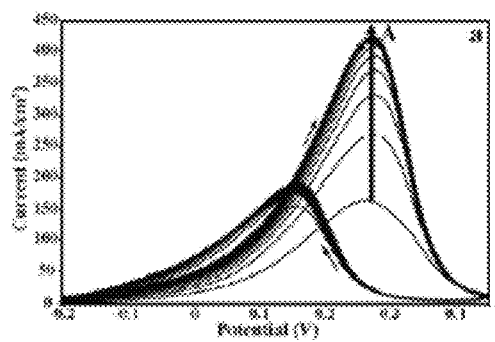
FIG. 17A-D illustrate the activation pattern of polycrystalline Au electrode (BAS) under process conditions described in the Examples, in accordance with an exemplary embodiment of the disclosure.
Figure 17B:
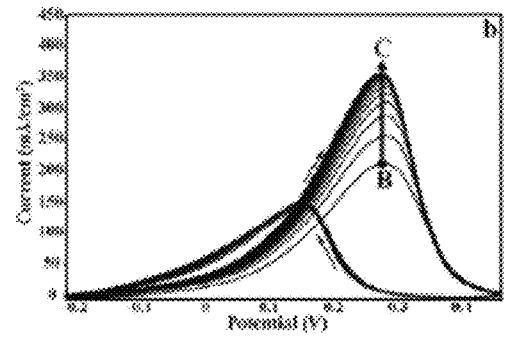
Figure 17C:
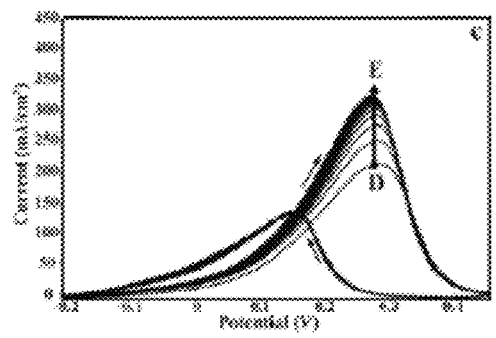
Figure 17D:
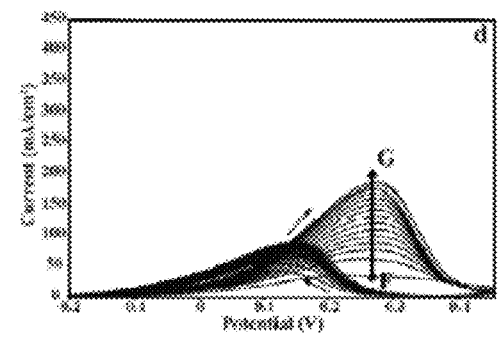

The change of activity of polycrystalline Au electrode upon oxidation of propanol in 1M KOH is shown in FIG. 17A-D. In that experiment the cycling was interrupted after approximately first 20 cycles (FIG. 17A, point A). After thorough rinsing, the electrode was stored in D.I. water for 10 minutes and the cycling in propanol resumed. Both peaks grew again (FIG. 17B, point B to point C), but both reached a slightly lower steady state. After another 10 min interruption and storage in D.I. water the third set was recorded (FIG. 17C) The peaks grew again from point D to E, but ended in a lower steady state yet. After that the electrode was cycled in 2.5 mM Ru(II)/(III) hexamine in 1M KNO$_3$. Cycling of the electrode in this redox couple showed a "normal" cyclic behavior, i.e. steady decrease within the first five cycles until reaching steady state due to formation of depletion layer. Immediately after the Ruhex treatment the same Au electrode resumed the "activation" behavior in oxidation of propanol (FIG. 17D, points F to G). The possible explanation of this behavior is as follows. Oxidation of propanol at Au electrodes in alkaline medium proceeds through formation of OH radical as an intermediate. It is possible that this species activates the electrode by increasing the number of active sites. That mechanism would be the opposite what has been described in great detail in series of papers, for "deactivation" of Au electrodes with OH generated by the Fenton reagent in mildly acidic medium. In that case the OH radicals effectively "polished" the Au electrode, removing asperities that apparently serve as the active centers for electron transfer involving radical formation. Likewise, after the "polishing" the redox behavior of Ru(1O/Ru(111) couple was not affected.

Figure 18A:
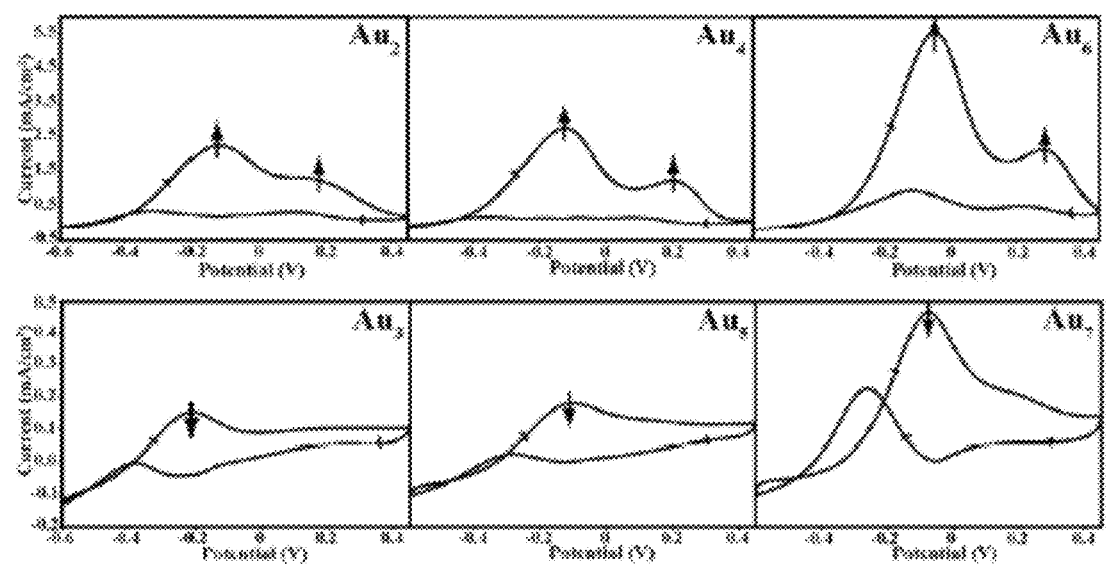
FIG. 18 A-B illustrate the activation pattern for the AGEs (2<N<7) for (a) n-PrOH and (b) i-PrOH, in accordance with an exemplary embodiment of the disclosure.
Figure 18B:
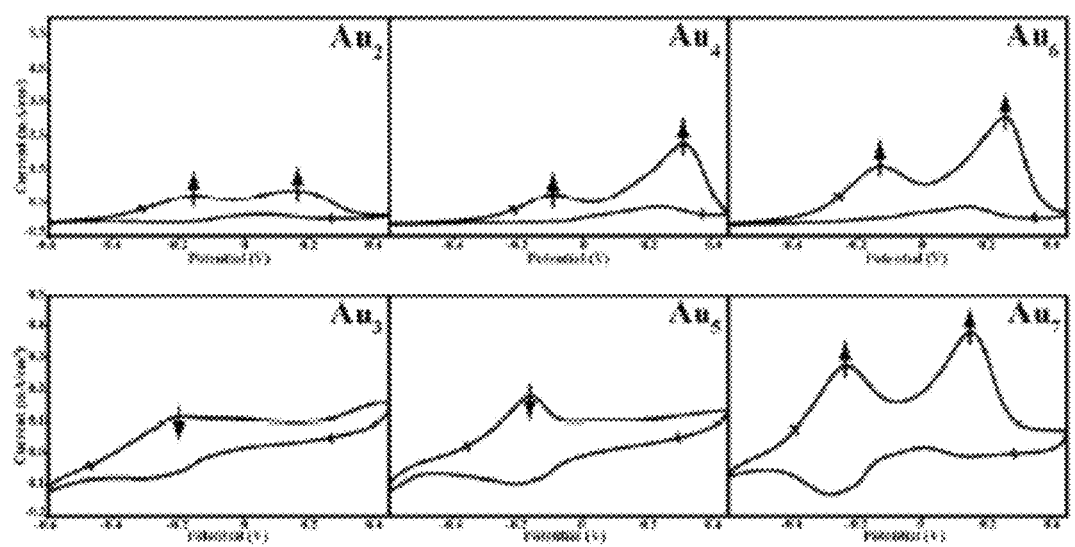
Figure 19A:
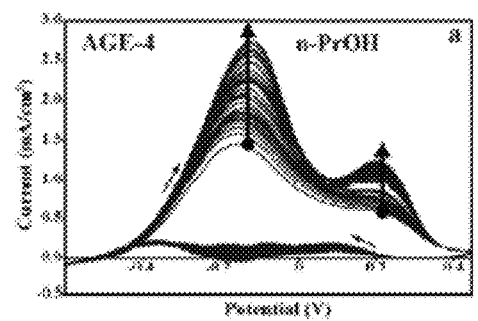
FIG. 19 A-D illustrate the activation pattern for Pt/PANI-$Au_4$ (A and B) and Pt/PANI-$Au_5$ (C and D) and for n-PrOH (A and C) and i-PrOH (B and D), in accordance with an exemplary embodiment of the disclosure.
Figure 19B:
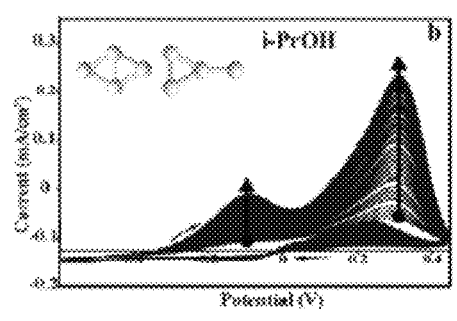
Figure 19C:
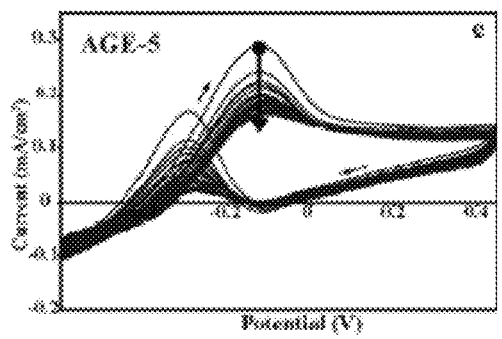
Figure 19D:
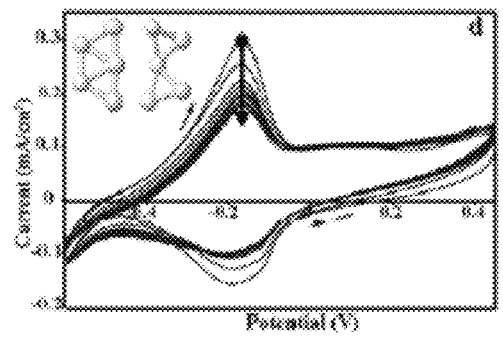

The final steady-state scans of CV curves for AGEs (N=2-7) during propanol oxidation are shown in FIG. 18A-B. The arrows again indicate the increase/decrease of the peak currents. It increases in n-PrOH for both peaks from the 1st to the 20$^{th}$ scan for the even-AGEs while it decreases for the odd-AGEs. The exception is the slight increase for both peaks observed for AGE-7 in i-PrOH. Note also, that the position of the peak again does not change, indicating that the increased value of the peak current reflects only the change in the number of active sites at which the oxidation takes place and not in the change of the electrode kinetics. Thus the behavior of AGE electrodes seem to follow either the activation or the deactivation path, depending on the odd/even number of gold atoms. This behavior is illustrated in greater detail on AGE-4 and AGE-5 respectively, which represents the entire even/odd series. The rate of oxidation of both propanols at AGE-4 increases (FIG. 19A, B) while at the AGE-5 it decreases (FIG. 19C,D). There is also a remarkable difference in the behavior of AGE-5 with respect to n-PrOH and i-PrOH. Although the absolute values of the current (for peak at −100 mV) are again approximately 20× higher for AGE-4 than for AGE-5 there is a finite oxidation current at the switching potential (+450 mV) (FIG. 19C,D), indicating that for the odd-AGEs there is only a minimal blockage of the electrode at the end of the positive scan. The icons representing the theoretically calculated shapes of the corresponding atomic clusters are included in the individual panels of FIG. 19A-D. Contrary to the reported deactivation of polycrystalline Au in acidic medium the exposure of the AGEs to the Fenton reagent always increased the peak current of AGEs. At the dimensions involved in AGEs it is hard to argue about "annealing of asperities" being responsible for the "activation" behavior. The observed differences between the odd and even numbered AGEs suggest that the "activation/deactivation" phenomenon is related to the prevailing electronic structure of the active sites.

Polycrystalline gold is usually regarded as an "inert" electrode. Experiments described here and confirmed by others indicate that it is anything but "inert." The atomic gold electrodes described herein are truly 3-dimensional electrodes in which the Pt substrate, the PANI isolation matrix and the inserted atomic gold all play an important role. When prepared in atomic format the AGEs retain most features of bulk gold electrochemistry, but add some significant differences which are related to the odd/even quantum effects predicted for atomic clusters of metals.

There is a catalytic effect for oxidation at both odd and even numbered atomic agglomerates of gold that is predicated on the presence of Pt substrate. It is significantly higher for the even-numbered agglomerates. It indicates that PANI in alkaline medium is non-conducting and porous and that a part of electrochemistry takes place at the Pt surface. It is apparently due to the oxygen reduction and generation of the OH radical. The formed OH is possibly stabilized by PANI and the ensuing oxidation takes place at atomic gold according to its odd/even pattern. Under these conditions it is necessary to compare the current efficiency on the basis of active Au atoms, rather than on the usual scale of the geometric area of the electrode. In order to have a rational comparison of performance of AGE with macroscopic polycrystalline gold electrodes 10 micrometers was arbitrarily chosen as the convenient minimum thickness of a thin Au electrode prepared by e.g. evaporation, and calculated the number of Au atoms in such an electrode. The estimated amount of Au in AGE of the comparable area and at comparable current efficiency is approximately three orders of magnitude lower than for a polycrystalline gold electrode. Besides the major improvement of economy, AGEs offer also possibility of enhanced catalytic selectivity due to the shape-related, quantized odd/even effect.

Example 4: Alcohol Oxidation on PANI-Au$_N$ Compared to Bulk Au Catalysts, Across Series of Alcohols Preparation of polyaniline electrodes doped with atomic gold (PANI-AuN, for N=0 to 7) have been previously described. This example discloses the electrochemical oxidation of lower aliphatic alcohols (C¬1-C4) and all their isomers in 1M KOH. The odd-even pattern of activity of atomic gold electrodes (AGE) is preserved throughout this series, the even numbered AGEs showing between 10 to 30 times higher activity than the odd numbered ones. The previously observed differences in electrochemical behavior of n-propanol and iso-propanol prompted us to look for such differences in the entire C1 to C4 alcohol series. Polyaniline layer plays an important role in the oxidation reaction. It apparently stabilizes the hydroxyl radical, which is the active species in alcohol oxidation $$O_2 + 2OH^- \rightarrow 2HOO^{\cdot-} + 2e^-$$

Figure 20A:
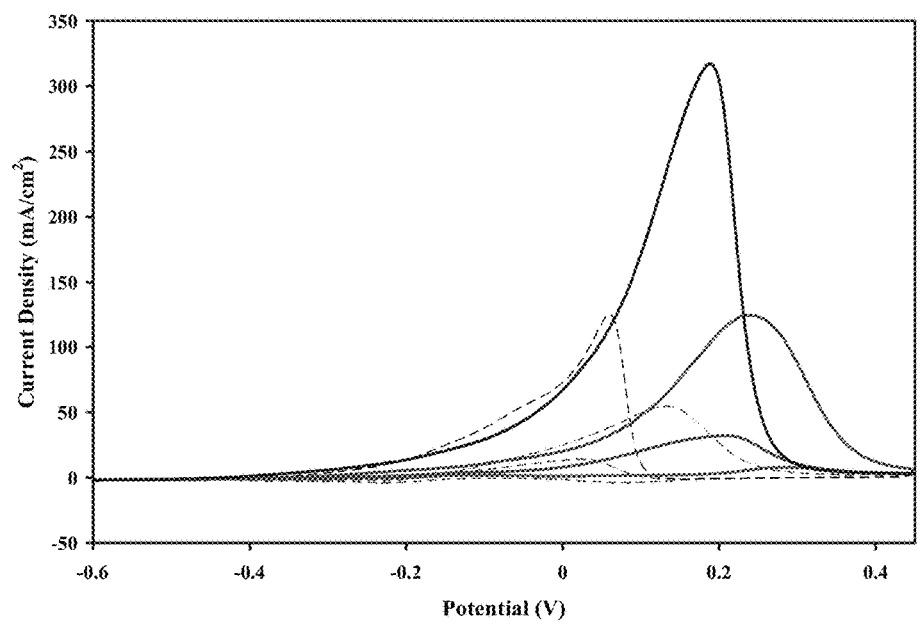
FIG. 20 A-G illustrate steady state CV scans for MeOH (red), EtOH (blue), PrOH (green), and BuOH (black) for (A) AuBAS, (B) PANI-$Au_2$, (C) PANI-$Au_6$, (D) PANI-$Au_0$, (E) PANI-$Au_3$, (F) PANI-$Au_5$, and (G) PANI-$Au_7$, in accordance with an exemplary embodiment of the disclosure.
Figure 20B:
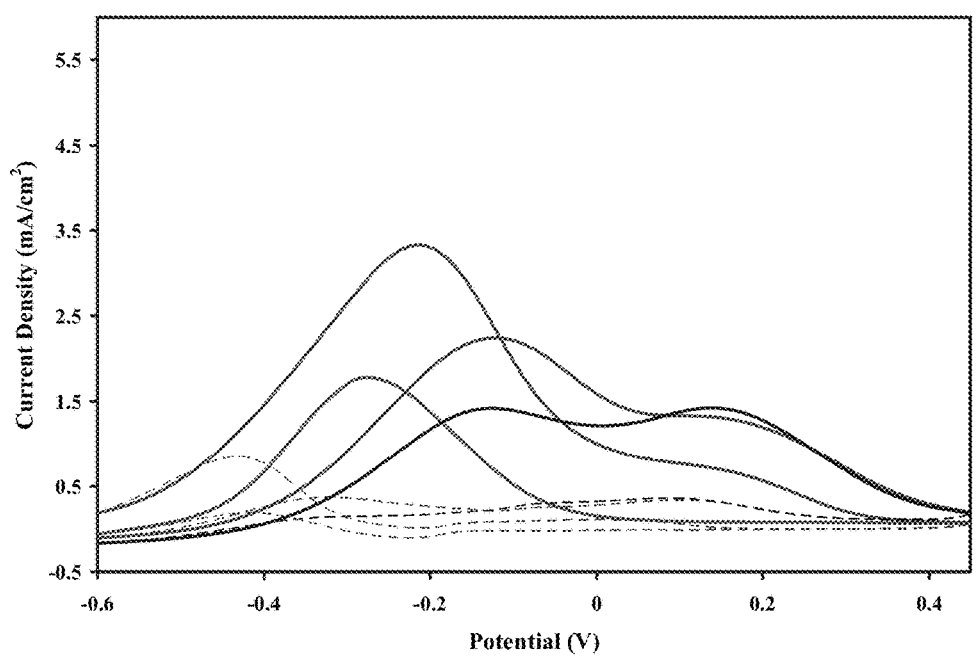
Figure 20C:
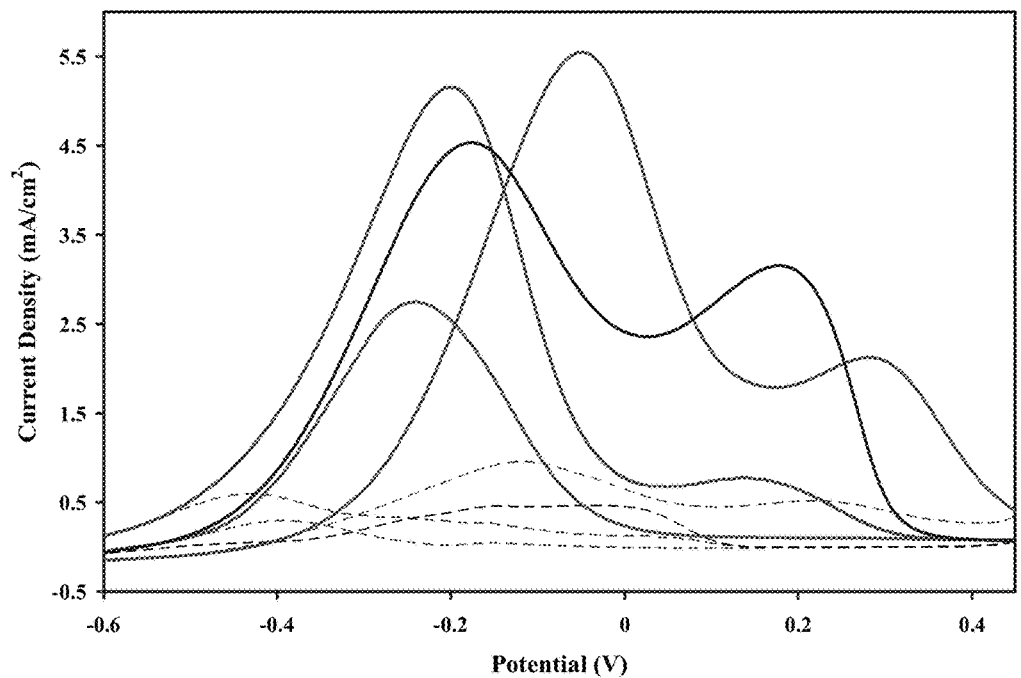

Therefore the differences in behavior of individual AGEs must be compared against the background of the entire electrode, i.e. against Pt/PANI/Au$_0$. The study has been divided into three sections: linear alcohols (FIG. 20 A-G), branched alcohols (FIG. 21A-G) and the butanol series (FIG. 22A-G), and each of the figures reviews different amounts of gold—(A) AuBAS, (B) PANI-Au$_2$, (C) PANI-Au$_6$, (D) PANI-Au$_0$, (E) PANI-Au$_3$, (F) PANI-Au$_5$, and (G) PANI-Au$_7$. The odd-even pattern is illustrated in FIG. 20A-G in which the oxidation of linear alcohols methanol (red), ethanol (blue), propanol (green), and butanol (black) is shown on an identical current sensitivity scale. Oxidations on solid, polycrystalline, gold electrode and on Pt/PANI/Au$_0$ are also included in FIGS. 20A and 20D for reference. Solid gold electrode has a markedly different oxidation pattern than any AGE. Similar patterns for branched alcohols and for butanol isomers, presented on an identical scale are shown in the Supplement. The odd-even pattern is the dominating feature of AGEs. However, there are subtle differences between individual alcohols, which are highlighted for AGE-5 (FIG. 20F) and AGE-6 (FIG. 20C). There the details of differences are shown on the 10× large scale for the latter. The calculated stable geometrical configurations of atomic gold clusters are shown as icons in the respective panels.

The alkaline oxidation of alcohols on bare Pt electrode (i.e. without PANI) and on solid Au electrode are well documented. The results for AGE-0, AGE-5 and AGE-6 for three groups of alcohols are shown in separate panels. In order to highlight the odd-even behavior identical experimental conditions, the geometrical surface area, thickness of PANI layer, the scan rates, applied potentials and concentrations have been used, unless stated otherwise.

Figure 20D:
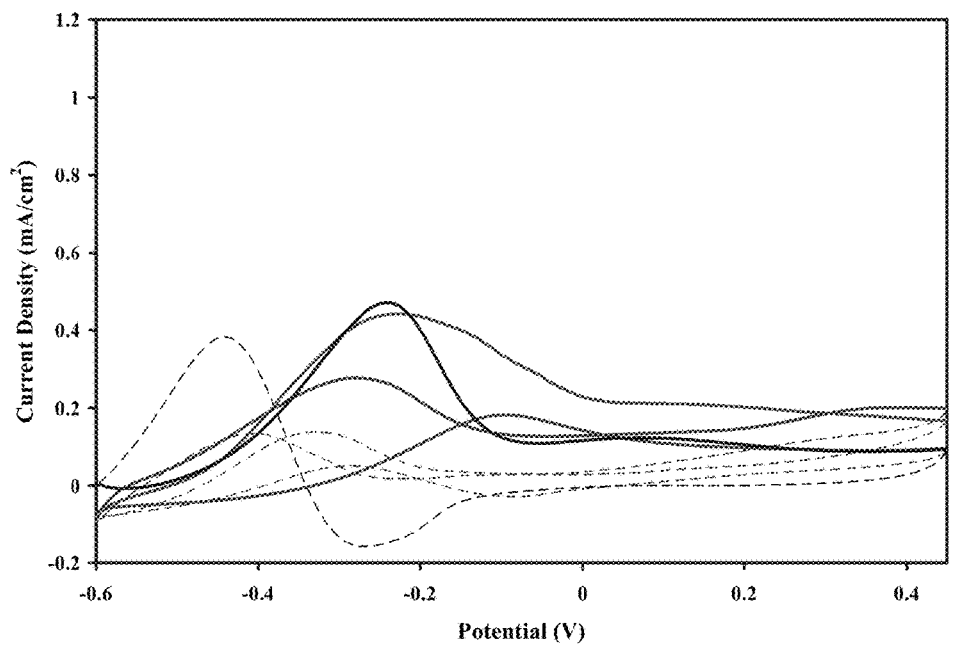
Figure 20E:
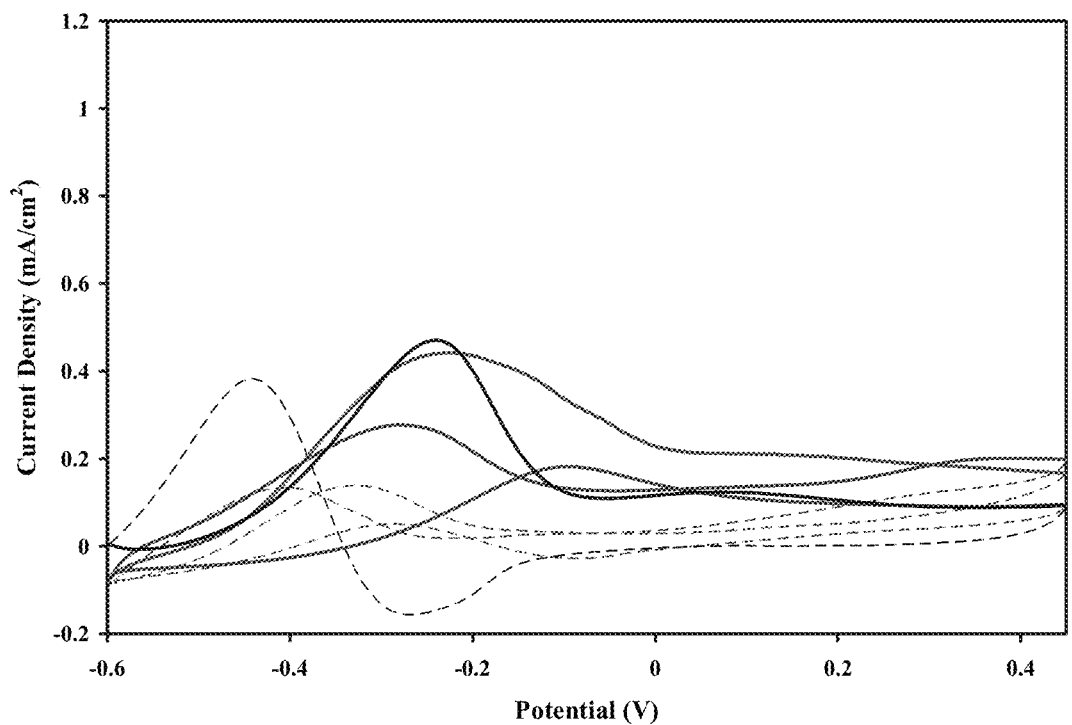
Figure 20F:
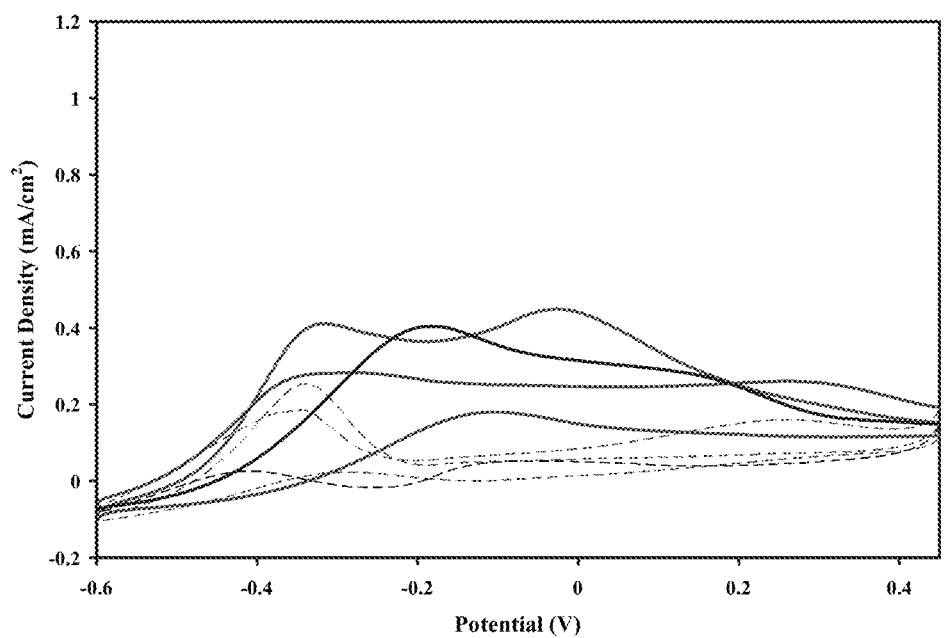
Figure 20G:
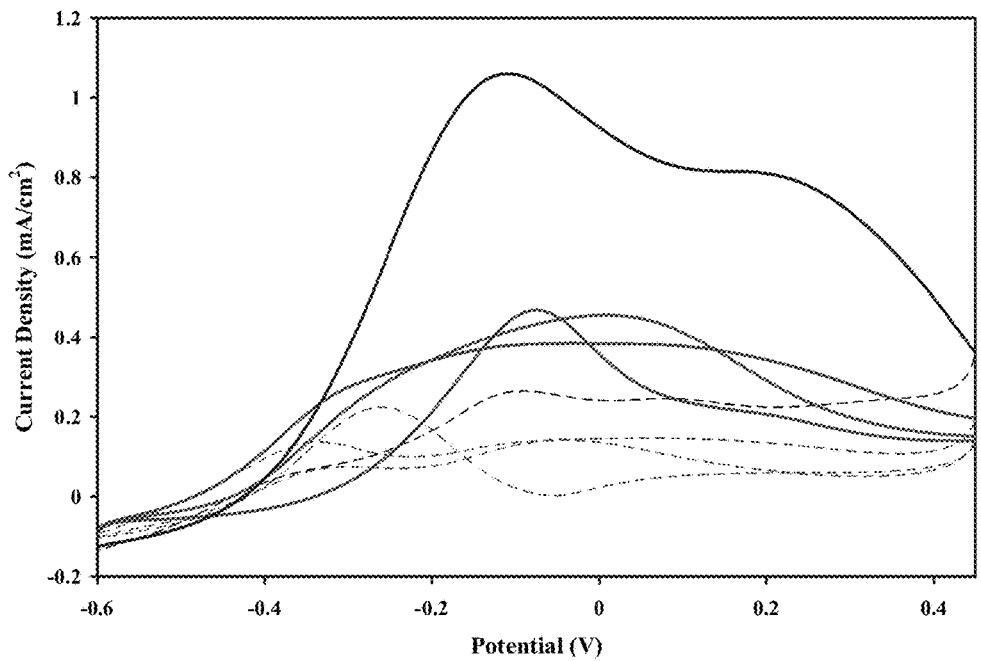

In the linear alcohol series methanol and ethanol have been also included. In the absence of atomic gold (AGE-0), the cyclic voltammogram shows a characteristic oxidation peak in the range –230 to –280 mV on the forward scan for MeOH, EtOH and n-BuOH (FIG. 20D). The forward oxidation peak for n-PrOH is almost 200 mV more positive at –0.095 mV. The corresponding de-blocking peaks on reverse scan, are correspondingly more negative by approximately 110 mV than the forward oxidation peaks for all alcohols. Since there is no gold involved the pattern is partially attributed to the reactivity of the hydroxyl radical with different alcohols according to the Reaction II and partially to the oxidation pattern on Pt. This sequence is repeated for all linear alcohols with only a small differences in the potentials and peak currents and is consistent with the previously described mechanism of alcohol oxidation at PANI coated Pt electrode. Briefly, the first peak is due to oxidation of alcohol at the platinum oxide. The surface of the electrode is progressively blocked by the products, which are desorbed on reverse scan resulting in a more negative oxidation peak. This seemingly paradoxical oxidation appears also on solid gold electrodes has been studied in detail. The potential region between 0 and +450 mV is featureless. Similar adsorption-desorption pattern is observed also on solid polycrystalline gold electrode (FIG. 20A, polycrystalline Au).

In the presence of odd number of atomic gold (AGE-5) the oxidation pattern is similar. It resembles oxidation on platinum with the exception of MeOH. There is also a hint of a poorly developed oxidation peaks for higher linear alcohols. A significantly different oxidation appears on AGE-6. The current densities are ten times stronger (FIG. 20C) and there is a distinct oxidation pattern for the four linear alcohols studied. Two distinct oxidation peaks are seen for all alcohols except MeOH. The oxidation of adsorbed n-PrOH takes place at more positive potential (–50 mV) followed by direct oxidation at +300 mV. The direct oxidation is less prominent for all alcohols and non-existent for MeOH. This pattern is repeated for all atomic gold electrodes albeit less prominently. The reverse scan features related to oxidation on Pt are relatively small, suggesting that the oxidation pattern is dominated by the atomic gold dispersed in PANI matrix.

Figure 21A:
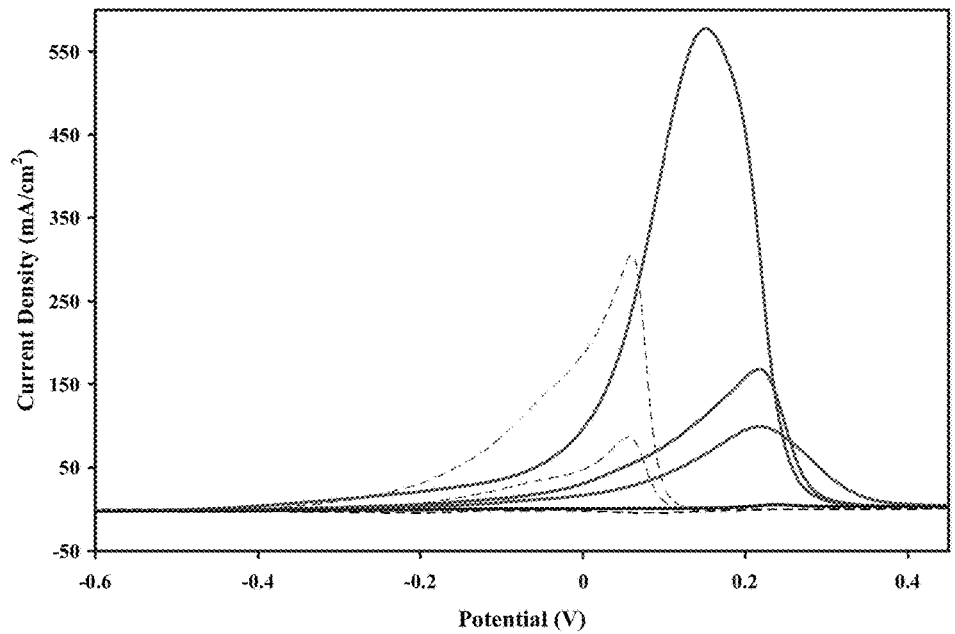
FIG. 21 A-G illustrate steady state CV scans for i-PrOH (red), i-BuOH (blue), sec-BuOH (green), and tert-BuOH (black) for (A) AuBAS, (B) PANI-$Au_2$, (C) PANI-$Au_6$, (D) PANI-$Au_0$, (E) PANI-$Au_3$, (F) PANI-$Au_5$, and (G) PANI-$Au_7$, in accordance with an exemplary embodiment of the disclosure.
Figure 21B:
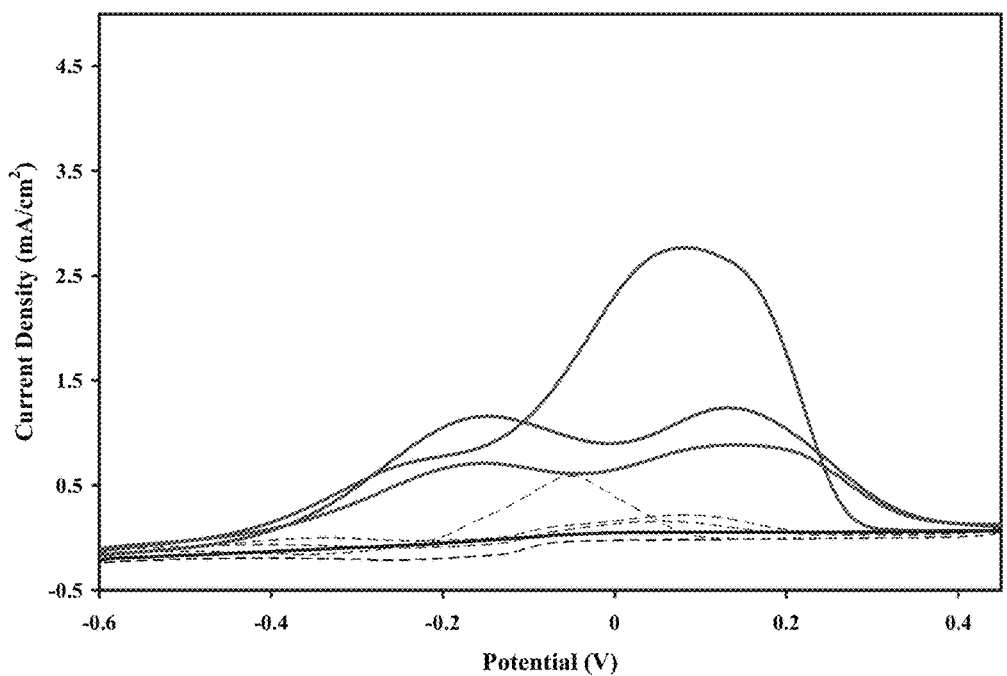
Figure 21C:
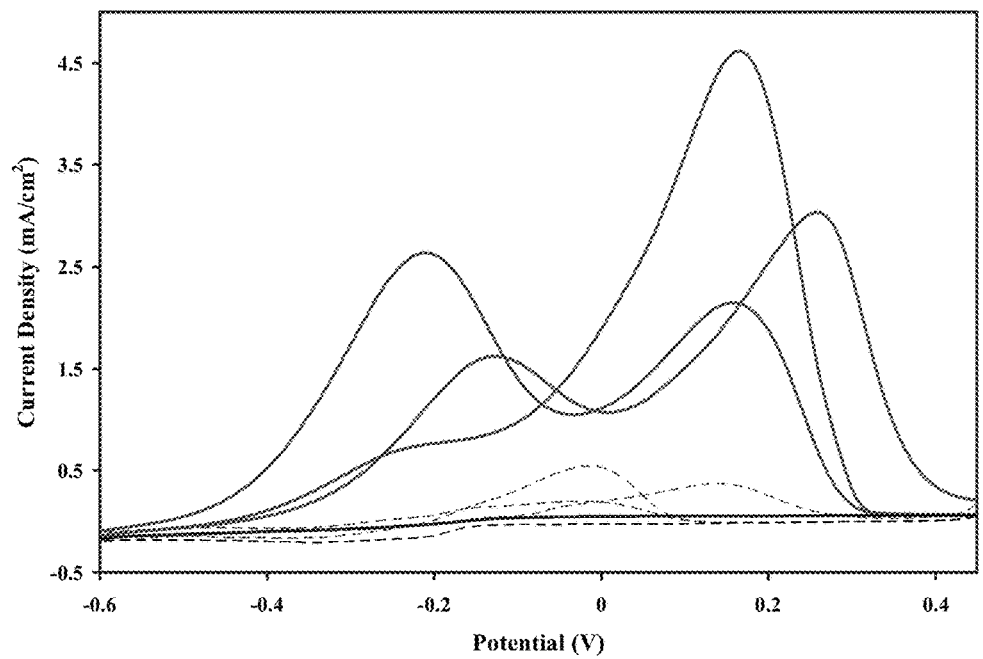
Figure 21D:
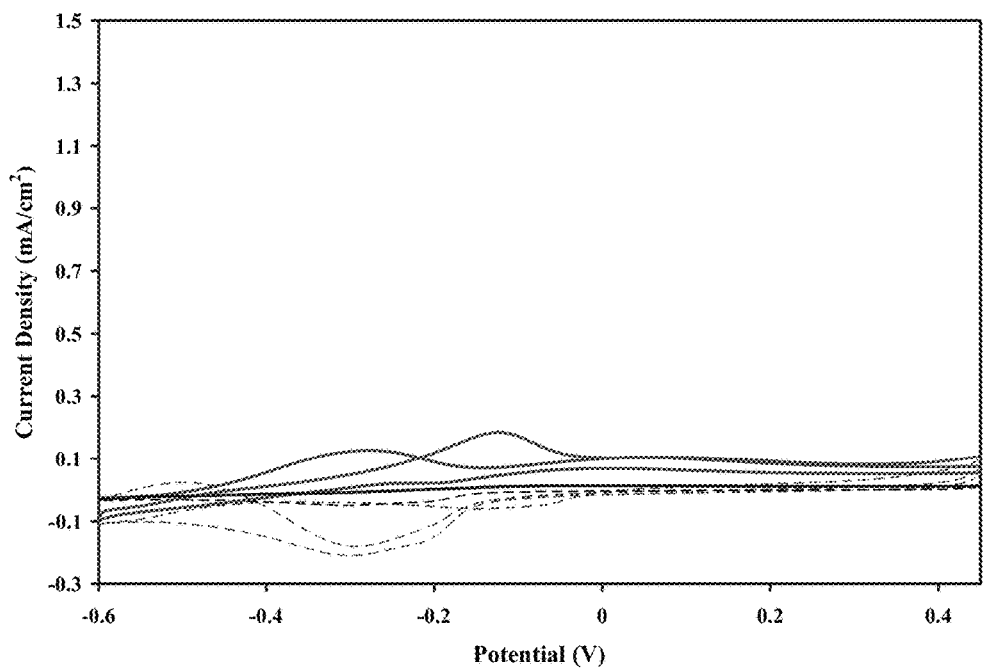
Figure 21E:
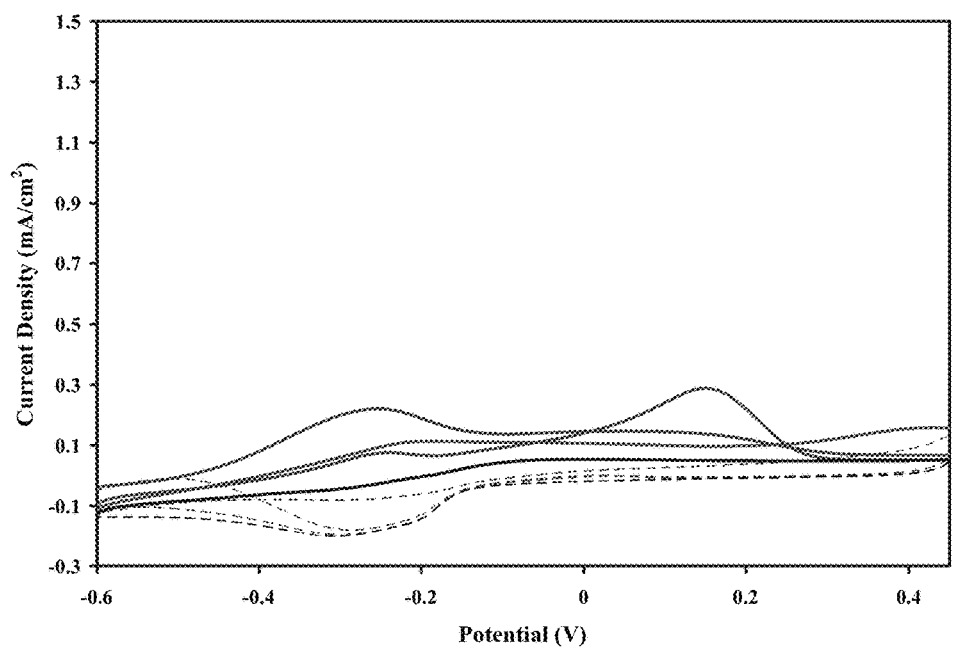
Figure 21F:
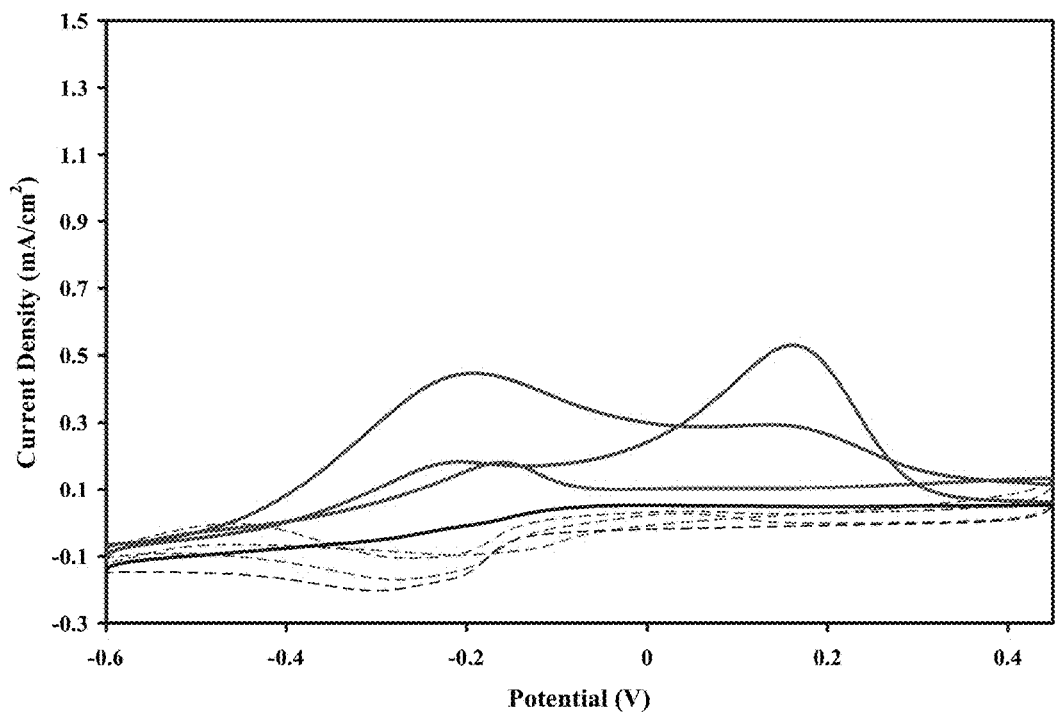
Figure 21G:
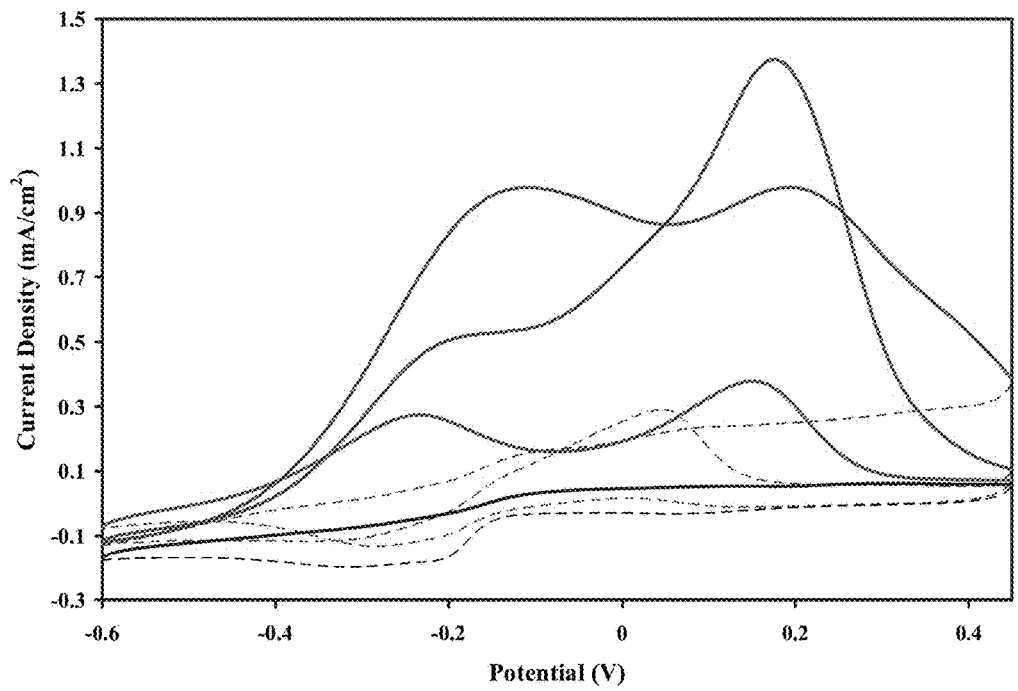
Figure 22A:
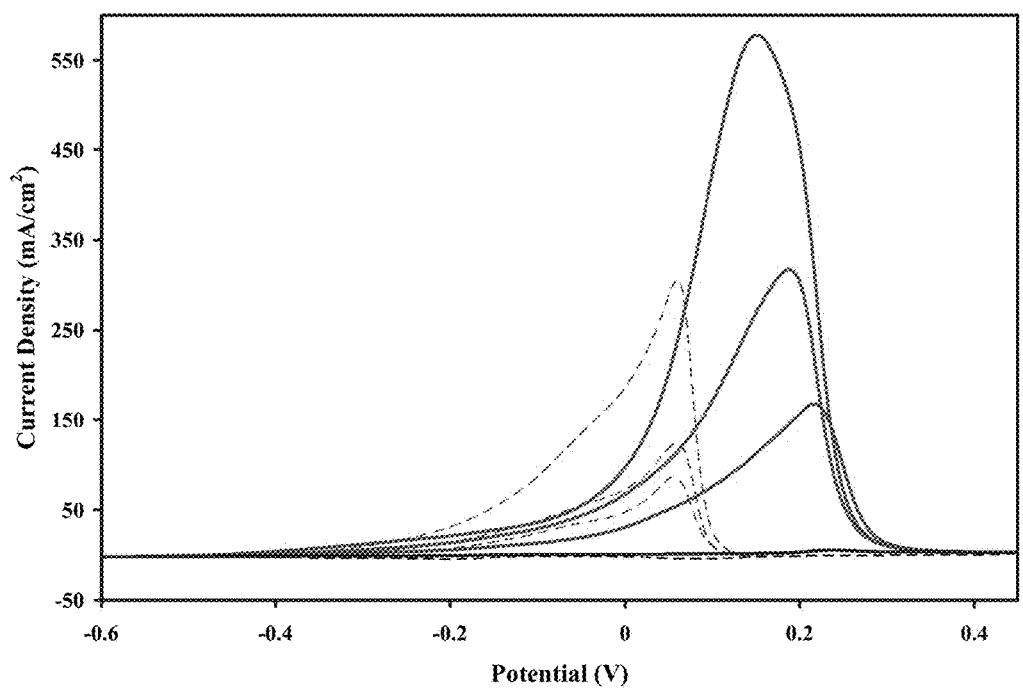
FIG. 22 A-G illustrate steady state CV scans for n-BuOH (red), i-BuOH (blue), sec-BuOH (green), and tert-BuOH (black) for (A) AuBAS, (B) PANI-$Au_2$, (C) PANI-$Au_6$, (D) PANI-$Au_0$, (E) PANI-$Au_3$, (F) PANI-$Au_5$, and (G) PANI-$Au_7$, in accordance with an exemplary embodiment of the disclosure.
Figure 22B:
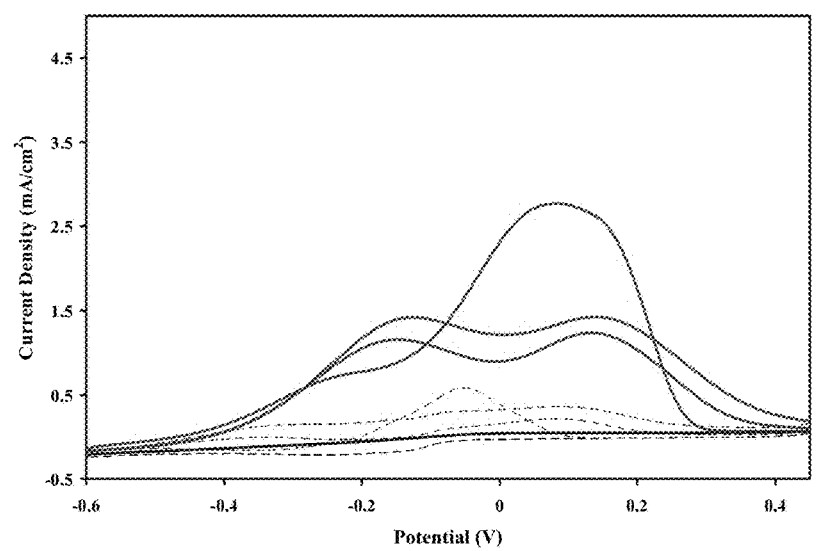
Figure 22C:
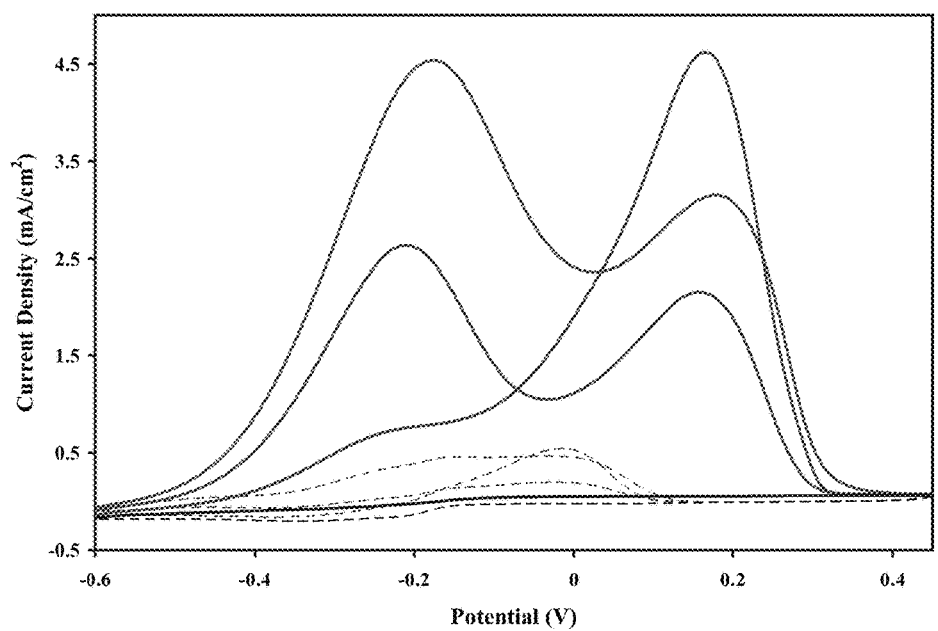
Figure 22D:
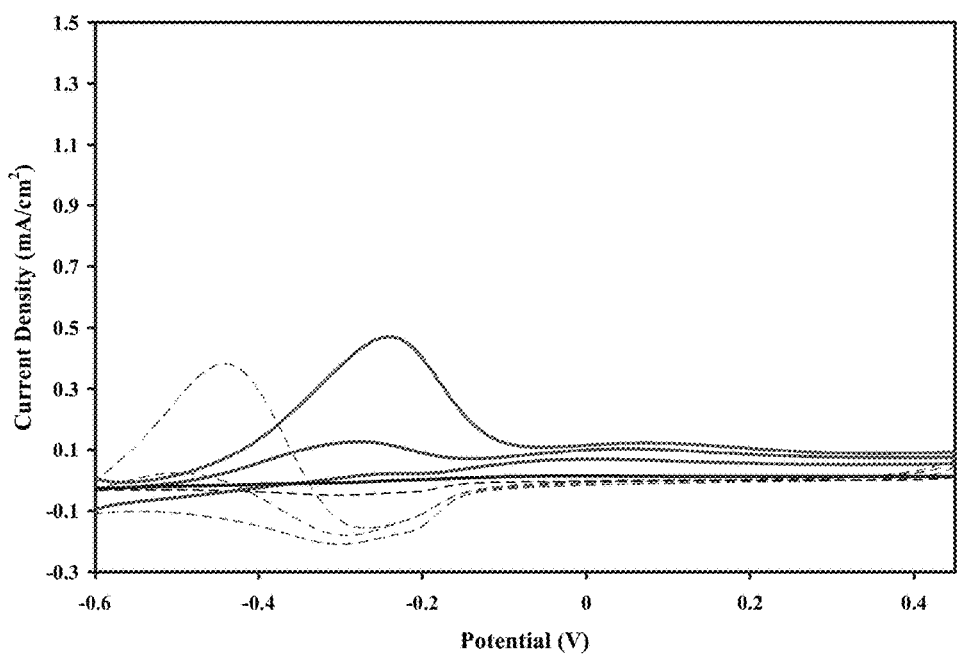
Figure 22E:
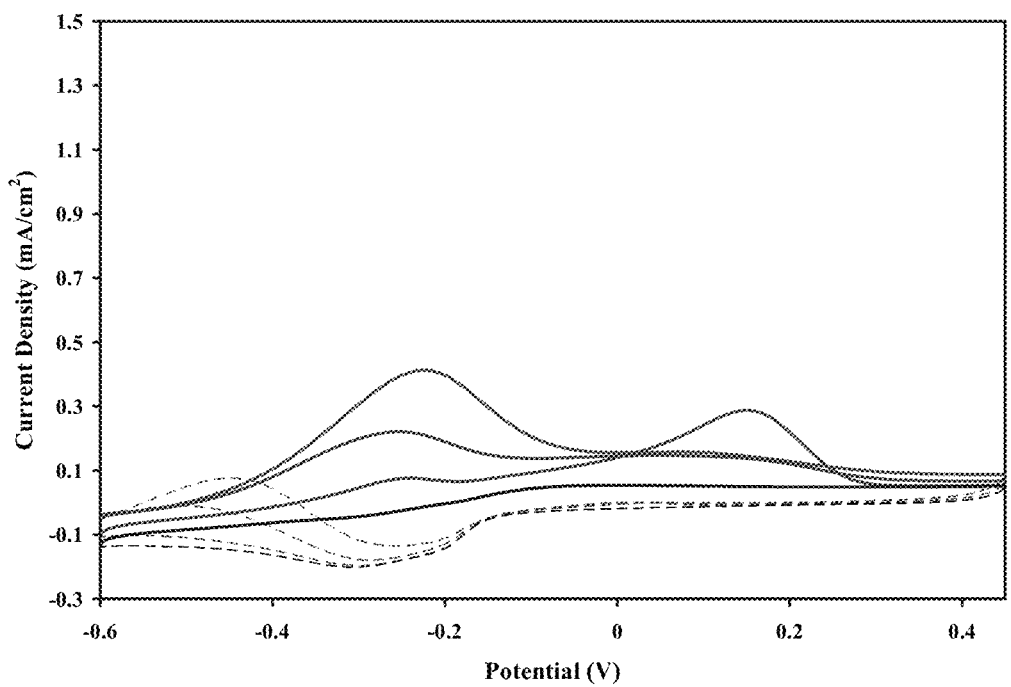
Figure 22F:
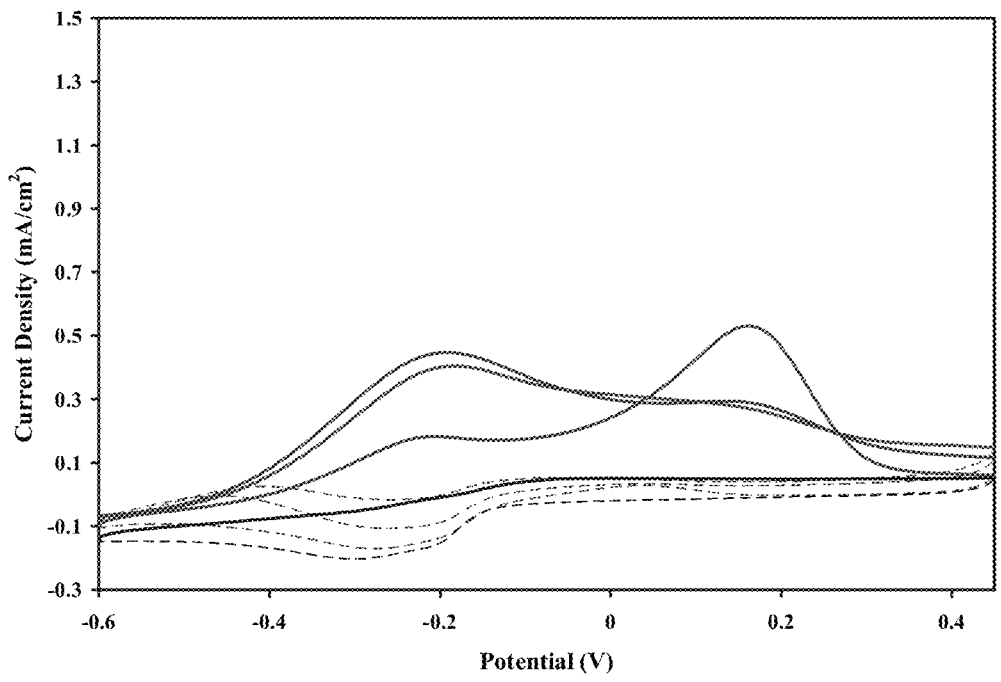
Figure 22G:
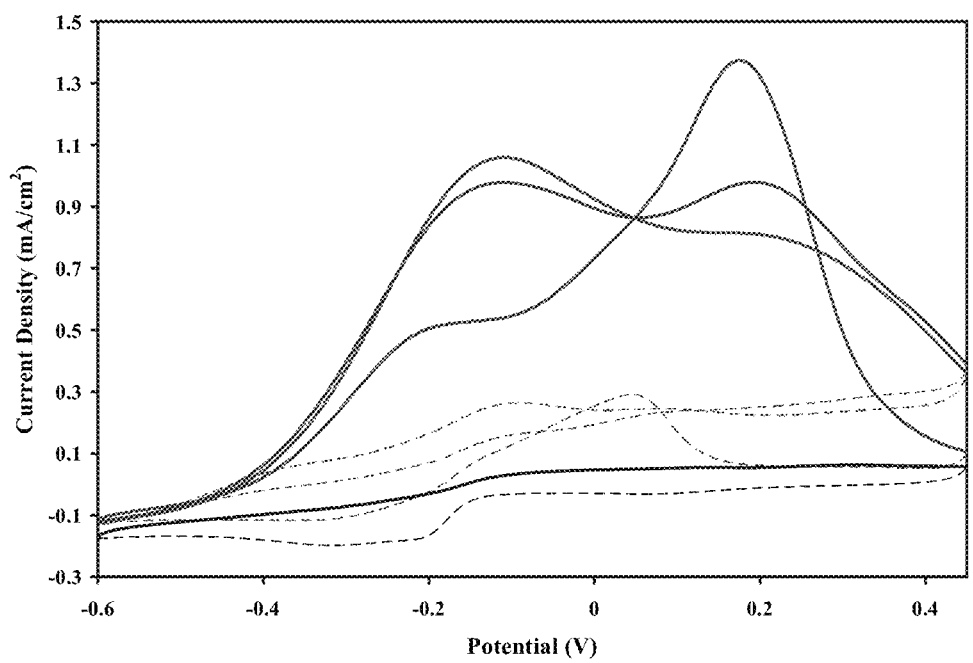

The pattern for oxidation of branched alcohols is different (FIG. 21A-G). Once again the odd-even pattern is dominating but some structural differences between alcohols—isopropanol (red), isobutanol (blue), sec-butanol (green), and tert-butanol (black)—are again noted. The Pt/PANI/Au0 for branched alcohols is similar to the linear ones. However, 2-BuOH shows strong direct oxidation activity, for both AGE-5 (FIG. 21F) and AGE-6 (FIG. 21C) with practically no indication of adsorption. Also, i-BuOH is more easily oxidized than i-PrOH at AGE-6, particularly in the oxidized state (FIG. 21C).

Finally, the BuOH series is shown in FIG. 22A-G for n-butanol (red), iso-butanol (blue), sec-butanol (green), and tert-butanol (black). The response of AGE-0 is shown here (FIG. 22D) only for completeness but it is similar to the other alcohols. Not surprisingly, tert-BuOH cannot be oxidized under the present conditions. The n-BuOH and iso-BuOH have similar response, only the n-BuOH being more active both for adsorbed and free oxidation. The response of 2-BuOH shows response attributable to its chirality.

Figure 23:
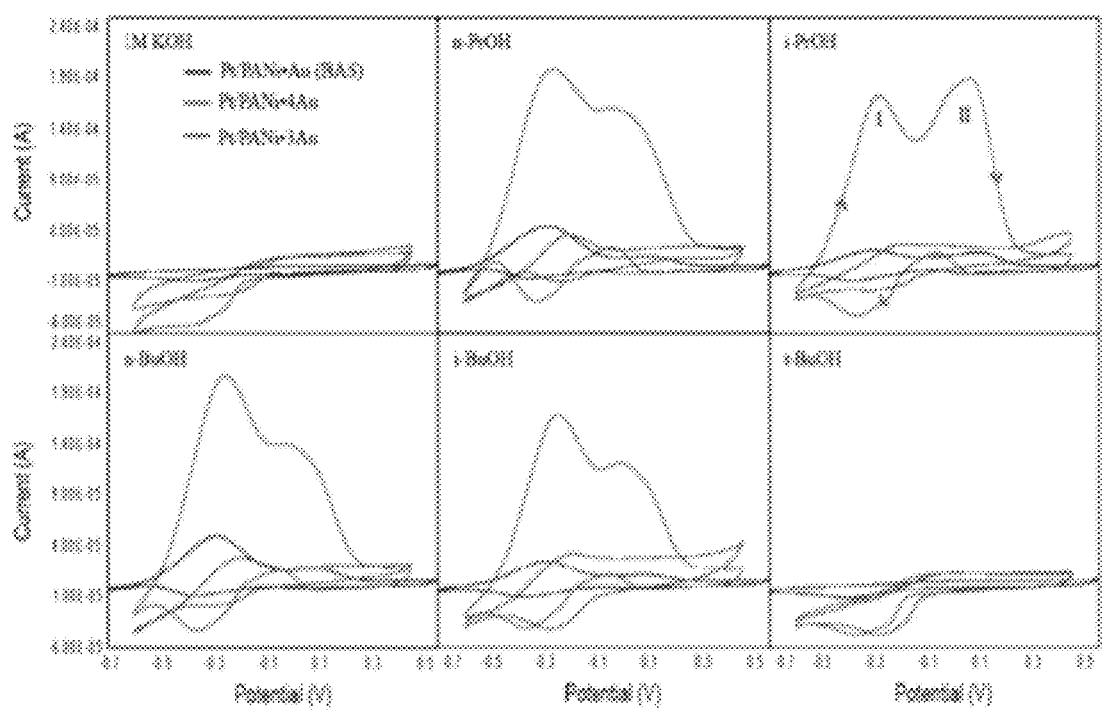
FIG. 23 illustrates steady state CV scans of PANI-AuBAS, PANI-$Au_3$, and PANI-$Au_4$ for 1M KOH, n-PrOH, iPrOH, n-BuOH, i-BuOH, and t-BuOH, in accordance with an exemplary embodiment of the disclosure.

Example 5: Alcohol Oxidation on PANI-Au$_3$ PANI-Au$_4$ Compared to Bulk Au Catalysts The second key preliminary result has been obtained by testing for catalytic selectivity for electrooxidation of low aliphatic alcohols. With almost 2 eV difference in activation energy selectivity would be expected. The results shown in FIG. 23 indeed demonstrate a significant difference between electrocatalytic activity of "macroscopic Au", Au$_3$ and Au$_4$. All three electrodes have had comparable active area, therefore the results are directly comparable. The "macro Au" has been prepared by dipping PANI in solution of chloroaurate according to. It results in micron-size Au-clusters containing millions of metal atoms. As expected, the Au$_4$ electrode shows much higher activity than Au$_3$ or "macro Au". Significantly, no activity has been seen for t-butanol for either electrode. In the case of "macro Au" the amount of incorporated Au is many fold times higher than the amount of gold incorporated by the controlled growth process. That illustrates the very important point that our new materials, represent a significant savings in precious metals while maintaining or even exceeding the catalytic activity.

Example 6: Oxidation of n-Propanol and Isopropanol

Electrochemical oxidation of n-propanol (n-PrOH) and of isopropanol (i-PrOH) in 1 M KOH has been used as the probing reactions in order to demonstrate the electrochemical efficiency of various forms of gold. The details of the alcohol oxidation, identification of the oxidation products, the effect of carbonate and the effect of the kind and concentration of hydroxide have not been investigated. All experiments were done in the presence of oxygen, unless stated otherwise. In order to aid visual comparison between different kinds of electrodes the concentration of propanol in 1 M KOH solution was kept constant at 0.5M. Due to the fact that adsorption of organic molecules onto platinum is often irreversible while adsorption onto gold is reversible, the catalytic poisoning effects seen for Pt are not seen for gold [8].

For electrocatalytic oxidation of alcohols on gold, the rate determining step is the cleavage of the C—$H_\alpha^\alpha$ bond.

The deprotonation of the alcohol occurs at high pH, and it is dependent on the $pK_a$ of the alcohol. Once deprotonated, the reactivity of the alkoxide intermediate, $H_\alpha^\alpha$ R—O$^-$, depends on the state of the electrode material being able to abstract the $H_\alpha^\alpha$. For primary alcohol (e.g. n-PrOH) the alkoxide is more active towards the electrochemical oxidation leading to propionic aldehyde, which can be further oxidized, while for the secondary alcohols (e.g. i-PrOH) the final product is the corresponding ketone (e.g. acetone).

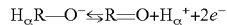

Aldehydes are unstable in alkaline solutions, and in the presence of oxygen decompose to variety of products or react quickly with other acceptors.

Example 7: Polyaniline Electrode Containing Tri-Atomic Au/Pd Clusters

Electrochemical Setup.

The electrochemical cell was a flow through cell that allowed solutions to be exchanged while maintaining electrical contact to the film. The reference electrode was a Ag/AgCl in 0.1M KCl/0.1M $KNO_3$ in agar, and the counter electrode was a Pt foil. All cyclic voltammograms (CVs) were recorded at a scan rate of 20 mV/s. All the solutions were vacuum-degassed prior to use. Operations of the potentiostat and of the flow injection system were controlled simultaneously using a Labview program.

Preparation of Stable Polyaniline Matrix.

The PANI film was deposited on one side of the working electrode from a 0.1M aniline/2M $HBF_4$ aqueous solution at a constant potential of +0.9V for 200 seconds. After the deposition of PANI, the aniline solution was exchanged with 0.1M $HClO_4$, and 10 CVs were completed from −0.2V to +0.8 V before holding the film at +0.8V for 1 hour to condition and stabilize (overoxidize) the PANI. The film was rinsed with 0.1M $HClO_4$ and 5 more CVs were recorded. This was the starting matrix for subsequent Au/Pd depositions.

Insertion of Au/Pd Clusters into PANI.

After the preparative step, the film was then held at +0.8V to keep the PANI in a fully oxidized state and was exposed to a solution of 0.2M $KAuCl_4$ in 0.1M $HClO_4$ for 50 seconds to form a PANI*$AuCl_4^-$ complex. All excess $AuCl_4^-$ anions were thoroughly rinsed away with 0.1M $HClO_4$, and the potential was swept to −0.2V to reduce the complexed metal halide anions to atomic metal. The final step was to perform 5 CVs from −0.2V to +0.8V. At this point, the film is ready to begin the next metal deposition cycle by holding the potential at +0.8V, so that it can be exposed again first to the $PdCl_4^{-2}$ solution and then to the $AuCl_4^-$ solution. The resulting electrode had a terminal arrangement in the mixed metal cluster of Pd—Au. Additional Au/Pd tri-atomic clusters were formed using the same process. These additional tri-atomic clusters of $Au_2Pd_1$ and $Au_1Pd_2$ were deposited in a PANI matrix by varying the order in which the metals were deposited to obtain geometric isomers. For each Au/Pd tri-atomic cluster prepared, the cycle was repeated three times, albeit with a different sequence of the $AuCl_4^-$ and $PdCl_4^{-2}$ precursors.

While not wishing to be bound by any theory, the formation of multi-atomic mixed metal clusters appears to be ensured by the high strength of the metal-metal bond. Also, on the n+1 cycle, the incoming halo-anion is apparently preferentially directed to the site already occupied by the previously deposited neutral metal atom. This can be due to the formation of charge transfer complex between metal (negative) and PANI chain (positive), whereupon the imine site becomes a stronger Lewis acid and can preferentially attract the next halo anion such that the cluster formation becomes a self-directing process.

Figure 24A:
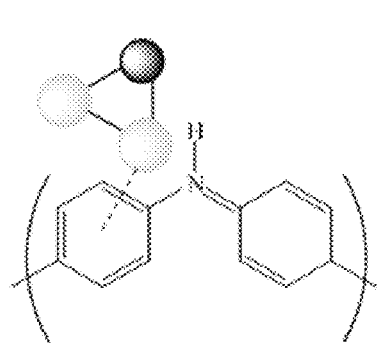
FIG. 24A-B illustrate the structure of the triangular and linear clusters added to the imine site of a PANI chain, in accordance with an exemplary embodiment of the disclosure.
Figure 24B:
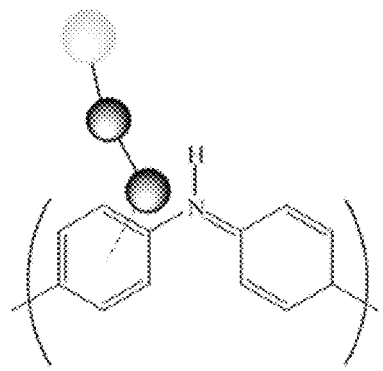

In the case of tri-atomic clusters, the cycle is repeated twice after the initial cycle, albeit with a different sequence of the $AuCL_4^-$ and $PdCl_4^-$ precursors. One critical aspect of the successful deposition appears to be the complete removal of polyaniline fragments at the beginning of the deposition sequence, otherwise the residual PANI fragments can act as a scavenger of the halo-complex precursor, which is present in substoichiometric concentration with respect to the PANI matrix. Some of these fragments can become trapped in the matrix and lead to the formation of clusters other than the desired ones, but the desired ones will be present in an overwhelming majority, and the overall activity will be dictated by these. The presence of impurity clusters on these fragments can lead to slight variations in the CV between films prepared by the same cycle sequences, but the overall characteristics of the CV and the pattern of differences between the CVs of different clusters remain the same. FIGS. 24A and 24B show the PANI site with examples of two possible tri-atomic complexes in accordance with the present invention. FIG. 24A shows the structure of triangular clusters added to the imine site of the PANI chain, while FIG. 24B shows the structure of linear clusters added to the imine site of the PANI chain. The dashed line represents formation of the charge transfer complex.

Electro-Oxidation of Propanol.

Cyclic voltammograms for the electro-oxidation of 0.5M n-propanol were recorded in 1M NaOH at a scan rate of 20 mV/s from −0.6V to +0.5V using a Solartron SI1287 electrochemical interface. The reference electrode was a Ag/AgCl in 1M KCl/1M $KNO_3$, and the counter electrode was a Pt foil. Each film was cycled 10 to 20 times until a steady state was reached. Only the last CV for each is shown.

Figure 25A:
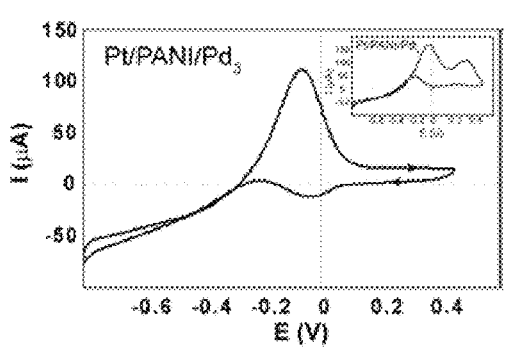
FIG. 25A-B illustrate the CVs recorded on Pt/PANI electrodes containing homo tri-atomic clusters $Pd_3$ and $Au_3$ in 0.5M n-propanol in 1M NaOH at 20 mV/s, in accordance with an exemplary embodiment of the disclosure.
Figure 25B:
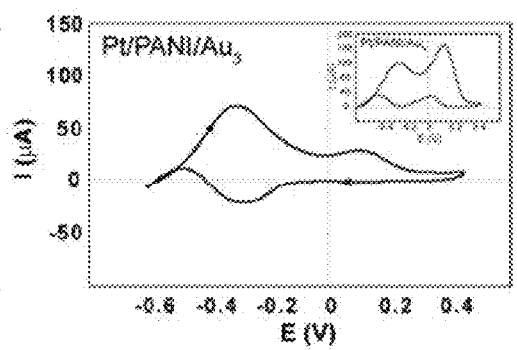

The effect of the type of metal on electro-oxidation of n-propanol can be seen in FIGS. 25A-B. The difference in the pattern of electro-oxidation of n-propanol in 1M NaOH at Pt/PANI-$Pd_3$ and Pt/PANI-$Au_3$ is shown in FIGS. 25A and 25B, respectively. It has been observed that the tri-atomic cluster generally leads to the minimum number of possible geometric formations. It should be noted, however, that $Au_3$ appears to be significantly less active than the even-numbered clusters $Au_2$, $Au_4$, or $Au_6$. For pure palladium clusters, the peak activity appears to be at $Pd_2$. The highest activity clusters can are shown as inserts in FIG. 25A and FIG. 25B. The $Au_3$ gives the first oxidation peak at −0.3V, followed by the smaller oxidation peak at +0.1V. The $Pd_3$ electro-oxidation shows only one peak at −0.07V.

Figures 26A, 26B, 26C:
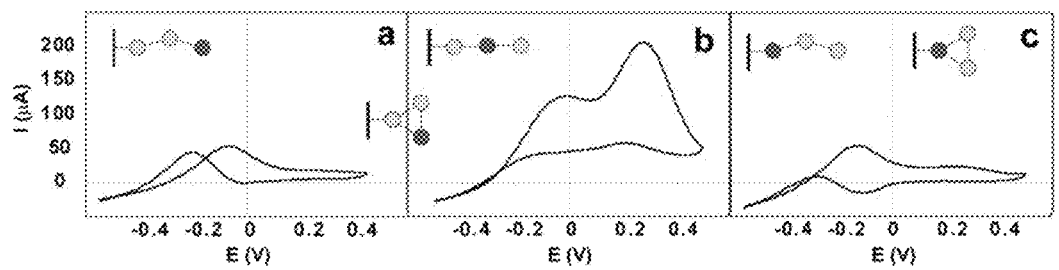
FIG. 26A-F illustrate the effect of added hetero tri-atomic Au/Pd clusters to PANI on oxidation of 0.5M n-propanol in 1M NaOH taken at 20 mV/s, in accordance with an exemplary embodiment of the disclosure.
Figures 26D, 26E, 26F:
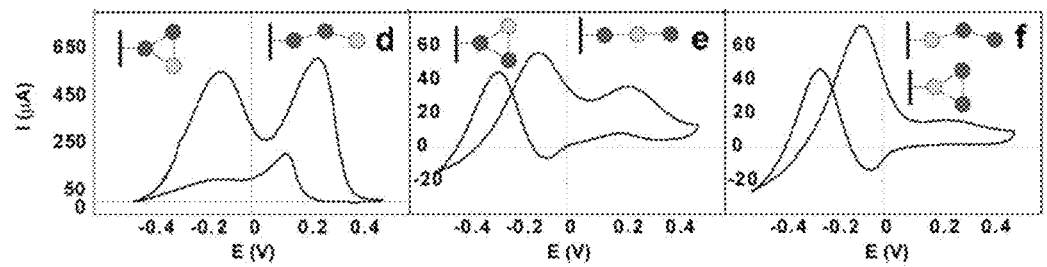

The electro-oxidation of n-propanol in 1M NaOH of hetero tri-atomic Au/Pd clusters is shown in FIG. 26A-F. As seen therein, the effect of deposition sequence, i.e., the final atomic structure, on change of the oxidation pattern is clearly evident. It should be noted that there were no changes in the CV between the films with different deposition sequences when the alcohol is absent (not shown). The tri-atomic particles for the $Au_2Pd_1$ isomers are shown in FIG. 26A-C, while the $Au_1Pd_2$ isomers are shown in FIG. 26D-F. The icons of possible isomeric structures are inserted in the panels for orientation. The linear icons also indicate the deposition order for each cluster, with the line representing the PANI matrix and the closest atom to it representing the first atom deposited, followed by the second and third. The lightly colored circle represents gold, while the darker color circle represents palladium. It should be noted that the current scales in FIG. 26A-F are different to better visualize the shapes of the CVs. For example, the scale for the Pd—Pd—Au (FIG. 26D) is about 10 times larger than that of Pd—Au—Pd (FIG. 65E) and about three times larger than that of FIG. 26A-C.

Figure 27A:
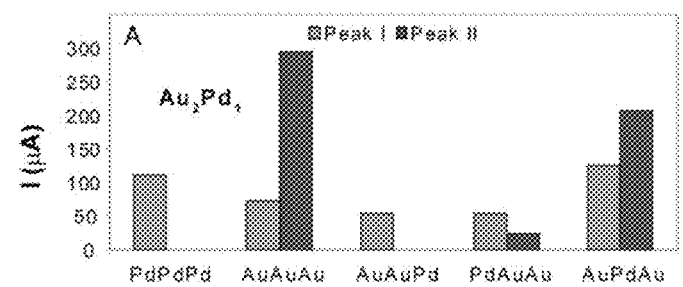
FIG. 27A-B illustrate the peak currents $i_p(I)$ and $i_p(II)$ for heteroclusters (A) $Au_2Pd_1$ and (B) $Au_1Pd_2$ structures, in accordance with an exemplary embodiment of the disclosure.
Figure 27B:
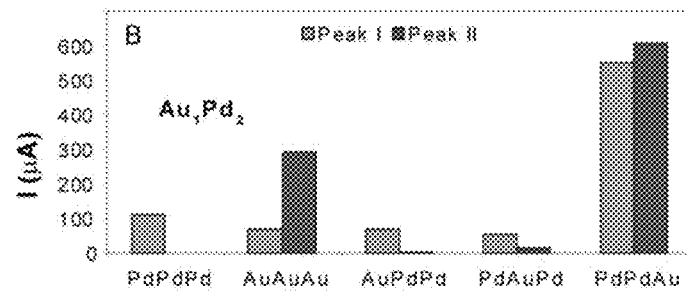

FIG. 27A-B shows the ordering effect of Au/Pd deposition by comparing the magnitude of peak currents $i_p(I)$ and $i_p(II)$ for the $Au_2Pd_1$ and $Au_1Pd_2$ hetero tri-atomic structures. The activities of the homo tri-atomic clusters PANI/$Au_3$ and PANI/$Pd_3$ are included for reference.

As discussed, the clusters are prepared using a cyclic deposition technique. During each cycle, another atom is added to the cluster. Unlike in homo-atomic clusters where the order in which atoms are added will not create new isomers, changing the order in which atoms are added in a hetero-atomic cluster can give rise to new isomers. Attachment can play an important role, not only because of the possible electronic coupling to the cluster but, more importantly, as a geometrical factor that affects the function that the cluster is expected to perform. Homo-clusters can only exist in triangular or linear form, but do not have order dependent isomers. For the hetero-clusters $Au_1Pd_2$ and $Au_2Pd1$, when calculated in the "gas phase," the number of isomers is limited. In other words, in the triangular sequence Au—Pd—Pd is the same as Pd—Au—Pd or Pd—Pd—Au. Likewise for $Au_2Pd_1$, there is no difference between Au—Au—Pd, Au—Pd—Au or Pd—Au—Au. This is thought to be because there is no geometrical reference point. The situation is fundamentally different when the cluster is attached to the PANI by a charge-transfer complex through the first deposited atom. The sequence in which the tri-atomic cluster is formed can result in two different isomers with different properties. Moreover, when linear clusters are considered, even more isomers are possible.

As shown in FIGS. 26A-F and 27A-B, the attachment of the hetero-atomic clusters to the PANI matrix has a major effect, which is seen as a higher oxidation current, namely $i_p(II)$, and also as different overall CV patterns. The attachment of a tri-atomic cluster increases the number of possible isomers from two (homo) to five (hetero) for each tri-atomic particle. The order in which each cluster is assembled and, therefore, the final structure, appears to have a pronounced effect on cluster activity. While it is believed that the first deposited atom anchors the cluster to the PANI matrix, the order of the second and third atoms appears to dominate activity of the cluster. If the clusters were triangular, there would be no difference, but with linear configurations, ordering has an effect on cluster activity. For example, FIG. 27A shows that Au—Pd—Au is more active than Au—Au—Pd. Similarly, FIG. 27B shows Pd—Pd—Au is much more active than Pd—Au—Pd. In both cases, the terminal arrangement of atoms in the cluster is Pd—Au. The ordering has a major effect on the shape of the CV, thereby indicating a possible different reaction mechanism of n-propanol oxidation, as can be seen from FIG. 26A-B and FIG. 26D-E, respectively.

Another notable effect is the replacement of "one atom" in a homo-cluster to create a hetero-cluster. As shown in FIG. 27A, in the case of PANI/$Au_3$, a substitution with a Pd atom increases the magnitude of $i_p(I)$ for Au—Pd—Au but decreases it for $i_p(II)$. As shown in FIG. 27B, on the other hand, substitution of Pd with Au in PANI/$Pd_3$ results in much higher activity for both peak currents of Pd—Pd—Au. These results again suggest that in linear configuration, the most important moiety is the terminal Pd—Au.

The available "gas phase" theoretical values of the ionization energy, as seen below in Table 1, offers support for the conclusion that the Pd—Au terminal arrangement is the most active form. Moreover, the indications are that the linear form is more optimal than the triangular configuration.

TABLE 1

| Cluster | H-L Gap (eV) | Shape |
|---|---|---|
| $Au_3$ | $0.25^a$ | Linear (bent) |
| $Pd_3$ | $0.011^b$ | Triangle |
| $Au_2Pd_1$ | $2.29^c$ | Triangle |
| $Au_1Pd_2$ | $2.35^d$ | Triangle |

Table 2 below shows the results of the comparison of activity of PANI/Pd—Pd—Au with the two most active homo-atomic catalysts, namely PANI/$Au_6$ and PANI/$Pd_2$. As indicated in Table 2, the most active hetero-atomic catalyst PANI/Pd—Pd—Au is approximately five times more active than the most active homo-clusters.

TABLE 2

| Cluster | $I_p$ (µA) (I) | $I_p$ (µA) (II) |
|---|---|---|
| $Au_6$ | 120 | 169 |
| $Pd_2$ | 167 | 134 |
| Pd—Pd—Au | 551 | 607 |

As shown, tri-atomic clusters of Au2Pd1 and Au1Pd2 were deposited in a PANI matrix by varying the order in which the metals were deposited to obtain geometric isomers. While not wishing to be bound by any theory, it appears that the catalytic activity depended on the deposition sequence of the metal atoms. The first atom deposited seems to effectively anchor the cluster to the matrix, while the activity itself appears to be dictated by the order of the next two atoms deposited. It was found that the highest activity was for clusters that had Pd and Au deposited second and third, respectively. It was also found that the activity of the hetero-atomic cluster PANI/Pd—Pd—Au was higher than even the most active homo-atomic clusters of both gold and palladium.

The following publications in their entireties are hereby incorporated by reference into this application as if fully set forth herein in order to more fully describe the state of the art to which the disclosed matter pertains.

A. Sanchez, S. Abbet, U. Heiz, W. D. Schneider, H. Hakkinen, R. N. Barnett, U. Landman, *J. Phys. Chem. A*, 103, 9573 (1999).

A. S. K. Hashmi, G. J. Hutchings, *Angew. Chem. Int. Edit.*, 45, 7896 (2006).

R. Meyer, C. Lemire, S. K. Shaikhutdinov, H. Freund, *Gold Bull.*, 37, 72 (2004).

K. A. Assiongbon, D. Roy, *Surf. Sci.*, 594, 99-119 (2005).
Z. Borkowska, A. Tymosiak-Zielinska, R. Nowakowski, *Electrochim. Acta*, 49, 2613 (2004).
R. B. de Lima, H. Varela, *Gold Bull.*, 41, 15-22 (2008).
J. Hernandez, J. Solla-Gullon, E, Herrero, A. Aldaz, J. M. Feliu, *Electrochim. Acta*, 52, 1662 (2006).
P. Ocon, C. Alonso, R. Celdran, J. Gonzalezvelasco, *J. Electroanal. Chem.*, 206, 179 (1986).
M. BeltowskaBrzezinska, T. Luczak, R. Holze, *J. Appl. Electrochem.*, 27, 999 (1997).
Y. Kwon, S. C. S. Lai, P. Rodriguez, M. T. M. Koper, *J. Am. Chem. Soc.*, 133, 6914.
Y. Iizuka, H. Fujiki, N. Yamauchi, T. Chijiiwa, S. Arai, S. Tsubota, M. Haruta, *Catal. Today*, 36, 115 (1997).
B. K. Min, C. M. Friend, *Chem. Rev.*, 107, 2709 (2007).
S. Lee, L. M. Molina, M. J. Lopez, J. A. Alonso, B. Hammer, B. Lee, S. Seifert, R. E. Winans, J. W. Elam, M. J. Pellin, S. Vajda, *Angew. Chem. Int. Edit.*, 48, 1467 (2009).
M. J. Rodriguez-Vazquez, M. C. Blanco, R. Lourido, C. Vazquez-Vazquez, E. Pastor, G. A. Planes, J. Rivas, M. A. Lopez-Quintela, *Langmuir*, 24, 12690 (2008).
E. M. Fernandez, J. M. Soler, I. L. Garzon, L. C. Balbas, *Phys. Rev. B*, 70 (2004).
H. Hakkinen, U. Landman, *Phys. Rev. B*, 62, R2287 (2000).
C. Majumder, S. K. Kulshreshtha, *Phys. Rev. B*, 73 (2006).
E. Janssens, H. Tanaka, S, Neukermans, R. E. Silverans, P. Lievens, *New J. Phys.*, 5 (2003).
T. Risse, S. Shaikhutdinov, N. Nilius, M. Sterrer, H. J. Freund, *Accounts Chem. Res.*, 41, 949 (2008).
K. J. Taylor, C. L. Pettiettehall, O. Cheshnovsky, R. E. Smalley, *J. Chem. Phys.*, 96, 3319 (1992).
W. Eberhardt, *Surf. Sci.*, 500, 242 (2002).
M. Haruta, *Catal. Today*, 36, 153 (1997).
H. Miyamura, R. Matsubara, Y. Miyazaki, S. Kobayashi, *Angew. Chem. Int. Edit.*, 46, 4151 (2007).
L. Prati, M. Rossi, *J. Catal.*, 176, 552 (1998).
D. Saio, T. Amaya, T. Hirao, *Adv. Synth. Catal*, 352, 2177.
H. Tsunoyama, H. Sakurai, Y. Negishi, T. Tsukuda, *J. Am. Chem. Soc.*, 127, 9374 (2005).
K. L. Nagashree, M. F. Ahmed, *Synth. Met.*, 158, 610 (2008).
K. L. Nagashree, M. F. Ahmed, *J. Appl. Electrochem.*, 39, 403 (2009).
S. Palmero, A. Colina, E. Munoz, A. Heras, V. Ruiz, J. Lopez-Palacios, *Electrochem. Commun.*, 11, 122 (2009).
R. K. Pandey, V. Lakshminarayanan, *J. Phys. Chem. C*, 113, 21596 (2009).
D. W. Hatchett, N. M. Millick, J. M. Kinyanjui, S. Pookpanratana, M. Bar, T. Hofmann, A. Luinetti, C. Heske, *Electrochim. Acta*, 56, 6060.
E. M. Genies, A. Boyle, M. Lapkowski, C. Tsintavis, *Synth. Met.*, 36, 139 (1990).
E. T. Kang, K. G. Neoh, K. L. Tan, *Prog. Polym. Sci.*, 23, 277 (1998).
A. A. Syed, M. K. Dinesan, *Talanta*, 38, 815 (1991).
A. P. Jonke, M. Josowicz, J. Janata, M. H. Engelhard, *J. Electrochem. Soc.*, 157, P83 (2010).
D. W. Hatchett, M. Josowicz, J. Janata, D. R. Baer, *Chem. Mater.*, 11, 2989 (1999).
J. A. Smith, M. Josowicz, J. Janata, *J. Electrochem. Soc.*, 150, E384 (2003).
H. P. Liu, J. Q. Ye, C. W. Xu, S. P. Jiang, Y. X. Tong, *J. Power Sources*, 177, 67-70, (2008).
J. L. Gong, D. W. Flaherty, T. Yan, C. B. Mullins, *Chemphyschem*, 9, 2461 (2008).
A. Abad, P. Concepcion, A. Corma, H. Garcia, *Angew. Chem. Int. Edit.*, 44, 4066 (2005).
A. P. Jonke, M. Josowicz, J. Janata, *J. Electrochem. Soc.*, (2011), in print.
J. Lopez-Palaeios, E. Munoz, M. A. Heras, A. Colina and V. Ruiz, *Electrochim. Acta*, 52, 234 (2006).
J. Lippe, R. Holze, *J. Electroanal. Chem.*, 339, 411 (1992).
H. Q. Tang, A. Kitani and M. Shiotani, *Electrochim. Acta*, 41, 1561 (1996).
A. Q. Zhang, C. Q. Cui, J. Y. Lee, *Synth. Met.*, 72, 217 (1995).
H. N. Dinh, J. F. Ding, S. J. Xia, V. Birss, *J. Electroanal. Chem.*, 459, 45 (1998).
T. Kobayashi, H. Yoneyama, H. Tamura, *J. Electroanal. Chem.*, 177, 293 (1984).
D. E. Stilwell, S. M. Park, *J. Electrochem. Soc.*, 136, 688 (1989).
A. Malinauskas, R. Holze, *J. Appl Polym. Sci.*, 73, 287 (1999).
J. Janata, M. Josowicz, *Accounts Chem. Res.*, 31, 241 (1998).
J. Janata, M. Josowicz, *J. Solid State Chem.*, 13, 41 (2009).
J. Janata, *Principles of Chemical Sensors*, Springer, New York (2009).
J. A. Smith, M. Josowicz, J. Janata, *Phys. Chem. Chem. Phys.*, 7, 3614 (2005).
S. Kumar, R. Verma, B. Venkataramani, V. S. Raju, S. Gangadharan, *Solv. Extr. Ion. Exch.*, 13, 1097 (1995).
A. P. Jonke, M. Josowicz, J. Janata, *J. Electrochem. Soc.*, 159, 40 (2012).
Hong-Shi Li, M. Josowicz, D. R. Baer, M. H. Engelhard, J. Janata, *J. Electrochem. Soc.*, 124, 798-805 (1995).
P. Nava, M. Sierka, R. Ahlrichs, *Phys. Chem. Chem. Phys.*, 5, 3372-3381 (2003).
G. A. Rimbu G. M. Iordoc, R. Vasilescu-Mirea. I. Stamatin, T. Zaharescu, *Rev.de Cheat.*, 60, 1285-1287 (2009).
N. Miaura, K. Yamada, A. Suzuki, *Tetrahedron Lett.*, 20, 3437-3440 (1979).
Hanna, M., *Gold Bulletin*, 37, 27-36 (2004).
A. P. Jonke, M. Josowicz, J. Janata, *J Electrochem Soc.*, 158, E147 (2011).
A. P. Jonke, J. L. Steeb, M. Josowicz, J. Janata, *Catal. Lett.*, 143, 531 (2013).
Please note that the y-axis scale of FIG. 8 in the above reference was incorrectly labeled therein as µA and should read mA. It is in agreement with the values shown in FIG. 25D herein.
I. T. Schwartz, A. P. Jonke, M. Josowicz, J. Janata, *Catal. Lett.*, 143, 777 (2013).
I. T. Schwartz, A. P. Jonke, M. Josowicz, J. Janata, *Catal. Lett.*, 143, 636 (2013).
M. Ai-Jie, K. Xiao-Yu, C. Gang, Z. Ya-Ru, L. Yan-Fang, L. Peng, Z. Chi, *Mol. Phys.*, 109, 1485 (2011).
S. Juan Wang, X. Yu Kuang, L. Cheng, L. Yan-Fang, Z. Ya-Ru, *Phys. Chem. Chem. Phys.*, 13, 10119 (2011).

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

What is claimed is:

1. A method of making an atomic metal with a desired catalytic activity comprising:
   coating a substrate with a conductive polymer film;
   preconditioning the conductive film by oxidizing the conductive polymer film;
   forming from one metal a conductive polymer-metal-$X_n^-$ complex;
   reducing the conductive polymer-metal-$X_n^-$ complex to form an atomic metal-conductive polymer complex; and
   sequentially repeating the steps of forming and reducing (N−1) number of times to create a conductive polymer-(metal)$_N$ complex;
   wherein N is 2 to 10;
   wherein at least two different metals are used; and
   wherein the order of selection of the single metal-$X_n^-$ complex used in each step of forming and reducing is determined based upon a desired catalytic activity of the atomic metal.

2. The method of claim 1 wherein:
   the substrate comprises an electrode;
   the metals are noble metals;
   the step of forming the conductive polymer-metal-$X_n^-$ complex comprises forming a conductive polymer-noble metal-$X_n^-$ complex;
   the step of reducing the conductive polymer-metal-$X_n^-$ complex to form an atomic metal-conductive polymer complex comprises reducing the conductive polymer-noble metal-$X_4^-$ complex to form an atomic noble metal-conductive polymer complex; and
   repeating the steps of forming and reducing (N−1) number of times creates a conductive polymer-noble metal$_N$ complex.

3. The method of claim 2, wherein the coating step comprises treating at least a portion of the electrode with a conductive polymer solution at positive potential.

4. The method of claim 3, wherein the conductive polymer is selected from the group consisting of polyaniline (PANI), polypyrrole, and polypyridine.

5. The method of claim 3, wherein the conductive polymer is PANI.

6. The method of claim 2, wherein the preconditioning step comprises cycling a potential from −0.2V to +0.7V, then holding the potential at least about +0.8V for at least 30 minutes.

7. The method of claim 2, wherein the forming step comprises:
   holding the conductive polymer at about 0.7 V; and
   exposing the conductive polymer to noble metal-$X_4^-$ in an acidic medium.

8. The method of claim 2, wherein the reducing step comprises sweeping the potential to −0.2V.

9. The method of claim 2, wherein the noble metals are gold and palladium.

10. The method of claim 1, wherein N is at least 3.

11. The method of claim 2, wherein the forming step comprises:
    holding the conductive polymer at about 0.7 V; and
    exposing the conductive polymer to noble metal-$X_n^-$ in a buffer having a pH of approximately 7.

12. The method of claim 2, wherein the forming step comprises:
    holding the conductive polymer at about 0.7 V; and
    exposing the conductive polymer to noble metal-$X_n^-$ in a phosphate buffer having a pH of approximately 7.

13. The method of claim 1, wherein the desired catalytic activity of the atomic metal is selected from the group consisting of a desired HOMO-LUMO gap energy, a desired reaction rate, a desired selectivity, and a desired lifetime.

14. The method of claim 13, wherein the substrate comprises an electrode and the method forms an atomic metal electrode.

15. The method of claim 2, wherein the noble metals are gold and palladium;
    wherein N is 3; and
    wherein palladium and gold are used in repeating the steps of forming and reducing to obtain a terminal arrangement of Pd—Au in the atomic noble metal electrode.

16. A method of making an atomic metal with a desired catalytic activity comprising:
    coating a portion of a substrate with a conductive polymer film;
    preconditioning a portion of the conductive film by oxidizing the conductive polymer film;
    forming from one metal a conductive polymer-metal-$X_n^-$ complex by:
      holding the conductive polymer film at a positive potential; and
      exposing the conductive polymer film to metal-$X_n^-$ in a medium;
    reducing the conductive polymer-metal-$X_n^-$ complex to form an atomic metal-conductive polymer complex; and
    sequentially repeating the steps of forming and reducing (N−1) number of times to create a conductive polymer-(metal)$_N$ complex;
    wherein N is an integer greater than 1;
    wherein at least two different metals are used; and
    wherein the sequential order of forming and reducing the conductive polymer-one metal-$X_n^-$ complex is determined based upon a desired catalytic activity of the atomic metal.

17. A method of making an atomic metal with a desired catalytic activity comprising:
    coating at least a portion of a substrate with a polymer film;
    preconditioning at least a portion of the polymer film by oxidizing a portion of the polymer film;
    forming from one metal a polymer-metal-$X_n^-$ complex;
    reducing the polymer-metal-$X_n^-$ complex to form an atomic metal-polymer complex; and
    sequentially repeating the steps of forming and reducing (N−1) number of times to create a polymer-metal$_N$ complex;
    wherein N is an integer greater than 1;
    wherein (M) number of different metal-$X_n^-$ complexes are used;
    wherein (M) is an integer from 2 to (N−1);
    wherein the number of permutations of the atomic metal formed of (M) number of different metal-$X_n^-$ complexes deposited (N) times is given by:

$$P(N, M) = \frac{N!}{(N-M)!} \quad (1)$$

wherein the order of selection of the metal-$X_n^-$ complex used in each step of forming and reducing is determined based upon a desired catalytic activity of the atomic metal.

18. The method of claim 17, wherein the desired catalytic activity of the atomic metal comprises selecting a desired HOMO-LUMO gap energy from among the P(N,M) choices.

19. The method of claim 17, wherein the desired catalytic activity of the atomic metal comprises selecting a desired reaction rate from among the P(N,M) choices.

20. The method of claim 17, wherein the desired catalytic activity of the atomic metal comprises selecting a desired selectivity from among the P(N,M) choices.

21. The method of claim 17, wherein the desired catalytic activity of the atomic metal comprises selecting a desired lifetime from among the P(N,M) choices.

22. The method of claim 17 further comprising controlling the oxidation potential of the conductive polymer film.

23. The method of claim 22, wherein controlling the oxidation potential of the conductive polymer film comprises cycling a potential from −0.2V to +0.7V, then holding the potential at least about +0.8V for at least 30 minutes.

* * * * *

UNITED STATES PATENT AND TRADEMARK OFFICE
CERTIFICATE OF CORRECTION

PATENT NO. : 10,026,969 B2
APPLICATION NO. : 14/483268
DATED : July 17, 2018
INVENTOR(S) : Alex P. Jonke et al.

It is certified that error appears in the above-identified patent and that said Letters Patent is hereby corrected as shown below:

In the Specification

Column 1, Line 28, please insert the following paragraph:
-- STATEMENT REGARDING FEDERALLY SPONSORED RESEARCH
This invention was made with government support under grant number CNE0452045 awarded by the National Science Foundation. The government has certain rights in the invention. --

Signed and Sealed this
Fourteenth Day of May, 2019

Andrei Iancu
*Director of the United States Patent and Trademark Office*